United States Patent [19]

Malm

[11] Patent Number: 5,257,345

[45] Date of Patent: Oct. 26, 1993

[54] COMPUTER SYSTEM AND METHOD FOR DISPLAYING FUNCTIONAL INFORMATION WITH PARALLAX SHIFT

[75] Inventor: Richard L. Malm, San Jose, Calif.

[73] Assignee: International Business Machines Corporation, Armonk, N.Y.

[21] Appl. No.: 522,434

[22] Filed: May 11, 1990

[51] Int. Cl.⁵ .................................................. G06F 5/72
[52] U.S. Cl. .................................... 395/119; 395/127; 395/140
[58] Field of Search ............... 395/119, 127, 140, 141; 358/88, 89, 90

[56] References Cited

U.S. PATENT DOCUMENTS

| | | | |
|---|---|---|---|
| 4,773,003 | 9/1988 | Hauge | 395/575 |
| 4,862,292 | 8/1989 | Enari et al. | 358/88 X |
| 4,922,336 | 5/1990 | Morton | 358/89 X |

OTHER PUBLICATIONS

Feiner et al., Visualizing n-Dimensional Virtual Worlds with n-Vision, Computer Graphics, 24(2), Mar. 1990, pp. 37-38.

Primary Examiner—Mark K. Zimmerman
Attorney, Agent, or Firm—L. Keith Stephens; Thomas R. Berthold

[57] ABSTRACT

A computer system and method utilizes depth perception on a graphic display to enhance the visualization of functional information, such as variables of an electrical circuit. A parallax shift is computed for the functional information and displayed against a background of a schematic of the circuit. This enables the values of the circuit variables to be represented by depth on the display.

2 Claims, 9 Drawing Sheets

PLOT[Abs[Zeta[1/2+I y]],
      {y,0,40} ]

SHOW[Graphics3D[Stellate[
     Icsahedron[ ]]] ]

PLOT3D[Sin[xy],{x,0,4},{y,0,4}]:

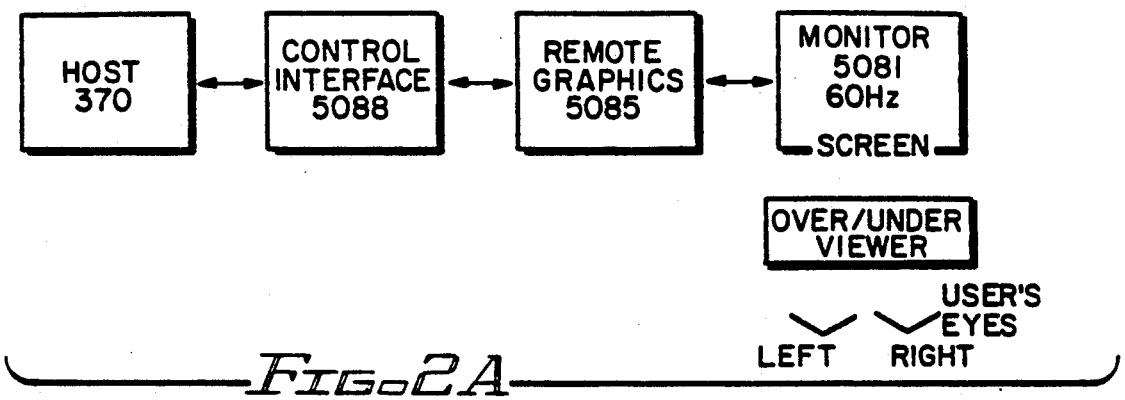
_FIG_2A_
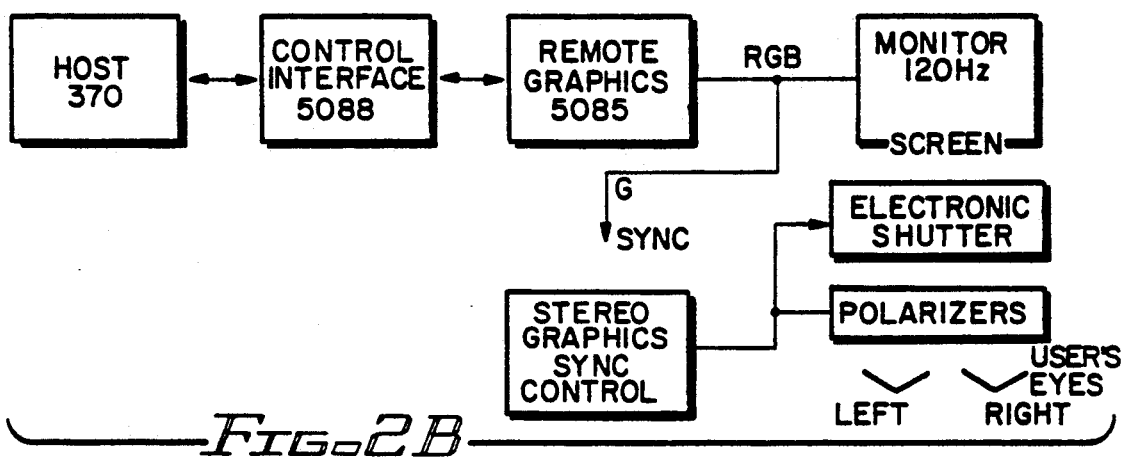
_FIG_2B_
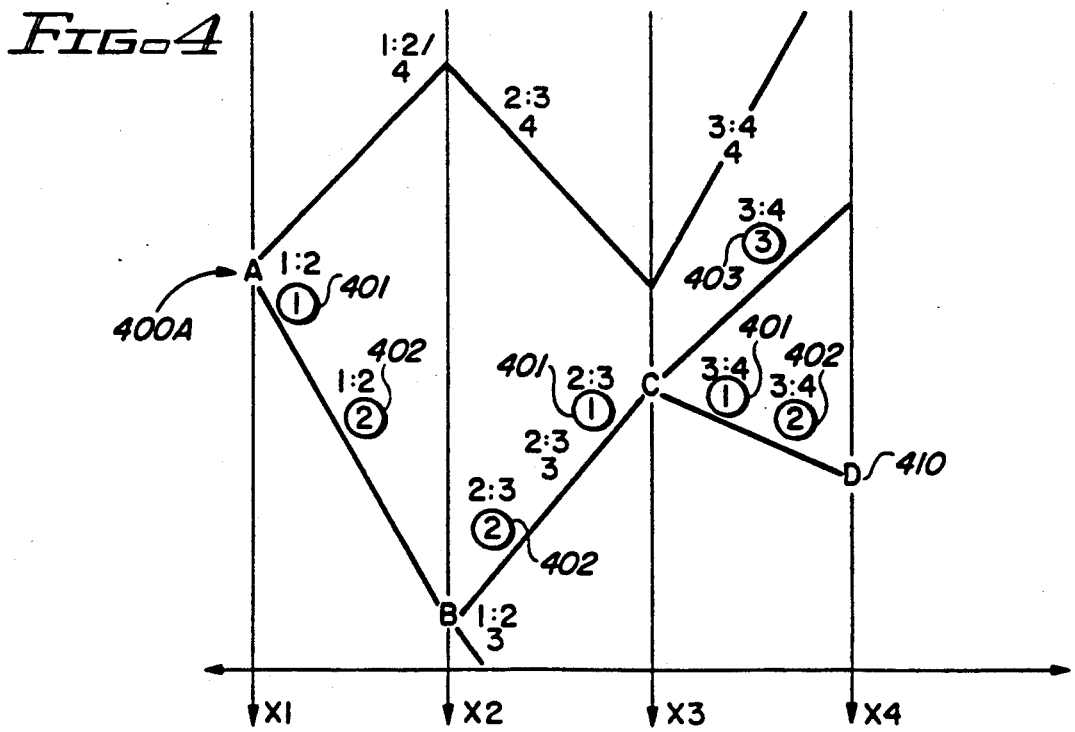
_FIG_4_

```
FOR y: = 1 TO 1024 DO /* THE y POINTS ON THE SCREEN */
BEGIN
  FOR x : = 1 TO 1024 DO /*THE x VALUES ON THE SCREEN */
  BEGIN
/*
/* PICK THE k VALUE UP FOR x,y INPUT ARRAY
/*
    k : = IN(x,y):
/*
/* COMPUTE THE PARALLAX SHIFT FOR SHIFTED IMAGE
/* HERE WE USE A LINEAR CONVERSION TO MAP THE k VALUES FROM
/* 0 TO 25 INTO THE RANGE OF 38 TO 1.
/*
    IF k < 26 THEN xs := 38-k*1.5
      ELSE
/*
/* COMPUTE THE PARALLAX SHIFT FOR SHIFTED IMAGE FOR HIGH k VALUES
/* HERE WE USE A 2ND CONVERSION TO MAP THE k VALUES FROM
/* 26 TO 255 THE RANGE OF 1 TO 0
/*
    xs := (255-k)/255* 1.5;
    IF k = 0 THEN xs := 0;
    xs := x + ROUND(xs);
/*
/* AFTER WE COMPUTE THE INDEX OF THE PEL THAT HAS BEEN SHIFTED
/* WE STORE THE VALUE IN THE OUTPUT IMAGE ARRAY (LOOKING FOR
/* SHIFTS OUTSIDE THE ARRAY)
/*
    IF xs < = 1024 THEN
      OUT(xs,y) := IN(x,y);
    END;/* DO x */
END; /* DO y */
END.
```

FIG. 11

COMPUTER SYSTEM AND METHOD FOR DISPLAYING FUNCTIONAL INFORMATION WITH PARALLAX SHIFT

FIELD OF THE INVENTION

This invention generally relates to improvements in design analysis of logic and circuit simulators and more particularly to a technique that employs depth perception to improve multi-dimensional visualization techniques to analyze and display large volumes of data more effectively.

DESCRIPTION OF THE INVENTION

Most complex scientific problems require the analysis of functions that have many variables that influence the resulting solution to the function. The subject invention facilitates the use of human pattern recognition and depth perception to understand the inter-relationships of the variables and analyze their influence on the function's behavior.

High speed logic and circuit simulators are used throughout the computer industry to aid in the design of complex systems. High performance simulators generate enormous amounts of data making storage of the information impractical. In order to pinpoint problems effectively, the information must be displayed to the designer as it is generated. However, current technology only allows the information to be presented in the form of waveforms, tables or compared to known values to detect problems.

In one embodiment of the invention, a database is employed to store the information in an organized fashion. The database is utilized to present information to the visualization program for subsequent transformation and presentation to a user.

A prior art technique for analyzing information on a computer channel is disclosed in U.S. Pat. No. 4,773,003. This patent detects a pre-selected signal line event and displays the information on a two-dimensional display for further manual analysis.

VLSI designers have difficulty trying to debug designs when a large amount of information is displayed without trend or summary information. For example, it is very difficult for a designer to analyze the effect of power-on reset within all macros. The source of a problem is often very difficult to trace to its cause. A typical network predecessor tree for the problem just described can be very large and quite deep. The tree also grows quickly to obscure the source of the problem further.

State of the art waveform displays help the designer in analyzing networks. However, they only focus on one aspect of the problem at a time and have no capability for correlating multiple functions to decipher the common source of the problem.

Graphic display programs are offered by many of the Computer Aided Design (CAD) vendors such as the Mathematica program from Wolfram Research. A standard approach plots the information on two-dimensional graph for each function of 1 or 2 dependant variables. The plots are displayed on a graphic device for further manual interrogation.

FIGS. 1A-1C show examples of prior art displays. To visualize complex problems that contain many more relationship information globally, a new approach is necessary.

Existing display techniques require the operator to mentally cross reference multiple images, analyze the information and draw an inferred conclusion. Additional time is spent processing the information and often errors result from incorrect interpretation of the information.

It is extremely difficult to identify errors when a two-dimensional display is used serially to display multiple sets of information a display at a time as illustrated in FIG. 1 at label 100. Two-dimensional perspective drawings cannot convey enough information to solve complex multi-variable problems. Just to represent a function of three variables requires the creation of a perspective drawing in two-dimensions hiding some of the information behind information in the foreground as shown in FIG. 1 at label 101. The three-dimensional perspective drawing also distorts the values of objects by representing distant objects as smaller figures.

Waveform programs are sold by many of the Engineering Design Association (EDA) vendors such as the LSIM simulator, ZYCAD, IKOS and Mentor. A standard approach plots the information on two-dimensional waveforms for each net as a function of time. The plots are displayed on a graphics device for further manual interrogation. As many as fifty nets are plotted in the vertical direction while time is plotted from an origin of zero at the extreme left-hand side.

SUMMARY OF THE INVENTION

The invention consists of a computer and graphic display system for processing large amounts of information and displaying that information graphically. Software is employed to process and display the processed information on a display. The software focuses attention to suspect areas employing depth perception to highlight the influence of a variable and display the nature of some function. Current techniques of coloring and shading techniques are unable to accurately convey the information.

The invention displays variables of interest in parallax shifts and displays the resultant function on a stereo image viewing apparatus. The technique is equally applicable to depth perception viewed using polarization, liquid crystal shutter devices or holographic images. The variable of interest can also be enhanced to highlight it in relation to other information displayed to further attenuate its characteristics.

BRIEF DESCRIPTION OF THE DRAWINGS

The foregoing and other objects, aspects and advantages of the invention will be better understood from the following detailed description of the preferred embodiment of the invention with reference to the accompanying drawings, in which:

FIG. 2 is a block diagram of the hardware environment in accordance with the invention;

FIG. 4 is an illustration of a multi-dimensional example in accordance with the invention;

FIG. 11 is a pseudo-code representation of the invention's logic in accordance with the invention.

DETAILED DESCRIPTION OF THE INVENTION

Figure 1A:
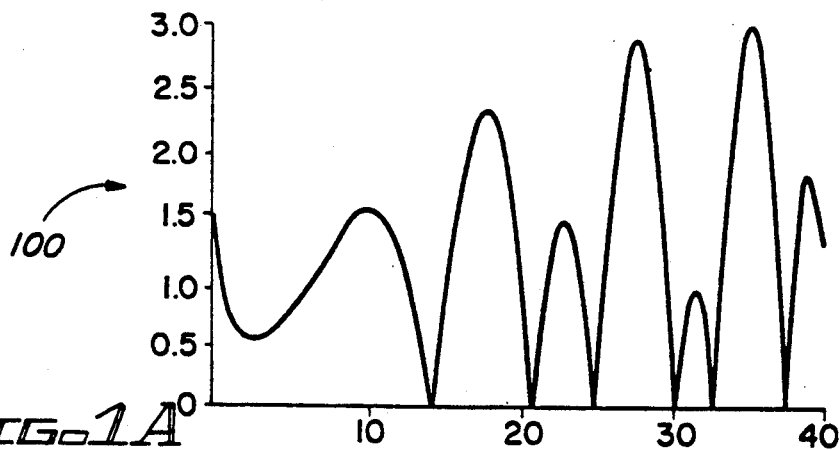
FIGS. 1A-1C illustrate prior art examples of a two-dimensional graph.
Figure 1B:
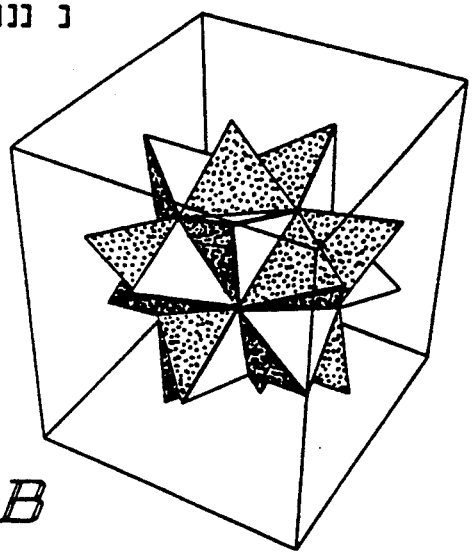
Figure 1C:
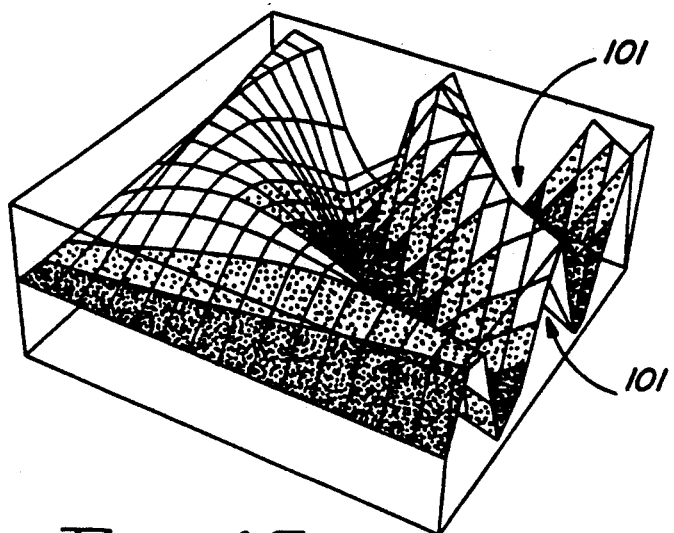

State of the art displays of mathematical functions are limited to three dimensional spatial representations displayed on a two-dimensional display or a three-dimensional stereo graphic display. Examples of three-dimensional stereo graphic displays on which the present invention can function are any of the three-dimensional systems provide by the StereoGraphics Corporation, or even simple use of the over-under viewers used with any graphics display system that has software support for displaying image windows.

Such an over/under viewer is built by Leavision in West Germany. This view can be used to enhance the display generated by the image viewing software example shown in the source listing labeled GL1DISP.

FIGS. 2A and 2B show the conventional hardware that was sued to create the 3D images shown in FIGS. 6, 7, 8, 9, 10 and 11. The hardware shown, together with the software, improves the user productivity by using stereo graphics or 3D to encode data instead of using color or shading.

Stereo graphics is different than creating a 3D image using perspective and shading. Conventional stereo graphics requires the creation of two perspective views of a subject and the use of hardware to force the left eye to see the left perspective and the right to see the right perspective. Software runs in the Host 370 or any CPU that has a graphic display attachment. The Host 370 has an internal memory connected to the CPU and typically also includes external memory, such as disk or tape drives. The four boxes in FIG. 2A, represent any standard graphics attachment environment, i.e. a Host 370, an IBM Control Interface Model 5088, an IBM Remote Graphics Adapter Model 5085, and an IBM Model 5081 Monitor. The software to support this stereo (3D) application was written for an IBM 370 host computer.

If any one of the stereo images, like FIG. 7, is displayed on the graphics screen of the Monitor, there must be some way to restrict what each eye sees. In FIG. 2A the method used requires placing before the user's eyes a commercially available Over/Under Viewer, such as is available from KMQ Corp. This forces the light from the bottom half of the image to arrive at only one eye (right) and the light from the top half of the image to arrive at the other eye (left). The Over/Under Viewer is a passive device. It is just a simple prism in front of each eye that redirects the light beams. The Over/Under Viewer also blocks all light rays from the part of the image that each eye should not see. The right eye should not see any part of the left image which is at the top of the screen image (see FIG. 7, 701 is top 702 is bottom). The Over/Under Viewer results in the two different images appearing to be overlapped and in 3D.

FIG. 2B shows the same Host 370 and graphics attachment, but the Monitor is 120 Hz instead of 60 Hz. The net result is that the "top" and "bottom" part of the image that was described in FIG. 2A are now overlapped by the hardware and the "viewer" hardware is now an active device. The viewer is a commercially available Electronic Shutter/Polarizer controlled by a StereoGraphics Sync Control which receives input from the RGB signal. The Electronic Shutter is controlled electronically and is in sync with the Monitor frame rate. The electronic Shutter blocks the light arriving at each eye to make sure that the right eye only sees the right image and the left eye only sees the left image. Electronic Shutter hardware is built by several companies that will take input from the Monitor input. In the example the hardware built by the Stereo Graphics company takes the RGB signal in. A voltage controlled Electronic Shutter electronically makes each alternating eye unable to see the graphics screen in sync with the Monitor frame rate. The Electronic Shutter results in the two different images appearing to be overlapped and in 3D without distortion.

The natural human visual system uses differences in horizontal retinal images to interpret depth. By exploiting this natural way of understanding reality or models of reality, a mathematical system is easier to understand resulting in a productivity improvement.

This invention improves efficiency for human thought in both research, development, and manufacturing processes where multi-dimensional functions require monitoring and analysis. By way of example, we can explore the simple model of the mandelbrot closed system of $k^{**}2+c$ in the complex number plane. The discussion commences with an analysis of a mathematical system having varying rates of acceleration to infinity.

Figure 9:
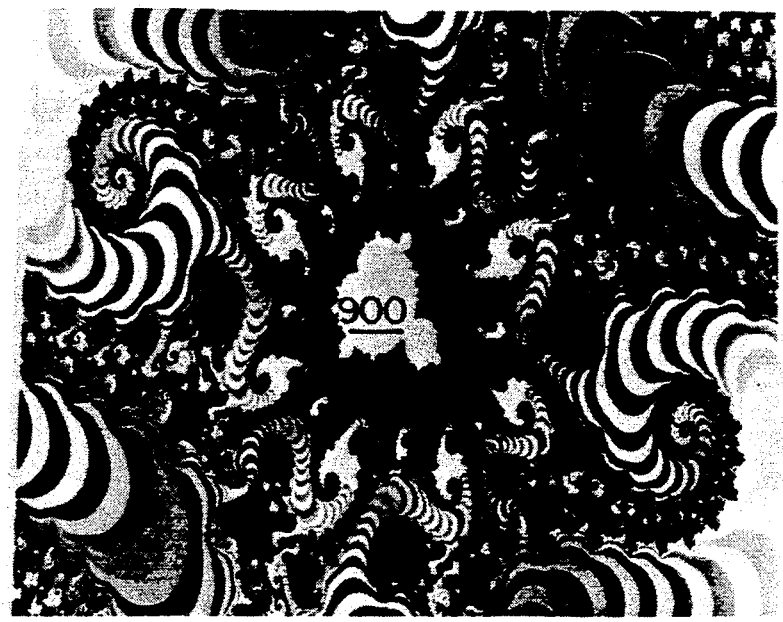
FIG. 9 is an illustration of a graphic display employing depth perception to represent a mathematical system in the complex x,y number plane in accordance with the present invention.
Figure 10:
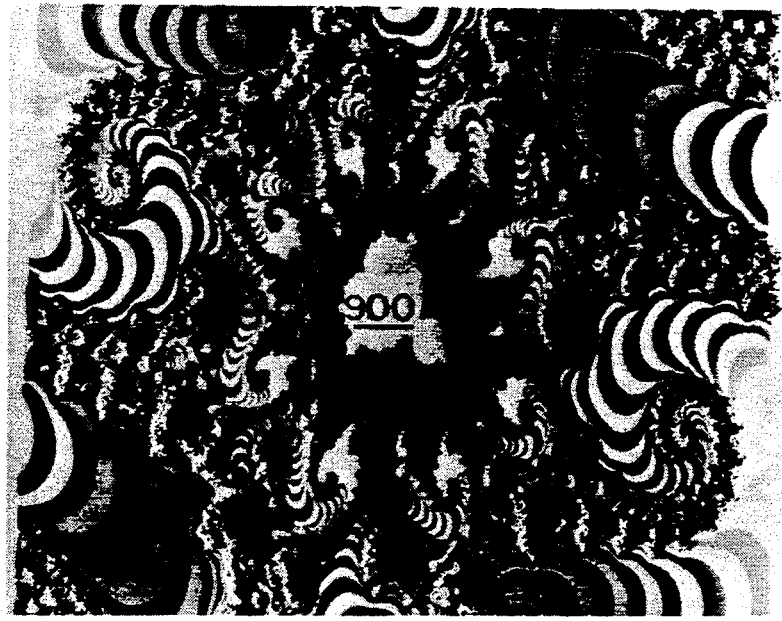
FIG. 10 is an illustration of a graphic display employing depth perception to represent a mathematical system in the complex x,y number plane in accordance with the present invention.

In a two-dimensional image it is extremely difficult to ascertain critical points where the values are changing (increasing or decreasing), or to determining the rate of change of a variable of interest. Referring to FIG. 9 & 10, a multi-dimensional display of the mandelbrot function in accordance with the invention is provided.

To experience the three-dimensional effect, a user could stare at FIGS. 9 and 10 and notice how the image depth changes. Then, view the example with one eye. A variable of interest can be encoded as depth directly or can be modified by a specific mathematical equation that will make the function more apparent in the space of depth. The human retina has a range of parallax values that range from the maximum (to keep eyes from divergence) to the minimum distance that will show any depth.

The invention maps the variable of interest into this range of values and then modifies the rate of change of the values based on a particular feature of interest. The technique can be activated by detection of a variable's rate of change outside of acceptable parameters to highlight the variable and provide more detail to the viewer.

FLOWCHART AND CODE EXAMPLE

Figure 3:
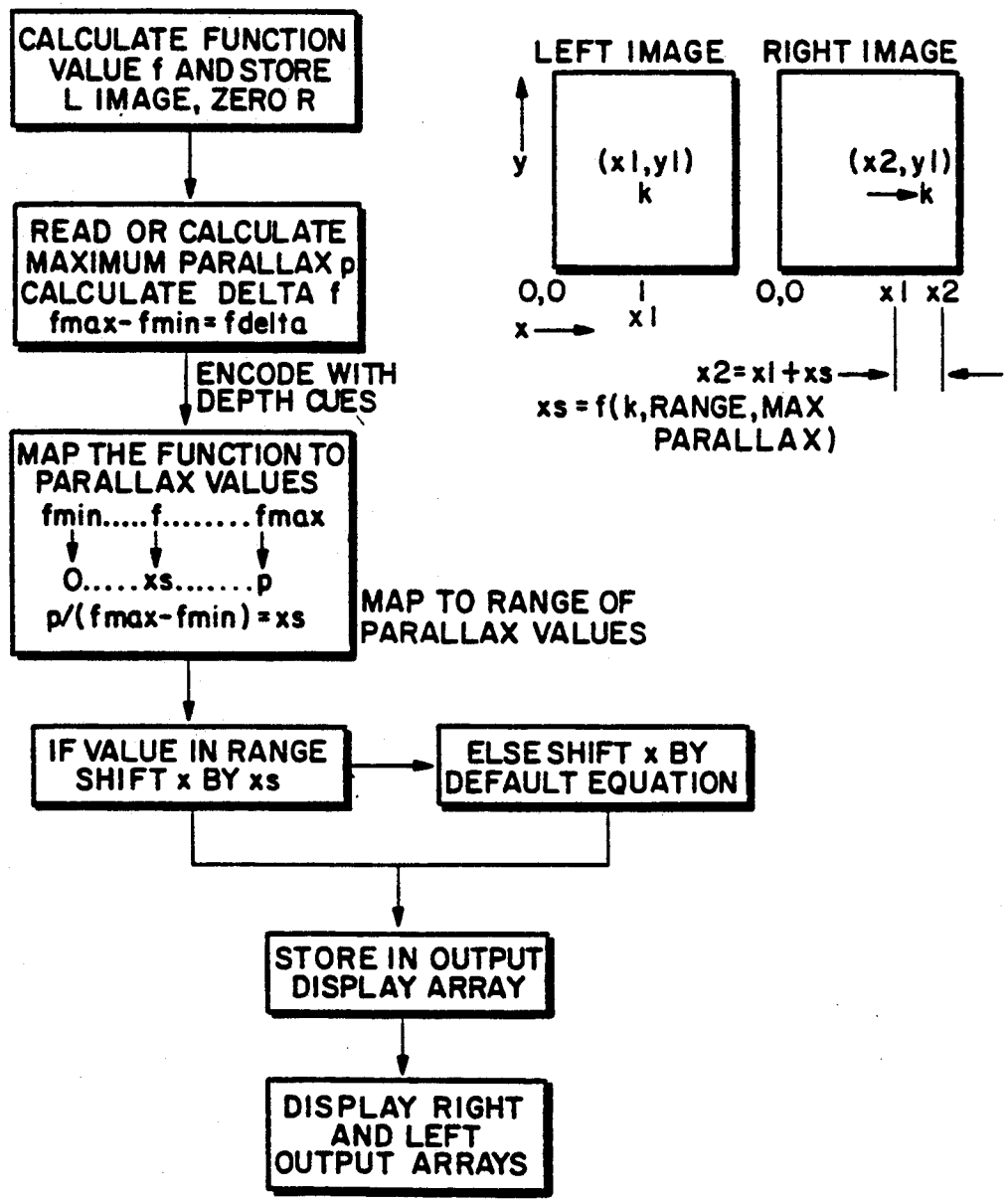
FIG. 3 is a flowchart of the logic in accordance with the invention.

Let's assume we want to map a simple function value $k=f(x,y)$ as depicted in the flowchart of FIG. 3 and the Pascal language pseudo-code of FIG. 11. The program assumes that the output array is initially set to 0, and the maximum parallax value is preset. The function values for the k entries in the 1000×1000 array are read into the array and mapped to a display screen.

Assume for our screen of interest that the maximum parallax shift for the stereo display is 38 pels which is approximately 2 degrees of parallax at a normal viewing distance. A color table is used to map the function onto the display and has already mapped its value into some color table.

For example, if the system can display 25 colors one might assign each color to a range of k values. The values of interest are the k values between 1 and 25.

Then each k value could have a different color. The color selection is only important in that it can cause some depth sensation. (red closer and blue farther away.) A key assumption is: one needs to create shapes that stand out and are common in the right and left eye image.

Shades of gray can substitute for colors, or, alternatively, fill patterns, such as black and white line drawings that outline the areas that have the same value of k can be employed.

To explore complex functions of n variables one can also use a system of parallel coordinates. In parallel coordinates one creates n copies of real lines labeled X1, X2, X3 ... Xn placed equidistant and perpendicular to the normal x axis. (See FIG. 4 and 5)

A set of touching line segments connecting the vertical axis represents a "point" in the n-dimensional space. For example the point (A,B,C,D). A is 400 and D is 400. A "line" in n-dimensional space is represented by a set of points on the parallel coordinate display, one for each pair of coordinates.

In parallel coordinates, if "lines" intersect in one "point", all the parallel coordinate segments that represent that "point" overlay on the two-dimensional plot.

"Line" one 401 and "line" two 402 do intersect at the "point" (A,B,C,D). The problem occurs when you add more "lines" which may have subset of overlapping parallel coordinate line segments but the "lines" may not intersect. The parallel coordinate points may also lie anywhere in the two dimensional plane making it necessary to label every point to understand which line they correspond to. One solution employs the invention to encode each set of segments with the minimum line separation as depth. Thus, "line" one 401 and "line" two 402 occupy the same depth since they intersect at (A,B,C,D). Finally, line three 403 is at a different depth and would be perceived as distinct from lines one 401 and line two 403.

Several variables can be encoded with depth cues at the same time. For example, if the function represented a closed shape you might display the selected point behind the graph if it was outside the shape and in front of the graph if the point is inside the shape and the actual depth from a center point could represent distance from the surface of the function.

Figure 5:
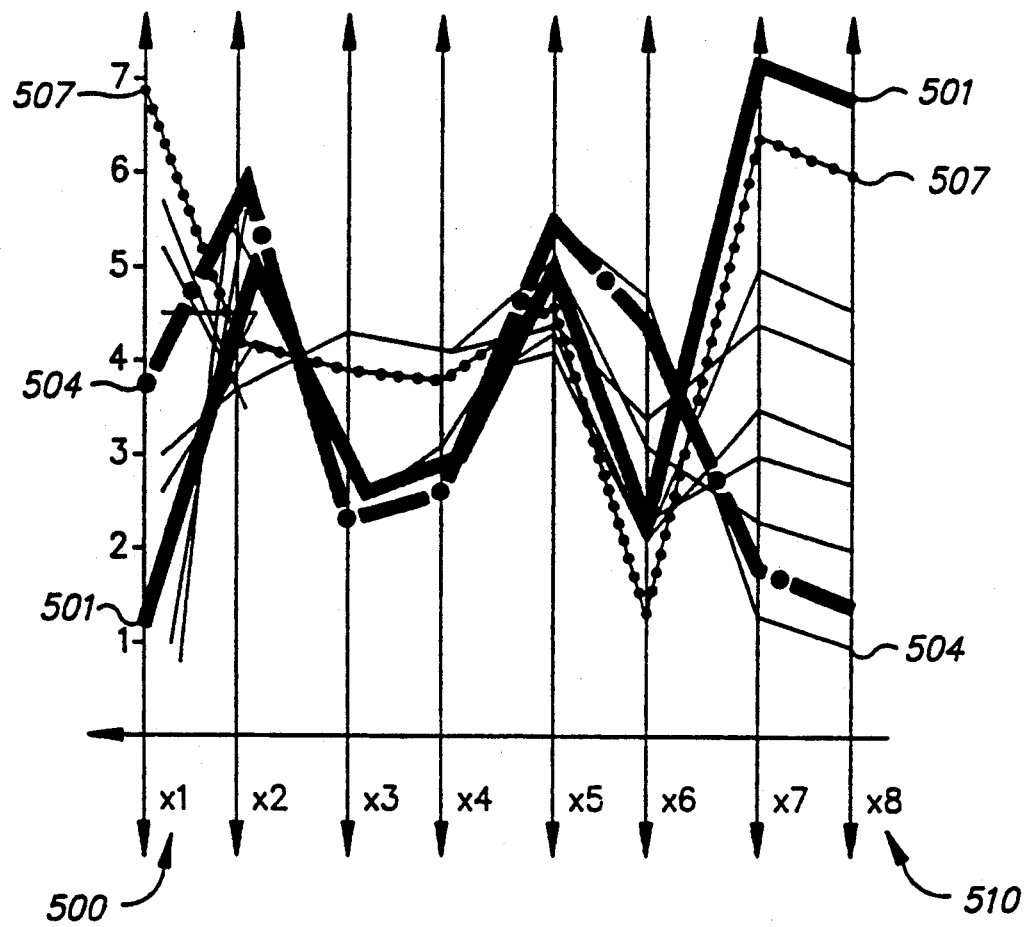
FIG. 5 is another multi-dimensional example in accordance with the present invention.

FIG. 5 illustrates another problem that could be overcome in the display of an n-dimensional function to study the affect of one variable on a plurality of other variables. The parallel coordinate representation could be an envelope making the overall affect indeterminate. However, if each "point" that is a solution to the function is displayed at a depth, (by mapping the variable value x1 into parallax shifts) then the relationships to other variables would be clearly portrayed without having to trace specific solution points. In two-dimensions it is impossible to detect how a variable would react to a positive change in X1 without close examination of the specific values.

The invention enables a user to ascertain patterns, such as increases in X1 correlating to corresponding decreases in X8 depth. Take this example and imagine that X1=1 501 is located far away, then the corresponding points in the set of line segments labeled 501 will be at the same depth. Now X1=4 504 is closer to us in depth and finally X1=7 507 appears to be very close.

On the X8 axis 510 the encoding of X1 in depth overlayed on the X8 values is possible without moving the X1 axis next to the X8 axis and without having to encode the line segments or "points" in color.

FEATURES

Some features of the invention and the method of operation are discussed below.

1. Encoding a variable of interest with depth queues.
   a. Getting the function output variable value f;
   b. Plotting the value f in the left image as a point in two-dimensional space;
   c. Calculating a parallax value from the depth function required:
      parallax value=f(dependant variables or output value)
      So, for example: parallax maximum * (output value/max output value)
   d. Checking thresholds to determine if maximum values have been exceeded;
   e. Shifting the two-dimensional horizontal position based on the parallax value; and
   f. Plotting a value in the right image as a point in two-dimensional space.
2. Mapping a variable of interest to range of parallax values:
   a. Finding the total range of the output variables;
   b. Inputing a user distance from screen;
   c. Using a range of allowed parallax values; and
   d. Calculating a ratio of output change to the parallax value.
3. Enhancing variable characteristics with non-linear mapping:
   a. Encoding variables of interest with depth queues using a non-linear function for parallax value calculation; and
   b. Setting the output function to a function that increases exponentially. Then, the parallax mapping could take to log parallax value=parallax max * log(output value)/log(max output).

This technique eliminates data hiding or distortion and the requirement for hidden line or surface hiding to create depth. Lines drawn that appear farther away do so because of parallax. Color or texture is not required for data value encoding since depth is used instead. Therefore color and texture can be used for other kinds of data grouping. This technique exploits stereo graphic or holographic display techniques and creates a more natural way of viewing depth.

APPLICATION

These new functions have been useful in implementing VLSI design display programs to understand design problems with placing circuits on a card or chip. An undistorted x,y location plot of the physical card or chip is created and displayed first. Then, the other variables, like power and current flow and direction for the entire x, y space is displayed. The depth is used to highlight the value of the power and/or current to attenuate changes.

Thus, the limitation of a physical x,y or x,y,z space is removed and the function of interest can have an unlimited number of variables.

The natural human visual system uses differences in horizontal retinal images to interpret depth. Mathematical systems can similarly employ depth perception to enhance user perception of difficult mathematical models. This idea, which is central to the subject invention, provides improved efficiency for human thought and can be used by research, development and manufacturing processes where multi-dimensional functions need to be studied or monitored.

By way of example, we can explore the simple model of the mandelbrot closed system of $k^{**}2+c$ in the complex number plane. The discussion commences with an analysis of a mathematical system having varying rates of acceleration to infinity. A two-dimensional image makes detection of critical points extremely difficult. Referring to FIG. 9 and 10, a multi-dimensional display of the mandelbrot function in accordance with the invention is provided.

To experience a two-dimensional effect, stare at the drawing and notice how the depth of the image changes. Then, view the example with a single eye open. A variable of interest can be encoded as depth directly or can be modified by a specific mathematical equation that makes the function more apparent in the space of depth. The human retina has a range of parallax values that range from the maximum (to keep eyes from divergence) to the minimum distance that will show any depth.

The invention maps the variable of interest into this range of values and then modifies the rate of change of the values based on a particular feature. This technique can be activated by detection of a variable's rate of change outside of acceptable parameters to highlight the variable and provide more detail to the viewer.

Several variables can also be encoded with depth cues at the same time. For example, if the function represented a closed shape you might display the selected point behind the graph if it was outside the shape and display the selected point in front of the graph if the point is inside the shape. Further, the depth from a center point could represent the distance from the surface of the function.

FIG. 5 illustrates another problem that could be helped is the display of a n-dimensional function where on is interested in the affect of one variable on the others. The parallel coordinate representation might just be an envelope and one could not see the overall affect. If each point that is a solution to the function is displayed at a depth (map the variable value x1 500 into parallax shifts) then the relationships to other variables instantly appear without having to trace out specific solution points.

In two-dimensions you cannot tell how X8 510 will react to a positive change in X1 500 without careful examination of the specific values. Using the invention, a pattern can be ascertained, like as X1 500 increases in depth X8 510 decreases then increases.

USE OF THE INVENTION

The invention can be used with any graphics application that has multi-dimensional characteristics. IBM currently uses the invention as part of a general graphics shape browser on a System/370 with an attached 5080 graphics display system. The source code listing of the IBM graphics program employing the inventive techniques is provided below in the Appendix.

Figure 6A:
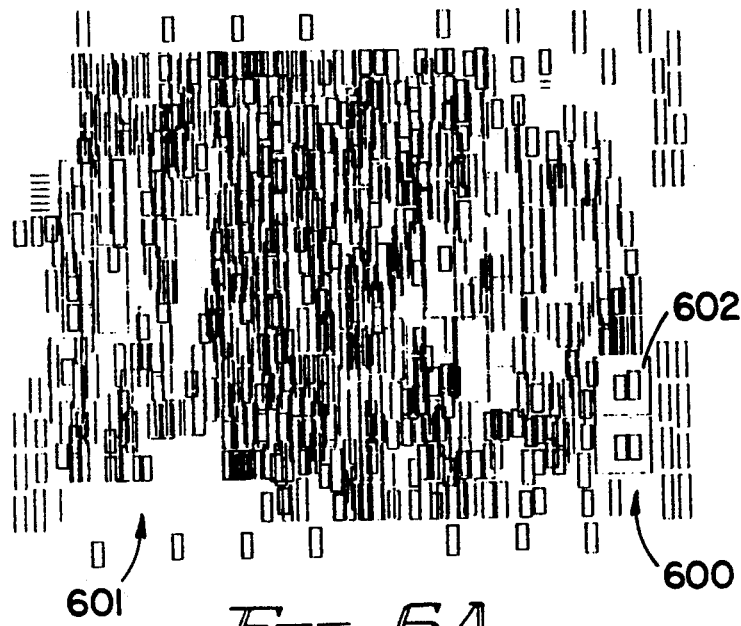
FIGS. 6A-6B are an illustration of a graphic display employing depth perception to represent heat generation on a personal computer card in accordance with the present invention.
Figure 6B:
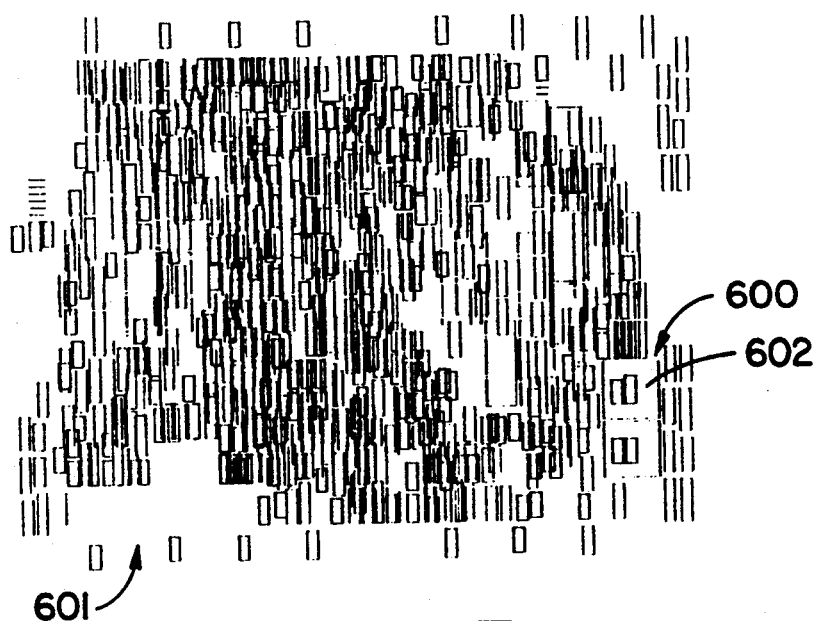

The techniques are used to analyze heat generation on a simulated printed circuit (PC) card as shown in FIGS. 6A-6B. FIG. 6A shows the left image and FIG. 6B shows the right image. The left image is on the top half of the page. In each image, hundreds of rectangles each represent a circuit module on the card. The heat generated by each module is encoded in depth while the color encodes the circuit types. For example the modules 601 are the control PLA modules and the large square modules 600 in the lower right are floating point chips.

A user can verify depth is encoded by using a three-dimensional viewer. Alternatively, without a viewer, a user can focus on a specific rectangle in the left image and comparing it with a specific pair of lines in the right image one can see X shifts which are the parallax values used to encode the depth. In FIG. 6 compare the left and right image, and notice the larger two squares in the lower right of each image and compare with the position of the rectangles that are within the squares 602.

Figure 7A:
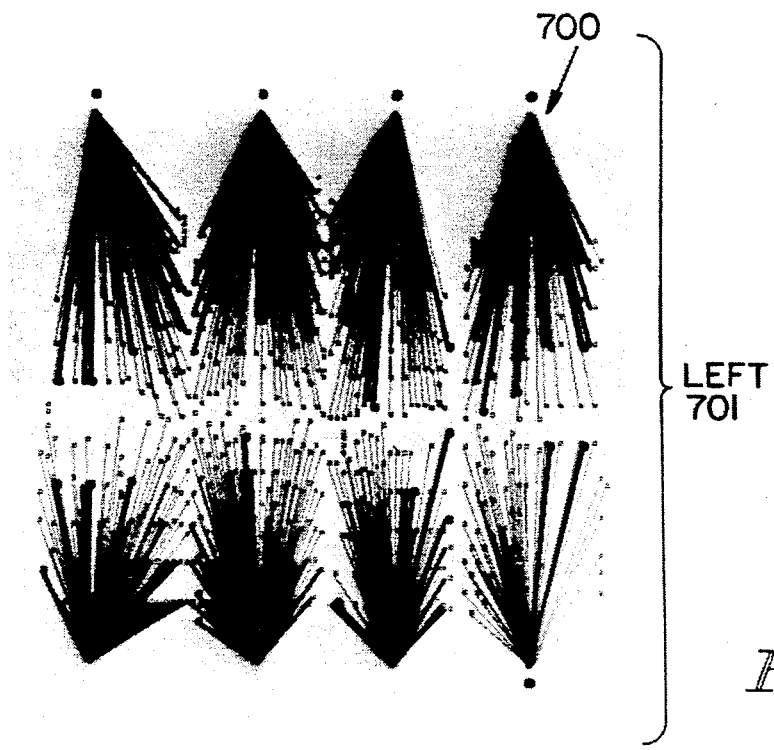
FIGS. 7A-7B are an illustration of a graphic display employing depth perception to represent current utilization, on a personal computer card in accordance with the present invention.
Figure 7B:
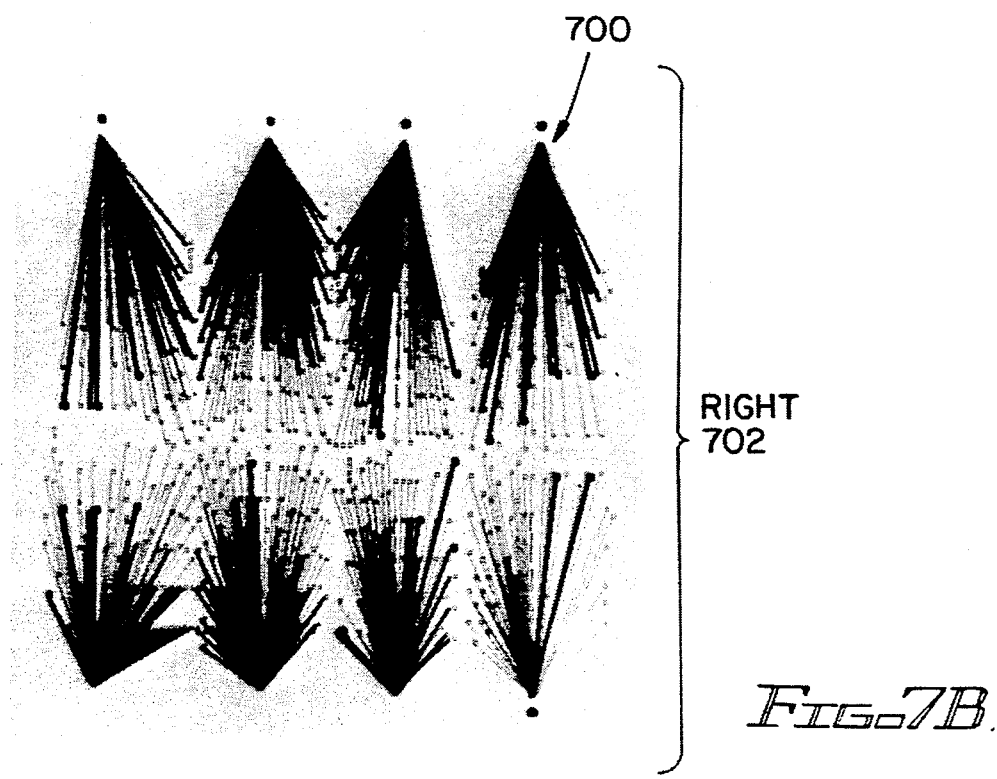

The inventive techniques are used to analyze current flow on a simulated PC card as shown in FIGS. 7A-7B. FIG. 7A shows the left 701 and FIG. 7B the right images 702. The left image is on the top half of the page. Each image has eight focal points 700 that represent where the external power attaches to the card. The current flows from a connector point in the shape of a cone.

Each line is drawn from a module to a power connection and the size of the current is encoded in depth. The line depth is a function of module current flow and ranges from low power modules to high power modules.

Figure 8A:
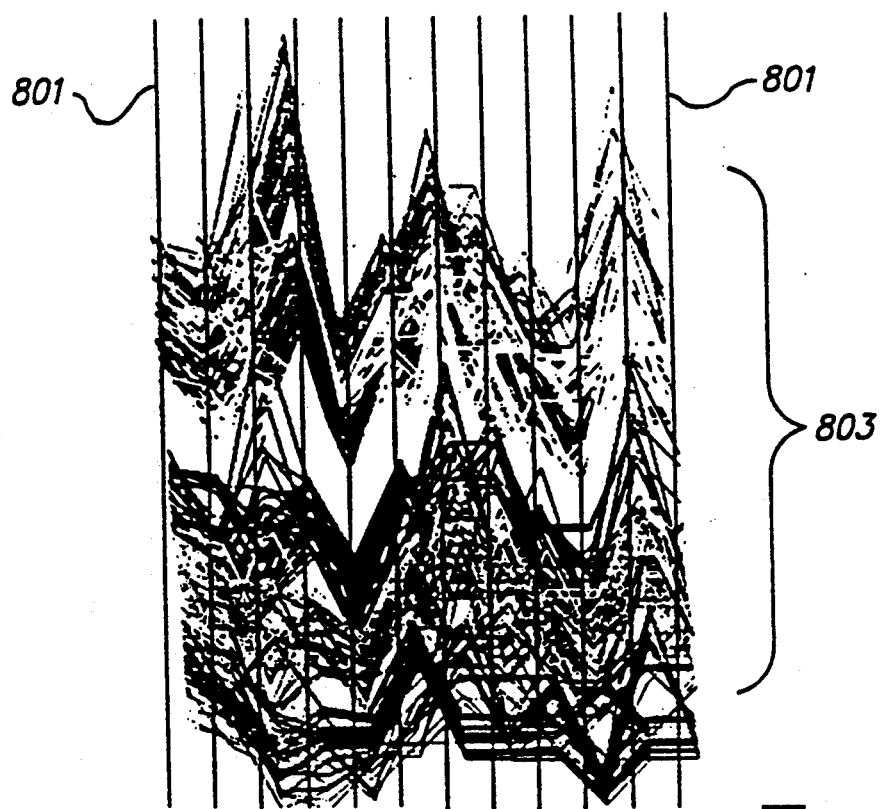
FIGS. 8A-8B are an illustration of a graphic display employing depth perception to represent chip wiring overflows, wire lengths and wire weights in accordance with the present invention.
Figure 8B:
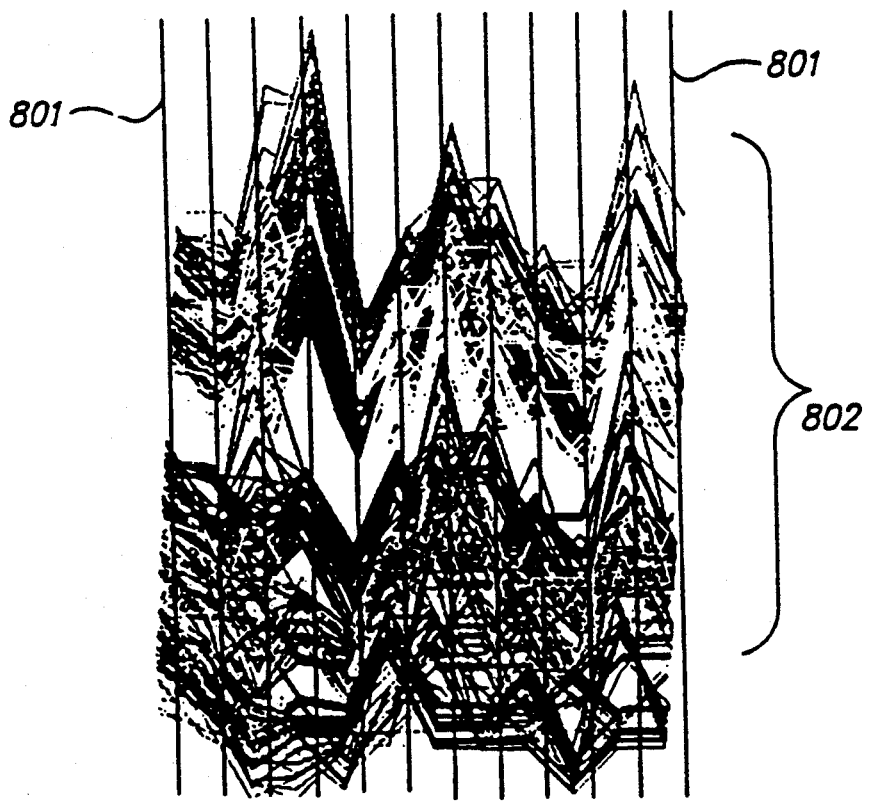

FIGS. 8A-8B are an illustration of a graphic display employing depth perception to represent chip wiring overflows, wire lengths and wire weights in accordance with the present invention. FIG. 8A shows the left image and FIG. 8B shows the right image. The lines at the bottom have a depth that is at one end of the parallax range 802 and the group of red lines at the top 803 are at the opposite end of the parallax range. One can verify this by comparing the horizontal position of like points in each image with the vertical axis lines 801.

FIGS. 9 and 10 illustrate a graphic display employing depth perception to represent a mathematical system in the complex x,y number plane in accordance with the present invention. FIG. 9 is the left image and FIG. 10 is the right image. Again one can view these Figures with an over/under view or a side by side stereo viewer.

Each x,y point represents a point in the complex number plane. The value of the system at each point is encoded in depth. The white area labeled 900 in the center is the farthest point away while the shapes at the border are closer to the viewer.

While the invention has been described in terms of a preferred embodiment in a specific system environment, those skilled in the art recognize that the invention can be practiced, with modification, in other and different systems within the spirit and scope of the appended claims.

APPENDIX

SOURCE CODE

PROGRAM MANF

```
      PROGRAM MANF
C*----------------------------------------------------------------
C*Example of using parallax shift to aid in the analysis of a function
C*by using depth to encode the value of the function
C ------------------------------------------------------------*
C ------------------------------------------------------------*
C  Let the color monitor have A+1 times B+1 points and KMAX+1 colors. *
C  Color 0 is black.                                                  *
C ------------------------------------------------------------*/
      IMPLICIT REAL*8 (A-H,O-Z)
      DIMENSION IFIL(1000)
      DIMENSION IFIR(1000)
      IA = 1000
      IB = 1000
      M = 100.0
      KMAX = 255
C OUTREC = PACKED ARRAY (.0..A.) OF CHAR
C IFIL:FILE OF OUTREC
C ------------------------------------------------------------*/
C     MANDEL MAIN PROGRAM To create the function output        */
C ------------------------------------------------------------*/
C     MAP =     22
C     KMIN=      4
C     KMX=      19
C ------------------------------------------------------------*/
C     Select the area, and parallax maping constants           */
C ------------------------------------------------------------*/
      MAP =     42
      KMIN=    142
      KMX=     150
      PMX =     25
      PMN =      5
      WRITE(6,*) ' KMIN=',KMIN,' KMX=',KMX,' PMX=',PMX
      SLOPE = (PMX-PMN) / (KMX - KMIN)
      ESLOPE =      PMN*KMX*KMX
      YC    = SLOPE * KMAX + PMN
      WRITE(6,*)           'SLOPE=',SLOPE,'  YC=', YC
      WRITE(6,*)           'ESLOPE=',ESLOPE,' PMN=',PMN
C     WRITE (6,*)'ENTER PARMS'
C     READ (5,*)PARMS
C     IF (MAP .EQ. 0 ) THEN
C     MAP =     22
C     ENDIF
C
```

```
C -----------------------------------------------------------------*/
C  STEP 0, Select the Mandel image of interest                     */
C  CHOOSE PMIN, PMAX, QMIN, QMAX, M = 100.                         */
C -----------------------------------------------------------------*/
      IMAP=9
      GOTO(22,23,25,29,32,34,36,38,39,42,43),IMAP
23    PMIN = -0.19920
      PMAX = -0.12954
      QMIN = 1.01480
      QMAX = 1.06707
      GOTO 50
22    PMIN = -2.25
      PMAX = 0.75
      QMIN = -1.5
      QMAX = 1.5
      GOTO 50
34    PMIN = -0.74758
      PMAX = -0.74624
      QMIN = 0.10671
      QMAX = 0.10779
      GOTO 50
36    PMIN = -0.74591
      PMAX = -0.74448
      QMIN = 0.11196
      QMAX = 0.11339
      GOTO 50
25    PMIN = -0.95
      PMAX = -0.88333
      QMIN = 0.23333
      QMAX = 0.3
      GOTO 50
29    PMIN = -1.781
      PMAX = -1.764
      QMIN = 0.0
      QMAX = 0.013
      GOTO 50
32    PMIN = -0.75104
      PMAX = -0.7408
      QMIN = 0.10511
      QMAX = 0.11536
      GOTO 50
39    PMIN = -0.745468
      PMAX = -0.745385
      QMIN = 0.112979
      QMAX = 0.113039
      GOTO 50
42    PMIN = -0.7454356
      PMAX = -0.7454215
      QMIN = 0.1130037
      QMAX = 0.1130139
      GOTO 50
```

```
43      PMIN = -0.745430100
        PMAX = -0.745428900
        QMIN = 0.113007600
        QMAX = 0.113008500
        GOTO 50
38      PMIN = -0.74553800
        PMAX = -0.74505400
        QMIN = 0.11288100
        QMAX = 0.11323600
50      CONTINUE
        WRITE (6,*)  'MANDELBROT MAP' ,MAP
        WRITE (6,*)  'PMIN,PMAX=',PMIN,PMAX
        WRITE (6,*)  'QMIN,QMAX=',QMIN,QMAX
C
        DELP = (PMAX-PMIN)/IA
        DELQ = (QMAX-QMIN)/IB
C
        WRITE (6,*)  'DELP,DELQ=',DELP,DELQ
C ---------------------------------------------------------------------*/
C   FOR ALL POINTS (NP, NQ) OF THE MONITOR, GO THROUGH THE FOLLOWING   */
C   ROUTINE:                                                           */
C ---------------------------------------------------------------------*/
        MFLOP=6
        DO 100 NQ = 1,IB
C          (NQ MOD 50) = 0 THEN
C       WRITE (6,*) 'NQ=',NQ,MFLOP
        Q0 = QMIN + NQ*DELQ
        MFLOP=MFLOP+3
        DO 201 NP = 1,IA
201     IFIR(NP) =   0
        DO 200 NP = 1,IA
C ---------------------------------------------------------------------*/
C  STEP 1                                                              */
C  SET P0 = PMIN + NP*DELP, Q0 = QMIN + NQ*DELQ, K = 0, X0 = 0, Y0 = 0 */
C ---------------------------------------------------------------------*/
        P0 = PMIN + NP*DELP
        MFLOP=MFLOP+2
        K = 0
        X = 0.0
        Y = 0.0

C ---------------------------------------------------------------------*/
C    STEP 2. This is the function f(x,y) being evaluated.              */
C    CALCULATE (XK+1, YK+1) BY MEANS OF (2) K = K+1                    */
C ---------------------------------------------------------------------*/
C      REPEAT
10      XSQ = X * X
        YSQ = Y * Y
        RNEWX = XSQ - YSQ + P0
        RNEWY = (2 * X * Y) + Q0
```

```
C  THE NEWX AND NEWY ARE THE RESULT OF COMPLEX NUMBER MULTIPLY*/
C  IE Z**2+C WHERE Z=X+IY AND C=P +IQ                        */
       R = XSQ + YSQ
       MFLOP=MFLOP+8
       K = K+1
       X = RNEWX
       Y = RNEWY
C -----------------------------------------------------------*/
C    IF R>M, THEN CHOOSE COLOR K AND GO TO STEP 4.            */
C    IF K = KMAX, THEN CHOOSE COLOR 0 (BLACK) AND GO TO STEP 4.  */
C    OTHERWISE, REPEAT STEP 2.                                */
C -----------------------------------------------------------*/
       IF (R .GT. M) THEN
         NVAL = K
         GOTO 300
       ENDIF
       IF (K .EQ. KMAX) THEN
         NVAL = 0
         NVAL = ITEMP
         GOTO 300
       ENDIF
       GOTO 10
C -----------------------------------------------------------*/
C    STEP 4.  This sets the value to be mapped to parallax value  */
C    ASSIGN COLOR K TO POINT NP, NQ AND GO TO NEXT POINT (STEP 1).  */
C -----------------------------------------------------------*/
300    IFIL(NP) =   NVAL * 65536 * 256
C -----------------------------------------------------------*/
C    STEP 5.  This does the shifting of with 2 different equations  */
C -----------------------------------------------------------*/
       IF (NVAL .LT. KMIN) THEN
         NRS = PMX
       ELSE
C -----------------------------------------------------------*/
C    This is the linear decreasing map of parallax values     */
C -----------------------------------------------------------*/
       IF (NVAL .LT. KMX)  THEN
         NRS = YC - NVAL*SLOPE
       ELSE
C -----------------------------------------------------------*/
C    This is the non linear maping where we divide by the sq of the vat*
C -----------------------------------------------------------*/
       IF (NVAL .LT. KMX*2)  THEN
         NRS  = ESLOPE/(NVAL*NVAL)
       ENDIF
       ENDIF
       ENDIF
       IF (NVAL .EQ. 0) THEN
         NRS = 0
       ENDIF
       NS   = NP  +   NRS
```

```
C       WRITE (6,*) 'NVAL=',NVAL,'NRS=',NRS
        IF (NS .LE. IA)    THEN
          IFIR(NS) =   IFIL(NP)
C       WRITE (6,*) '+NRS ',NRS
C       WRITE (6,*) '=NS =',NS
        ENDIF
200     CONTINUE
C  DO NP END
        WRITE(7,410) IFIL
        WRITE(8,410) IFIR
410     FORMAT (255A1,255A1,255A1,255A1)
100     CONTINUE
C  DO NQ */
        WRITE (6,*) 'FINISHED   MAP' ,MAP,' MFLOP=', MFLOP

STOP
        END
/* Goal is create a n dim plot of a function               */
/* and then use depth perception allow view to SEE the     */
/* function value instead of creating many two dimensional plots   */
/*Parse UPPER arg FN FM FT
Say "Processing" FN FT FM "STATE " FN FT FM
IF RC   = 0 Then Do
 Say FN FN FM           "Was not found, *******"
/* exit*/
 End */
FN = "NDIM"
"Erase NDIM    GL1HRI A"
"EXECIO *  DISKR NDIM QUAD A 1    (FINIS STEM LIST."
Say list.0 "lines to plot"
WRITED= "EXECIO 1 DISKW DEBUG GL1HRI  A    0 V 72 (STRING"
WRITE = "EXECIO 1 DISKW NDIM  GL1HRI  A    0 V 72 (STRING"
WRITE   "'7001',"
WRITE   "'7212',1,1,"
WRITE   "'7611',0,0,18000,14000,9000,7000,"
WRITE   "'7424','NDIM',1, "
TEMP.1="L00"
TEMP.2="L0"
TEMP.3="L"
 WRITE   "'7324','LABEL',0,"
"erase "FN" 5080CLRS   A  "
WRITEC= "EXECIO 1 DISKW "FN" 5080CLRS   A    0 F 80 (STRING"
WRITEC "L0    = P1   T1   PC7   TC9   D50 LABEL"
colordel = Format( List.0 /   4,10,0)
depthdel = Format( List.0 / 100 , 10,0)
color = 1
depth = 0
colortest = 0
depthtest = 0
```

```
Do I = 1 to LIST.0
 colortest = colortest + 1
 depthtest = depthtest + 1
 If colortest > colordel then do
  color = color + 1
  colortest = 0
 end
 If depthtest > depthdel then do
  depth = depth + 1
  depthtest = 0
 end
 LENI=LENGTH(I)
 LEV=TEMP.LENI||I
 WRITE  "'7324','"LEV'","I","
 Writec "L"||Left(I,5)"= P1  T1  PC"Left(color,3)"TC9    D"Left(Depth,3)lev
/*        L2     = P1  T1  PC1  TC9   D2   L002 */
 End
Do I = 1 to 600
 LENI=LENGTH(I)
 LEV=TEMP.LENI||I
 WRITE  "'7324','"LEV'","I","
 End
WRITE  "'6112',1,"
topdim   = 9
spacex   = 300
spacey   = 100
max = 0
Do i = 1 to topdim
 Px.i = i * spacex
 End i
Do l = 1 to List.0
Parse var List.l x.1 x.2 x.3 x.4 x.5 x.6 x.7 x.8 x.9
    Lev=l
    LEV=Format(Lev,3,0)
    WRITE   "'1111',"LEV","topdim","
    Do n = 1 to topdim
     y.n = x.n * spacey
     y.n=Format(y.n,5,0)
     if y.n > max  then max = y.n
     WRITE  "   "Px.n","y.n","
     End n
    WRITE  "    0 ,"
    End l
Say "max y is" max
max=max+200
WRITE "'5111',0 , 350,"max",40,40,0,1,'a ',"
WRITE "'5111',0 , 650,"max",40,40,0,1,'b ',"
WRITE "'5111',0 , 950,"max",40,40,0,1,'c ',"
WRITE "'5111',0 ,1250,"max",40,40,0,3,'alpha ',"
WRITE "'5111',0 ,1550,"max",40,40,0,3,'beta  ',"
```

```
WRITE  "'5111',0 ,1850,"max",40,40,0,1,'x1',"
WRITE  "'5111',0 ,2150,"max",40,40,0,2,'y1i ',"
WRITE  "'5111',0 ,2450,"max",40,40,0,1,'x2',"
WRITE  "'5111',0 ,2750,"max",40,40,0,2,'y2i ',"
WRITE  "'5111',0 , 0,"max+400",50,50,0,17,'   (b +- SQRT (b**2-4ac))/2a      ',"
WRITE  "'5111',0 , 0,"max+200",50,50,0,17,'alpha +- SQRT(alpha**2-beta**2)',"
WRITE  "'1111',0,2,0,0,2700,0,0,"
nmax=0-max
Do i = 1 to topdim
WRITE   "'1111',0,2,"Px.i","max","px.i","nmax",0,"
 End i
WRITE   "'7911',"
"GL1HRI  NDIM     GL1HRI A"
"FCOPY GL1HRI OUT A NDIM   GL1 A (REP"
/*
"Erase  NDIM    GL1HRI A"
*/
/* Goal is create a n dim plot of a function 12 var         */
/* the cap values and delay values of cmos circuits         */
/* or wire lengths                                          */
/* and then display them in 3D to take advantage of         */
/* human depth perception to analyze the multi values       */
FN = "NDIMW"
"Erase NDIMW   GL1HRI A"
"EXECIO *  DISKR NDIMW WIRE A 1    (FINIS STEM LIST."
Say list.0 "lines to plot"
WRITED= "EXECIO 1 DISKW DEBUG GL1HRI   A    0 V 72 (STRING"
WRITE = "EXECIO 1 DISKW NDIMW  GL1HRI   A    0 V 72 (STRING"
WRITE   "'7001',"
WRITE   "'7212',1,1,"
WRITE   "'7611',0,0,18000,14000,9000,7000,"
WRITE   "'7424','NDIM',1, "
TEMP.1="L00"
TEMP.2="L0"
TEMP.3="L"
WRITE   "'7324','LABEL',0,"
"erase "FN" 5080CLRS   A  "
WRITEC= "EXECIO 1 DISKW "FN" 5080CLRS   A    0 F 80 (STRING"
WRITEC "L0    = P1  T1  PC7  TC9     D50  LABEL"
colordel = Format( List.0 /6     ,10,0)
depthdel = Format( List.0 / 100 , 10,0)
color = 6
depth = 0
colortest = 0
depthtest = 0
Do I = 1 to LIST.0
  colortest = colortest + 1
  depthtest = depthtest + 1
  If colortest > colordel then do
    color = color - 1
    colortest = 0
    end
```

```
 If depthtest > depthdel then do
  depth = depth + 1
  depthtest = 0
  end
LENI=LENGTH(I)
LEV=TEMP.LENI||I
WRITE  "'7324','"LEV'","I","
 Writec "L"||Left(I,5)"= P1  T1  PC"Left(color,3)"TC9    D"Left(Depth,3)lev
/*          L2   = P1  T1  PC1  TC9    D2   L002 */
 End
Do I = 1 to LIST.0
 LENI=LENGTH(I)
 LEV=TEMP.LENI||I
 WRITE  "'7324','"LEV'","I","
 End
WRITE  "'6112',1,"
topdim   = 12
spacex   = 300

/* mf */
offset.1   = 0
spacey.1   = 500
/* mf */
offset.2   = 0
spacey.2   = 500
/* v  */
offset.3   = 38
spacey.3   = 200
/* l  */
offset.4   = 5220.0
spacey.4   = 8
/* n  */
offset.5   = 1
spacey.5   = 300
/* e  */
offset.6   = 1
spacey.6   = 300
/* u  */
offset.7   = 1
spacey.7   = 300
/* j  */
offset.8   = 1
spacey.8   = 300
/* mf */
offset.9   = 1
spacey.9   = 300
/* mf */
offset.10  = 1
spacey.10  = 300
/* mf */
offset.11  = 1
spacey.11  = 300
```

```
/* mf */
offset.12 = 1
spacey.12 = 300
max = 0
del = 0
delta = 1
Do i = 1 to topdim
  Px.i = i * spacex
 End i
Do l = 1 to List.0
 Parse var List.l x.1 x.2 x.3 x.4 x.5 x.6 x.7 x.8 x.9 x.10 x.11 x.12
 Lev=1
 LEV=Format(Lev,3,0)
 WRITE  "'1111',"LEV","topdim","
 Do n = 1 to topdim
   y.n = (x.n-offset.n) * spacey.n
            y.n = y.n + del
   del=del+delta
   y.n=Format(y.n,5,0)
   if y.n > max  then max = y.n
   WRITE  "   "Px.n","y.n","
  End n
 WRITE   "    0 ,"
 End l
Say "max y is" max
max=max+200
WRITE "'5111',0 , 350,"max",40,40,0,1,'mf',"
WRITE "'5111',0 , 650,"max",40,40,0,1,'MF',"
WRITE "'5111',0 , 950,"max",40,40,0,1,'vi',"
WRITE "'5111',0 ,1250,"max",40,40,0,3,'Length',"
WRITE "'5111',0 ,1550,"max",40,40,0,3,'m1ns   ',"
WRITE "'5111',0 ,1850,"max",40,40,0,1,'ew',"
WRITE "'5111',0 ,2150,"max",40,40,0,2,'u   ',"
WRITE "'5111',0 ,2450,"max",40,40,0,1,'J ',"
WRITE "'5111',0 ,2750,"max",40,40,0,2,'m2ns',"
WRITE "'5111',0 ,3050,"max",40,40,0,2,'ew  ',"
WRITE "'5111',0 ,3450,"max",40,40,0,2,'d    ',"
WRITE "'5111',0 ,3750,"max",40,40,0,2,'Jog ',"
WRITE "'5111',0 , 0,"max+400",50,50,0,17,' Burnstein Sw box wire example ',"
WRITE "'5111',0 , 0,"max+200",50,50,0,17,' Best 522 wire and 39 via       ',"
WRITE   "'1111',0,2,0,0,3750,0,0,"
nmax=0
Do i = 1 to topdim
  WRITE   "'1111',0,2,"Px.i","max","px.i","nmax",0,"
  End i
WRITE   "'7911',"
"GL1HRI  NDIMW     GL1HRI A"
"FCOPY GL1HRI OUT A NDIMW GL1 A (REP"
/*
"Erase  NDIMW  GL1HRI A"
*/
/* Goal is to read placlist and create a shape for each module */
```

```
/* and put it at a specific 3D distance to indication the   */
/* heat that is generated by the module                     */
Parse UPPER arg FN FM
IF  FM = "" then do
 "IOX STATE $NAM198  MARKER * ( . . FM"
 End
Say "Processing" FN " PLACLIST " FM
"STATE " FN "PLACLIST" FM
IF RC   = 0 Then Do
 Say FN "PLACLIST" FM "Was not found, *******"
 exit
 End
"Erase POWER    GL1HRI  A"
"Erase POWERF   LIST    A"
"Erase POWERB   LIST    A"
"Erase POWERF   GL1HRI  A"
"Erase POWERB   GL1HRI  A"
"Erase DEBUG    GL1HRI  A"
/* NOW DO TO PLACEMENT */
"EXECIO *  DISKR "FN" PLACLIST  "FM" 1    (FINIS STEM PLAC."
WRITEPF= "EXECIO 1 DISKW POWERF LIST    A    0 V 72 (STRING"
WRITEPB= "EXECIO 1 DISKW POWERB LIST    A    0 V 72 (STRING"
WRITEF= "EXECIO 1 DISKW POWERF GL1HRI   A    0 V 72 (STRING"
WRITEB= "EXECIO 1 DISKW POWERB GL1HRI   A    0 V 72 (STRING"
WRITEG= "EXECIO 1 DISKW POWER GL1HRI    A    0 V 72 (STRING"
WRITEG "'7001',"
WRITEG "'7212',1,1,"
WRITEG "'7611',0,0,18000,14000,9000,7000,"
WRITEG "'7424','POWER',1, "
WRITEG "'7424','FRONT',2, "
WRITEG "'7424','BACK ',3, "
Do I = 1 to 1100
 LENI=LENGTH(I)
 LEV="I"||I
 WRITEG "'7324','"LEV"','"I","
 End
WRITEG "'6112',1,"
WRITEG "'6211',2,0,0,0,0,"
WRITEG "'6211',3,0,0,0,0,"
WRITEF "'6111',2,"
WRITEB "'6111',3,"
MaxI.  =0
MinI.  =0
TotalMax =0
TotalMin =0
TopMax1.   =0
TopMax.    =0
TopMin.    =0
BotMax.    =0
BotMax1.   =0
BotMin.    =0
```

```
  WRITEPF RIGHT(0    ,10)  RIGHT( 0    ,10) RIGHT(0  ,10)
  WRITEPF RIGHT(21000,10)  RIGHT( 0    ,10) RIGHT(0  ,10)
  WRITEPF RIGHT(0    ,10)  RIGHT( 16600,10) RIGHT(0  ,10)
  WRITEPF RIGHT(21000,10)  RIGHT( 16600,10) RIGHT(0  ,10)
  WRITEPB RIGHT(0    ,10)  RIGHT( 0    ,10) RIGHT(0  ,10)
  WRITEPB RIGHT(21000,10)  RIGHT( 0    ,10) RIGHT(0  ,10)
  WRITEPB RIGHT(0    ,10)  RIGHT( 16600,10) RIGHT(0  ,10)
  WRITEPB RIGHT(21000,10)  RIGHT( 16600,10) RIGHT(0  ,10)
"EXECIO *  DISKR MODULE POWER G 1    (FINIS STEM PB."
/* get the power stored and ready to access          */
Do P  = 3 to PB.0
 BOOK=SUBWORD(PB.P,1,1)
 MaI=SUBWORD(PB.P,3,1)
 MiI=SUBWORD(PB.P,2,1)
 MaxI.BOOK=MaI
 MinI.BOOK=MiI
 End P
Do I = 2 to PLAC.0
 BOOK = SUBWORD(PLAC.I,2,1)
 INST = SUBWORD(PLAC.I,3,1)
 BookMaxi =MaxI.BOOK
 If BookMaxi = 0 Then do
  Iterate I
  End
 BooKMini =MinI.BOOK
 Maxp     =MaxI.BOOK
 PW=FORMAT(Maxp,4,0)
 If PW=0 then PW = 1
 F    = SUBWORD(PLAC.I,6,1)
 P    = SUBWORD(PLAC.I,7,1)
 M    = SUBSTR(P,1,1)
 If M = "M" then FUWhere = 9
 else FUWhere = 8
 FU   = SUBWORD(PLAC.I,FUWhere  ,1)
 DX   = SUBWORD(PLAC.I,FUWhere+1,1)*100-100
 DY   = SUBWORD(PLAC.I,FUWhere+2,1)*100-100
 PTEST = SUBWORD(PLAC.I,FUWhere+3,1)
 PORT  = SUBWORD(PLAC.I,FUWhere+4,1)
/*********
  BOOK  AS244 @156   86   22 FLAG MP_P_ MIRB NFUNCMOS    4   11 PORTION *
  BOOK  AS240 FP100AA 188  22 FLAG _P_PP NFUNCMOS   4    5 PORTION B
 *********/
 If  INDEX("ABCDEF",Port,1)>0 then
  Iterate I
 PX   = SUBWORD(PLAC.I,4,1)*100
 PY   = SUBWORD(PLAC.I,5,1)*100
 If M = "M" then do
   WRITEF "'3111',"PW","PX","PY","DX","DY","
    WRITEPF RIGHT(PX   ,10)  RIGHT( PY   ,10) RIGHT(PW ,10)
    WRITEPF RIGHT(PX+DX,10)  RIGHT( PY   ,10) RIGHT(PW ,10)
    WRITEPF RIGHT(PX   ,10)  RIGHT( PY+DY,10) RIGHT(PW ,10)
```

```
   WRITEPF RIGHT(PX+DX,10)  RIGHT( PY+DY,10) RIGHT(PW ,10)
End
Else do
WRITEB "'3111',"PW","PX","PY","DX","DY","
  WRITEPB RIGHT(PX    ,10)  RIGHT( PY    ,10) RIGHT(PW ,10)
  WRITEPB RIGHT(PX+DX,10)   RIGHT( PY    ,10) RIGHT(PW ,10)
  WRITEPB RIGHT(PX    ,10)  RIGHT( PY+DY,10) RIGHT(PW ,10)
  WRITEPB RIGHT(PX+DX,10)   RIGHT( PY+DY,10) RIGHT(PW ,10)
  End
End
WRITEB "'7911',"
"FINIS POWER  GL1HRI A"
"FINIS POWERF GL1HRI A"
"FCOPY POWERF GL1HRI A  POWER GL1HRI A (APP"
"FCOPY POWERB GL1HRI A  POWER GL1HRI A (APP"
"GL1HRI  POWER    GL1HRI A"
"FCOPY GL1HRI OUT A POWER GL1 C (REP"
/*
"Erase  POWER  GL1HRI A"
*/
/* Goal is to read placlist and get power per .4 x 7" segement */
/* and to create power gl1 that can be viewed with stereo      */
/* 3D to allow the human depth perception to get a better      */
/* understanding of the board power requirements               */
Parse UPPER arg FN FM
IF  FM = "" then do
   "IOX STATE $NAM198  MARKER * ( . . FM"
   End
Say "Processing" FN " PLACLIST " FM
"STATE " FN "PLACLIST" FM
IF RC    = 0 Then Do
  Say FN "PLACLIST" FM "Was not found, *******"
  exit
  End
"ERASE  POWER    SORTBOT    A "
"ERASE  POWER    SORTTOP    A "
"ERASE .POWER    TOTALS C "
"ERASE  POWER    TOP     A "
"ERASE  POWER    BOT     A "
"Erase POWER    GL1HRI A"
"Erase DEBUG    GL1HRI A"
/* NOW DO TO PLACEMENT */
"EXECIO *  DISKR "FN" PLACLIST  "FM" 1   (FINIS STEM PLAC."
WRITET= "EXECIO 1 DISKW POWER TOP     A    0 V 72 (STRING"
WRITEB= "EXECIO 1 DISKW POWER BOT     A    0 V 72 (STRING"
WRITED= "EXECIO 1 DISKW DEBUG GL1HRI  A    0 V 72 (STRING"
WRITEG= "EXECIO 1 DISKW POWER GL1HRI  A    0 V 72 (STRING"
WRITETOT= "EXECIO 1 DISKW POWER TOTALS C   0 V 72 (STRING"
WRITEG "'7001',"
WRITEG "'7212',1,1,"
WRITEG "'7611',0,0,18000,14000,9000,7000,"
```

```
WRITEG "'7424','POWER',1, "
TEMP.1="L00"
TEMP.2="L0"
TEMP.3="L"
SetPW=25
Do PX = 1 TO 210
   J = PX%4+1
   JJ= J*2
   SEG=SUBSTR("A1A2A3A4A5A6A7A8A9B1B2B3B4B5B6B7B8B9C1C2C3C4C5C6C7C8C9D1D2D3D4D5D
   Select
     When PX= 50 then SetPW   =80
     When PX= 100 then SetPW  = 125
     When PX=150 then SetPW   =175
     When PX=200 then SetPW   =225
     Otherwise NOP
     End /*select*/
   PXW.SEG=SetPW
   End PX
Do I = 1 to 300
   LENI=LENGTH(I)
   LEV=TEMP.LENI||I
   WRITEG "'7324','"LEV"',"I","
   End
WRITEG "'6112',1,"
MaxI. =0
MinI. =0
TotalMax =0
TotalMin =0
TopMax1.   =0
TopMax.   =0
TopMin.   =0
BotMax.   =0
BotMax1.   =0
BotMin.   =0
"EXECIO *  DISKR MODULE POWER G 1    (FINIS STEM PB."
/* get the power stored and ready to access         */
Do P  = 3 to PB.0
   BOOK=SUBWORD(PB.P,1,1)
   MaI=SUBWORD(PB.P,3,1)
   MiI=SUBWORD(PB.P,2,1)
   MaxI.BOOK=MaI
   MinI.BOOK=MiI
   End P
 Do I = 2 to PLAC.0
   BOOK = SUBWORD(PLAC.I,2,1)
   INST = SUBWORD(PLAC.I,3,1)
   BookMaxi =MaxI.BOOK
   If BookMaxi = 0 Then do
      Iterate I
      End
   BooKMini =MinI.BOOK
```

```
Maxp     =MaxI.BOOK%10
PW=FORMAT(Maxp,4,0)
If PW=0 then PW = 1
PX    = SUBWORD(PLAC.I,4,1)
PY    = SUBWORD(PLAC.I,5,1)
WRITEG "'3111',"PW","PX","PY",1,1,"
F     = SUBWORD(PLAC.I,6,1)
P     = SUBWORD(PLAC.I,7,1)
M     = SUBSTR(P,1,1)
If M = "M" then FUWhere = 9
else FUWhere = 8
FU    = SUBWORD(PLAC.I,FUWhere  ,1)
P     = SUBWORD(PLAC.I,FUWhere+1,1)
PC    = SUBWORD(PLAC.I,FUWhere+2,1)
PTEST = SUBWORD(PLAC.I,FUWhere+3,1)
PORT  = SUBWORD(PLAC.I,FUWhere+4,1)
IF (F = "FLAG")|(I=1) then do
   IF (PORT = "" )|(PORT="*") then do
      J = PX%4+1
      JJ= J*2
SEG=SUBSTR(" A1A2A3A4A5A6A7A8A9B1B2B3B4B5B6B7B8B9C1C2C3C4C5C6C7C8C9D1D2D3D4D5D
      IF PY > 83 then do
         WRITET RIGHT(BOOK,9) RIght(INST,9) RIGHT(PX,5) RIGHT(PY,5) RIGHT(SEG,5)
         TopMax1.SEG=TopMax1.SEG+BookMaxi
         TopMax.SEG=TopMax.SEG+BookMaxi
         TopMin.SEG=TopMin.SEG+BookMini
         TotalMax=TotalMax+BooKMaxi
         TotalMin=TotalMin+BooKMini
         End
      ELSE do
         WRITEB RIGHT(BOOK,9) RIght(INST,9) RIGHT(PX,5) RIGHT(PY,5) RIGHT(SEG,5)
         BotMax1.SEG=BotMax1.SEG+BookMaxi
         BotMax.SEG=BotMax.SEG+BookMaxi
         BotMin.SEG=BotMin.SEG+BookMini
         TotalMax=TotalMax+BooKMaxi
         TotalMin=TotalMin+BooKMini
         End
      End /* end tot bot */
   /* Else do
      Say "Skip this Placlist entry"
      Say BOOK INST PTEST PORT
      End */
   End
 Else do
    Say "Error, did not find FLAG field"
    Exit
    End
 End
"SORTV POWER TOP  A  POWER SORTTOP A 35 37 CH A 28 31 FI D 22 25 FI A "
"SORTV POWER BOT  A  POWER SORTBOT A 35 37 CH A 28 31 FI A 22 25 FI A "
/* set up to process top currents */
```

```
PX=SUBWORD(P.1,3,1)
SEGSAVE=STRIP(SUBWORD(P.1,5,1))
Lasttx =   PXW.A1
Lastty =  173
"EXECIO * DISKR POWER SORTTOP  A 1    (FINIS STEM P."
Do I = 1 to P.0
  BOOK=SUBWORD(P.I,1,1)
  BooKMaxi =MaxI.BOOK
  PX=SUBWORD(P.I,3,1)
  PY=SUBWORD(P.I,4,1)
  SEG=STRIP(SUBWORD(P.I,5,1))
   If (SEG    =SEGSAVE) then do
     SEGSAVE=SEG
     PWTT=FORMAT(TopMax.Seg/10,4,0)
      If PWTT  = 0 then do
        WRITEG "'3111',1,"Lasttx",175,1,1,"
        Say "ICC/10 less than 1 so set to 1" SEG  BOOK PX PY
        End
      else
      WRITEG "'3111',"PWTT","Lasttx",175,1,1,"
      Lasttx =   PXW.SEGSAVE
      Lastty = 173
      End
   PWT=FORMAT(TopMax1.SEG%10,4,0)
   If PWT < 1 Then Do
   Say "**** ERROR TOP " PWT I BOOK PX PY SEG TopMax1.SEG
   PWB=1
   End
   WRITEG "'1111',"PWT",2,"PX","PY","Lasttx","Lastty",0,"
   Lasttx =   PXW.SEGSAVE
   Lastty = 160
   TopMax1.SEG=TopMax1.SEG-BookMaxi
   End I
/* set up to process top currents */
"EXECIO * DISKR POWER SORTBOT  A 1    (FINIS STEM PB."
PX=SUBWORD(PB.1,3,1)
SEGSAVE=STRIP(SUBWORD(PB.1,5,1))
/* Now for the Bottom */
Lastbx =   PXW.SEGSAVE
Lastby =  0
Do I = 1 to PB.0
  BOOK=SUBWORD(PB.I,1,1)
  BooKMaxi. =MaxI.BOOK
  PX=SUBWORD(PB.I,3,1)
  PY=SUBWORD(PB.I,4,1)
  SEG=STRIP(SUBWORD(PB.I,5,1))
   If (SEG    =SEGSAVE) then do
     SEGSAVE=SEG
     PWBT=FORMAT(BotMax.Seg/10,4,0)
      If PWBT  = 0 then do
        WRITEG "'3111',1,"Lasttx", -5,1,1,"
```

```
            Say "ICC/10 less than 1 so set to 1" SEG  BOOK PX PY
          End
        else
        WRITEG "'3111',"PWBT","Lasttx", -5,1,1,"
        Lastbx =   PXW.SEGSAVE
        Lastby =  0
        End
    PWB=FORMAT(BotMax1.SEG%10,4,0)
    If PWB < 1 Then  do
    Say "**** ERROR Bot" PWB I BOOK PX PY SEG BotMax1.SEG
    PWB=1
    End
    WRITEG "'1111',"PWB",2,"PX","PY","Lastbx","Lastby",0,"
    Lastbx =   PXW.SEGSAVE
    Lastby = 0
    BotMax1.SEG=BotMax1.SEG-BookMaxi
    End I
WRITETOT Right("XSEG",5) RIGHT("BMax",5) Right("TMax",5) Right("Bdel",5) Right("
XX=0
Do JJ = 2  to 104 by 2
   XX=XX+4
   SEG=SUBSTR(" A1A2A3A4A5A6A7A8A9B1B2B3B4B5B6B7B8B9C1C2C3C4C5C6C7C8C9D1D2D3D4D5D
   Bd=BotMax.Seg-BotMin.Seg
   Td=TopMax.Seg-TopMin.Seg
   If (TopMax.Seg =0)|(BotMax.Seg  =0) then do
      WRITETOT Right(XX,5) RIGHT(BotMax.Seg,5) Right(TopMax.Seg,5) RIGHT(Bd,5) Rig
      End
   End JJ
Say "Total Current Max Min Del"
Del =TotalMax-TotalMin
Say "              " TotalMax TotalMin Del
WRITEG "'7911',"
"GL1HRI  POWER     GL1HRI A"
"FCOPY GL1HRI OUT A POWER GL1 C (REP"
/*
"ERASE   POWER    SORTBOT   A "
"ERASE   POWER    SORTTOP   A "
"ERASE   POWER    TOTALS C "
"ERASE   POWER    TOP     A  "
"ERASE   POWER    BOT     A  "
"Erase   GL1HRI GL1HRI A"
"Erase   POWER  GL1HRI A"
*/
%title WAIT FOR USER ACTION
SEGMENT RWAITUS3;

%INCLUDE DSPL3VAR;
%INCLUDE GSWGSRTN;
%INCLUDE GL1STBIO;
%INCLUDE GSWRTNS;
%INCLUDE ASSEMBLR;
%INCLUDE RPTS;
/*
```

```
%INCLUDE CMSSTATE;
*/
FUNCTION  ITOHS              (        IVAL : INTEGER): STRING(8); EXTERNAL;
FUNCTION  XLATE_RPERIM       (CONST PRIM : GL1_PERIMETER;
                              CONST MTRX : REAL_MATRIX_TYPE)
                                   : GL1_PERIMETER;         EXTERNAL;

PROCEDURE FILL_WINDOW        (CONST CELL  : CELL_PTR;
                              CONST PERIM : GL1_PERIMETER;
                                    MATRX : REAL_MATRIX_TYPE);  EXTERNAL;

PROCEDURE FIND_2D_SHAPE      (CONST CELL  : CELL_PTR;
                              CONST MATRX : REAL_MATRIX_TYPE);  EXTERNAL;

PROCEDURE FIND_3D_SHAPE      (CONST CELL  : CELL_PTR;
                              CONST MATRX : REAL_MATRIX_TYPE);  EXTERNAL;
PROCEDURE SET_IPERIM;                                           EXTERNAL;
PROCEDURE SET_RPERIM;                                           EXTERNAL;
%PAGE
REF
   LOADED_BLKS : BLOCK_LOAD_ARRAY;
   LOAD_BLOCKS : BLOCK_LOAD_ARRAY;

CONST
   RAD_PER_DEG = 0.0175;
   ROTATE_MULT = 2;

PDOC  = 13;
   IW    = 1;
   NIW   = 8;                            (* NUMBER OF INPUT WINDOWS   *)
   FUNCW = IW + 2;                       (* NUMBER OF FUNC. SELECT FLD.*)
   OW    = IW + NIW;    (* 9*)
   PFKW  = OW + 20;     (*29*)           (* FIRST PFK WINDOW          *)
   NMW   = PFKW + 13;   (*42*)           (* NO. OF LEVEL PAGE HDR FLD. *)
   NOW   = NMW - OW;    (*34*)           (* NUMBER OF OUTPUT WINDOWS  *)
   NNM   = 80;

LNCNS = 7;                            (* COL 1 OF LVL NAME WO/STEREO*)
   LNCS  = 10;                           (* 1ST COL. OF 1ST LEVEL NAME.*)
   LWL   = 11;                           (* LEVEL NAME FIELD LENGTH   *)

NLW   = NNM;                          (* MAX LEVEL NAMES PER PAGE  *)
   TLW   = NLW * 3;                      (* MAX INPUT FLDS PER LVL PGE.*)

LHDR  = NMW + NNM;   (*122*)          (* NO. OF LEVEL PAGE HDR FLD. *)
   LPFKW = LHDR + 1;    (*123*)          (* NO. OF LEVEL PAGE PFK FLD. *)
   LIC   = LPFKW + 1;   (*124*)          (* NO. OF 1ST COLOR SLCT FLD. *)
   LIF   = LIC + NLW;   (*204*)          (* NO. OF 1ST FILL SELECT FLD.*)
   LID   = LIF + NLW;   (*284*)          (* NO. OF 1ST DEPTH SELECT FLD*)

CNC   = 6;                            (* 1ST COL. OF 1ST CELL NAME. *)
   CWL   = 15;                           (* CELL NAME FIELD LENGTH    *)
   NCW   = NNM;                          (* MAX CELL NAMES PER PAGE   *)
```

```
CHDR   = LID + NLW;    (*364*)        (* NO. OF CELL PAGE HDR FIELD.*)
CPFKW  = CHDR + 1;     (*365*)        (* NO. OF CELL PAGE PFK FIELD *)
CIW    = CPFKW + 1;    (*366*)        (* NO. OF 1ST CELL SELECT FLD.*)

NAW    = 7;                           (* NO. OF ATTR INPUT FIELDS   *)

AHDR   = CIW + NCW;    (*446*)        (* NO. OF ATTR PAGE HDR FIELD *)
APFKW  = AHDR + 1;     (*447*)        (* NO. OF ATTR PAGE PFK FIELD *)
AIW    = APFKW + 1;    (*448*)        (* NO. OF 1ST ATTR INPUT FLD. *)
AOW    = AIW + NAW;    (*455*)        (* NO. OF 1ST ATTR OUTPUT FLD.*)

NSW    = 6;                           (* NO. OF STEREO INPUT FIELDS *)

SHDR   = AOW + NAW;    (*462*)        (* NO. OF STEREO PAGE HDR FLD.*)
SPFKW  = SHDR + 1;     (*463*)        (* NO. OF STEREO PAGE PFK FLD.*)
SIW    = SPFKW + 1;    (*464*)        (* NO. OF 1ST STEREO INPT FLD.*)
SOW    = SIW + NSW;    (*470*)        (* NO. OF 1ST STEREO OUPT FLD.*)

LHS    = ' C/FP/D   LEVEL NAME    C/FP/D   LEVEL NAME ' ||
         ' C/FP/D   LEVEL NAME    C/FP/D   LEVEL NAME';
LHNS   = ' C/FP   LEVEL NAME     C/FP   LEVEL NAME    ' ||
         ' C/FP   LEVEL NAME     C/FP   LEVEL NAME';

TYPE

FIELD_TYP = (NOFLD,LVLFLD,CELFLD,ATTFLD,STRFLD);
LDATAPTR  = -> LEVL_DATA_ARRAY;
CDATAPTR  = -> CELL_DATA_ARRAY;
GL1_NAM50 = PACKED ARRAY(.1..50.) OF CHAR;
GL1_NAM48 = PACKED ARRAY(.1..48.) OF CHAR;

(* 000000000111111111122222222223
   123456789012345678901234567890
   L11 = P1  T1  PC4  TC127  S11  *)

CLR_FILL_REC = PACKED RECORD
                  CASE INTEGER OF
                  1: (        : CHAR;                           (* 1      *)
                       LEVNUM : PACKED ARRAY(.1..3.) OF CHAR;   (* 2..4   *)
                              : PACKED ARRAY(.1..3.) OF CHAR;   (* 5..7   *)
                       PENWID : CHAR;                           (* 8      *)
                              : PACKED ARRAY(.1..3.) OF CHAR;   (* 9..11  *)
                       PATNUM : ALPHA2;                         (* 12..13 *)
                              : PACKED ARRAY(.1..3.) OF CHAR;   (* 14..16 *)
                       PATCLR : CHAR;                           (* 17     *)
                              : FOURCHAR;                       (* 18..21 *)
                       BKGRND : PACKED ARRAY(.1..3.) OF CHAR;   (* 22..24 *)
                              : PACKED ARRAY(.1..3.) OF CHAR;   (* 25..27 *)
                       SHIFT  : ALPHA2;                         (* 28..29 *)
                              : CHAR;                           (* 30     *)
                       LVLN50 : GL1_NAM50);                     (* 31..80 *)
```

```
            2: (       : CHAR;                          (*  1     *)
               LEV     : PACKED ARRAY(.1..5.) OF CHAR;  (*  2..4  *)
                       : PACKED ARRAY(.1..3.) OF CHAR;  (*  5..7  *)
               PEN     : CHAR;                          (*  8     *)
                       : PACKED ARRAY(.1..3.) OF CHAR;  (*  9..11 *)
               PAT     : ALPHA2;                        (* 12..13 *)
                       : PACKED ARRAY(.1..3.) OF CHAR;  (* 14..16 *)
               CLR     : CHAR;                          (* 17     *)
                       : FOURCHAR;                      (* 18..21 *)
               BKG     : PACKED ARRAY(.1..3.) OF CHAR;  (* 22..24 *)
                       : PACKED ARRAY(.1..3.) OF CHAR;  (* 25..27 *)
               SHF     : ALPHA2;                        (* 28..29 *)
                       : CHAR;                          (* 30     *)
               LVLN48  : GL1_NAM48);                    (* 31..80 *)
            END;

CFILE_OVERLAY = PACKED RECORD
                  CASE INTEGER OF
                    1: (S  : STRING(80));
                    2: (L  : HWTYPE;
                        CF : CLR_FILL_REC);
                  END;

LEVEL_DATA    = PACKED RECORD
                  LEVLP : LEVEL_PTR;
                  ORIGC : HALFWD;
                  ORIGF : HALFWD;
                  ORIGD : HALFWD;
                  SPARH : HALFWD;
                  SPARI : INTEGER;
                  END;

CELL_DATA     = PACKED RECORD
                  CELLP : CELL_PTR;
                  SELCT : CHAR;
                  SPARE : PACKED ARRAY(.1..3.) OF CHAR;
                  END;

LEVL_DATA_ARRAY = PACKED ARRAY (.0..800.) OF LEVEL_DATA;
CELL_DATA_ARRAY = PACKED ARRAY (.0..800.) OF CELL_DATA;

STATIC                              (* GLOBAL VARIABLES ----------*)
  WINDOW      : REAL_WINDOW;        (* CURRENT CELL WINDOW        *)
  STACKX      : INTEGER;
  LNC         : INTEGER;
  LEVLD       : LDATAPTR;
  CELLD       : CDATAPTR;
  FLDTYP      : FIELD_TYP;
  NAMTYP      : FIELD_TYP;
  STACK       : DISPLAY_STACK;
  DO_XHAIR    : BOOLEAN;
  COLOR_CHNG  : BOOLEAN;
```

```
   BUMP_STACKX : BOOLEAN;
   SAME_WINDOW : BOOLEAN;
   CLRDATA     : CFILE_OVERLAY;
   LVLCLRSI    : FILE OF CLR_FILL_REC;
   LVLCLRSO    : FILE OF CLR_FILL_REC;

VALUE
   STACKX     := -1;
   LNC        := LNCNS;
   NAMTYP     := NOFLD;
   DO_XHAIR   := FALSE;
   COLOR_CHNG := FALSE;

PROCEDURE CMS          (CONST FSTR : STRING;
                         VAR   RC : INTEGER);                    EXTERNAL;
PROCEDURE PUT_FGL1     (      MSG : MESSAGE_PTR;
                        CONST PATT : BOOLEAN;
                         VAR  MSGS : TEXT);                      EXTERNAL;
(*
PROCEDURE IDENT_SHAPE (CONST CELL : CELL_PTR;
                       CONST WNDW : GL1_RPERIM;
                       CONST X,Y : INTEGER;
                        VAR MDIST : SHORTREAL);                  EXTERNAL;
*)
Procedure GSCKINT        (* Check for outstanding interupt key hit   *)
   (Var KeyType:Integer;(*O Type of key hit                          *)
                        (*   0 - None, 1 - APFK, 2 - LPFK, 3 - Enter *)
                        (*   4 - Cancel, 5 Not used, 6 I/O Error     *)
    Var PKeyVal:Integer); (*O Value of PF key                        *)
       External;
Procedure GSCREAD        (* Display cursor - read user input response *)
   (CursorType:Integer;  (*I Type of Cursor desired                   *)
                        (*   0 - none, 1 cross hair, 2 rubber rect    *)

XR,YR:Integer;       (*I Coordinate of one point of rubber rect   *)
    Var KeyType:Integer;(*O Type of key hit                           *)
                        (*   0 - ANK, 1 - APFK, 2 - LPFK, 3 - Enter  *)
                        (*   4 - Cancel, 5 Mouse, 6 I/O error         *)
    Var AKeyVal:Char;    (*O Value of Alpha key                       *)
    Var PKeyVal:Integer;(*O Value of PF key                           *)
    Var XT,YT:Integer);  (*O Value of cursor location                 *)
       External;
%page
PROCEDURE FLAG_PUTSHPS (CONST STYP : UENTRY_KIND;
                        CONST SHPS : USYM_PTR;
                        CONST CELL : CELL_PTR);

VAR
   SHP,RSHP  : USYM_PTR;
   RLVL      : LEVEL_PTR;
   RELOC_LVL : BOOLEAN;
```

```
BEGIN                                           (* BEGIN FLAG_PUTSHPS      *)
  SHP := SHPS;
  IF NOT LOADED_BLKS.UBLKS(.STYP.)
    THEN RELOC_LVL := TRUE
    ELSE RELOC_LVL := FALSE;

REPEAT
    IF RELOC_LVL
      THEN RELOC_UPTR (STYP,SHP,RSHP)
      ELSE RSHP := SHP;
    RLVL := RSHP->.GR.ENT.LEVEL;
    IF RELOC_LVL
      THEN $RLCSYMP (RLVL,SYMTPTR->.NINFO(.$GL1_LEVL.).RLOCP);
    IF (RLVL->.GL.SHP_COLOR >= 0)
      THEN BEGIN
        RLVL->.GL.FLAGS := RLVL->.GL.FLAGS + (.PUT_LEVEL.);
        CELL->.GC.FLAGS := CELL->.GC.FLAGS + (.CELL_CHECKED.);
        END;
    SHP := RSHP->.GR.NEXT;
  UNTIL (SHP = NIL);
END;                                            (* END FLAG_PUTSHPS        *)
%PAGE
PROCEDURE FILTER_GL1;

VAR
  LVL : LEVEL_PTR;

PROCEDURE FLATTEN (CONST CEL : CELL_PTR);

VAR
  SHP,RSHP : PTR_INX;
  RLVL     : LEVEL_PTR;
  XFM      : TRANSFORM_PTR;

BEGIN                                           (* BEGIN FLATTEN           *)
  WITH CEL->.GC DO
    BEGIN
/*IF (NUMBER = 2) THEN RETURN;    (* FILTER OUT CELL 2. *)
*/    IF (SHAPES_EXIST IN FLAGS)
        THEN BEGIN
          IF (RECTANGLES <> NIL)    (* CHECK RECTS FIRST TO MINIMIZE *)
            THEN BEGIN              (*    UPDATING OF XLTD_RWDW.     *)
              SHP.U := RECTANGLES;
              IF NOT CNVT_PERIM
                THEN REPEAT
                  IF USE_ARCT
                    THEN RELOC_UINX ($GL1ARCT,SHP.X,RSHP.A)
                    ELSE RELOC_UPTR ($GL1RCT ,SHP.U,RSHP.U);
                  RLVL := RSHP.U->.GR.ENT.LEVEL;
                  $RLCSYMP (RLVL,SYMTPTR->.NINFO(.$GL1_LEVL.).RLOCP);
```

```
              IF (RLVL->.GL.SHP_COLOR >= 0)
                THEN BEGIN
                  RLVL->.GL.FLAGS := RLVL->.GL.FLAGS +
                                                    (.PUT_LEVEL.);
                  FLAGS := FLAGS + (.CELL_CHECKED.);
                  END;
              SHP.U := RSHP.U->.GR.NEXT;
            UNTIL (SHP.U = NIL)
            ELSE REPEAT
              IF USE_ARCT
                THEN RELOC_UINX ($GL1ARCT,SHP.X,RSHP.A)
                ELSE RSHP.U := SHP.U;
              WITH RSHP.R-> DO
                IF (ENT.LEVEL->.GL.SHP_COLOR >= 0)
                  THEN BEGIN
                    ENT.LEVEL->.GL.FLAGS := ENT.LEVEL->.GL.FLAGS +
                                                    (.PUT_LEVEL.);
                    FLAGS := FLAGS + (.CELL_CHECKED.);
                    END;
              SHP.R := RSHP.R->.NEXT;
            UNTIL (SHP.R = NIL);
          END;

IF (ALPHAS <> NIL)
        THEN FLAG_PUTSHPS ($GL1ALF,ALPHAS,CEL);

IF (MSHAPES <> NIL)
        THEN FLAG_PUTSHPS ($GL1MSC,MSHAPES,CEL);

IF (POLYGONS <> NIL)
        THEN FLAG_PUTSHPS ($GL1PLY,POLYGONS,CEL);

IF (ULINES <> NIL)
        THEN FLAG_PUTSHPS ($GL1ULN,ULINES,CEL);
      END;

XFM := TRANSFORMS;
    WHILE XFM <> NIL DO
      WITH XFM-> DO
        BEGIN
          IF (NOT (EMPTY_CELL IN GX.CELL->.GC.FLAGS)) AND
             (NOT (CELL_CHECKED IN GX.CELL->.GC.FLAGS))
            THEN FLATTEN (GX.CELL);
          IF (CELL_CHECKED IN GX.CELL->.GC.FLAGS)
            THEN FLAGS := FLAGS + (.CELL_CHECKED.);
          XFM := GX.NEXT;
        END;
    END;
END;                                      (* END OF FLATTEN           *)
%PAGE
BEGIN                                     (* BEGIN FILTER_GL1         *)
```

```
   CLEAR_CHECK;
   LVL := GL1MSG->.GM.LEVELS;
   WHILE (LVL <> NIL) DO
     BEGIN
       LVL->.GL.FLAGS := LVL->.GL.FLAGS - (.PUT_LEVEL.);
       LVL := LVL->.NEXT_SYMB;
     END;
   FLATTEN (DRAW_CELL);
   PUT_FGL1 (GL1MSG,TRUE,MSGFILE);
end;                                             (* END FILTER_GL1         *)
%page
(*********************************************************************)
(*                                                                    *)
(*  ROUTINE NAME: WINDOW_XHAIR                                        *)
(*                                                                    *)
(*  ROUTINE TYPE: PROCEDURE                                           *)
(*                                                                    *)
(*  FUNCTION: SET THE NEW WINDOW USING THE 5080 CROSSHAIR             *)
(*                                                                    *)
(*  PARAMETERS: NONE                                                  *)
(*                                                                    *)
(*  RETURNS: NONE                                                     *)
(*                                                                    *)
(*********************************************************************)
PROCEDURE WINDOW_XHAIR;

VAR
   TLOWX,TLOWY,THIGHX,THIGHY:INTEGER;

KEYTYPE,PKEYV1,PKEYV2:INTEGER;
   TEMP:INTEGER;
   WINDSCALE,WINDOFFX,WINDOFFY:REAL;
   AKEYVAL:CHAR;

BEGIN                                            (* BEGIN WINDOW_XHAIR     *)
   TLOWX:=0;
   TLOWY:=0;
   WHILE TRUE DO  (* LOOP UNTIL CANCELED OR BOTH POINTS SELECTED *)
   BEGIN
     GSCREAD(1,TLOWX,TLOWY,KEYTYPE,AKEYVAL,PKEYV1,TLOWX,TLOWY);
     IF KEYTYPE <> 5 (* CANCEL THE OP IF NOT A PUCK/MOUSE KEY *)
       THEN RETURN;
     CASE PKEYV1 OF
       0:
         BEGIN (* 1ST POINT SELECTED GO READ 2ND *)
           GSCREAD(2,TLOWX,TLOWY,KEYTYPE,AKEYVAL,PKEYV2,THIGHX,THIGHY);
           IF KEYTYPE <> 5 (* CANCEL THE OP IF NOT A PUCK/MOUSE KEY *)
             THEN RETURN;
           CASE PKEYV2 OF
             0: IF (TLOWX<>THIGHX) AND (TLOWY<>THIGHY)
                  THEN LEAVE; (* WE GOT BOTH POINTS GO FOR IT *)
```

```
              1:; (* GO GET 1ST POINT AGAIN *)
              OTHERWISE RETURN; (* CANCEL THE OP IF NOT PUCK KEYS 0 OR 1*)
            END; (* CASE PKEYVAL OF *)
          END; (* END CASE PKEYVAL=0 -> SELECT 1ST POINT *)
        1:; (* GO GET 1ST POINT AGAIN *)
        OTHERWISE RETURN; (* CANCEL THE OP IF NOT PUCK KEYS 0 OR 1 *)
      END; (* CASE PKEYVAL OF *)
    END; (* LOOP UNTIL CANCELED OR WINDOW IS SELECTED *)
    (* IF WE GET HERE A WINDOW HAS BEEN SELECTED *)
    WINDOW_SET:=TRUE;
    IF TLOWX > THIGHX
      THEN BEGIN
        TEMP:=TLOWX;
        TLOWX:=THIGHX;
        THIGHX:=TEMP;
      END;
    IF TLOWY > THIGHY
      THEN BEGIN
        TEMP:=TLOWY;
        TLOWY:=THIGHY;
        THIGHY:=TEMP;
      END;
    WITH WINDOW DO
    BEGIN
      WINDSCALE:=HIX-LOX;
      WINDOFFX:=LOX;
      WINDOFFY:=LOY;
      LOX:=WINDOFFX+(WINDSCALE*TLOWX/4096);
      HIX:=WINDOFFX+(WINDSCALE*THIGHX/4096);
      LOY:=WINDOFFY+(WINDSCALE*TLOWY/4096);
      HIY:=WINDOFFY+(WINDSCALE*THIGHY/4096);
    END;
END;                                              (* END WINDOW_XHAIR       *)
%PAGE
(*******************************************************************)
(*                                                                 *)
(*   ROUTINE NAME: MEASURE_XHAIR                                   *)
(*                                                                 *)
(*   ROUTINE TYPE: PROCEDURE                                       *)
(*                                                                 *)
(*   FUNCTION: MEASURE DISTANCES USING THE 5080 CROSSHAIR          *)
(*                                                                 *)
(*   PARAMETERS: NONE                                              *)
(*                                                                 *)
(*   RETURNS: NONE                                                 *)
(*                                                                 *)
(*******************************************************************)
PROCEDURE MEASURE_XHAIR;

VAR
  TLOWX,TLOWY,THIGHX,THIGHY:INTEGER;
  KEYTYPE,PKEYV1,PKEYV2,R:INTEGER;
```

```
     WINDSCALE,XD,YD,TD:REAL;
     AKEYVAL:CHAR;                              (* BEGIN MEASURE_XHAIR       *)
BEGIN
  R := FSMODW (OW+6,$OUT,$HIGH,$ON);
  TLOWX:=0;
  TLOWY:=0;
  (* READ 1ST POINT OF MEASURE *)
  GSCREAD(1,TLOWX,TLOWY,KEYTYPE,AKEYVAL,PKEYV1,TLOWX,TLOWY);
  WHILE (KEYTYPE=5) AND (PKEYV1=0) DO  (*TAKE MEASURES UNTIL CANCELED*)
  BEGIN
     (* READ 2ND POINT OF MEASURE *)
     GSCREAD(2,TLOWX,TLOWY,KEYTYPE,AKEYVAL,PKEYV2,THIGHX,THIGHY);
     IF KEYTYPE <> 5 (* CANCEL THE OP IF NOT A PUCK/MOUSE KEY *)
        THEN LEAVE;
     CASE PKEYV2 OF
        0:BEGIN  (* WE GOT BOTH POINTS DISPLAY MEASURE *)
           WINDSCALE:=WINDOW.HIX-WINDOW.LOX;   (* COMPUTE MEASURES *)
           XD:=ABS(WINDSCALE*(THIGHX-TLOWX)/4096);
           YD:=ABS(WINDSCALE*(THIGHY-TLOWY)/4096);
           TD:=SQRT(XD*XD+YD*YD);
           WRITESTR (BUFFER.S,'6 - MEASURE       X = ',XD*GRID:-10:3,
                                              ' Y = ',YD*GRID:-10:3,
                                              ' D = ',TD*GRID:-10:3);

R := FSWRITEW (OW+6,$REP,BUFFER);
           R := FSDISPLAY ($NOWAIT,$NOALARM);
         END;
        1:; (* GO GET 1ST POINT AGAIN *)
        OTHERWISE LEAVE; (* CANCEL THE OP IF NOT PUCK KEYS 0 OR 1*)
     END; (* CASE PKEYV2 OF *)
     (* GO READ THE NEXT MEASURE 1ST POINT *)
     GSCREAD(1,TLOWX,TLOWY,KEYTYPE,AKEYVAL,PKEYV1,TLOWX,TLOWY);
  END;  (* LOOP TAKING MEASUREMENTS UNTIL CANCELED *)
  (* RESTORE MENU FIELD *)
  WRITESTR (BUFFER.S,'6 - MEASURE':-65);
  R := FSWRITEW (OW+6,$REP,BUFFER);
  R := FSMODW (OW+6,$OUT,$LOW,$ON);
(*R := FSDISPLAY ($NOWAIT,$NOALARM);*)
END;                                            (* END MEASURE_XHAIR         *)
%PAGE
(***************************************************************************)
(*                                                                         *)
(*   ROUTINE NAME: POINT_XHAIR                                             *)
(*                                                                         *)
(*   ROUTINE TYPE: PROCEDURE                                               *)
(*                                                                         *)
(*   FUNCTION: DISPLAY POINT COORDINATES USING THE 5080 CROSSHAIR          *)
(*                                                                         *)
(*   PARAMETERS: NONE                                                      *)
(*                                                                         *)
(*   RETURNS: NONE                                                         *)
(*                                                                         *)
(***************************************************************************)
```

```
PROCEDURE POINT_XHAIR;

VAR
  TABX,TABY,R:INTEGER;
  KEYTYPE,PKEYVAL:INTEGER;
  X,Y,WINDSCALE:REAL;
  AKEYVAL:CHAR;

BEGIN                                              (* BEGIN POINT_XHAIR      *)
  R := FSMODW (OW+5,$OUT,$HIGH,$ON);
  TABX:=0;
  TABY:=0;
  GSCREAD(1,TABX,TABY,KEYTYPE,AKEYVAL,PKEYVAL,TABX,TABY);
  WHILE (KEYTYPE=5) AND (PKEYVAL=0) DO    (* COLLECT PTS UNTIL CANCEL*)
  BEGIN
    WITH WINDOW DO
    BEGIN
      WINDSCALE:=HIX-LOX;
      X:=LOX+(WINDSCALE*TABX/4096);
      Y:=LOY+(WINDSCALE*TABY/4096);
    END;
    WRITESTR (BUFFER.S,'5 - POINT          X = ',X*GRID:-10:3,
                                         ' Y = ',Y*GRID:-10:3);
    R := FSWRITEW (OW+5,$REP,BUFFER);
    R := FSDISPLAY ($NOWAIT,$NOALARM);
    GSCREAD(1,TABX,TABY,KEYTYPE,AKEYVAL,PKEYVAL,TABX,TABY);
  END;  (* LOOP UNTIL CANCELED *)
  (* RESTORE MENU FIELD *)
  WRITESTR (BUFFER.S,'5 - POINT':-49);
  R := FSWRITEW (OW+5,$REP,BUFFER);
  R := FSMODW (OW+5,$OUT,$LOW,$ON);
(*R := FSDISPLAY ($NOWAIT,$NOALARM);*)
END;                                               (* END POINT_XHAIR        *)
%PAGE
(******************************************************************)
(*                                                                *)
(*   ROUTINE NAME: IDENT_XHAIR                                    *)
(*                                                                *)
(*   ROUTINE TYPE: PROCEDURE                                      *)
(*                                                                *)
(*   FUNCTION: IDENTIFY SHAPE CLOSEST TO THE COORDINATES OF THE   *)
(*             5080 CROSSHAIR.                                    *)
(*                                                                *)
(*   PARAMETERS: NONE                                             *)
(*                                                                *)
(*   RETURNS: NONE                                                *)
(*                                                                *)
(******************************************************************)
PROCEDURE IDENT_XHAIR (CONST MATRX : REAL_MATRIX_TYPE);
```

```
TYPE
  GL1_SHAPE = PACKED RECORD
                CASE INTEGER OF
                    1: (NR : GL1_MISC_SHAPE);
                    2: (RR : REAL_RECT);
                    3: (AL : GL1_ALINE);
                    4: (UL : GL1_ULINE);
                    5: (ALF: GL1_ALPHA);
                    END;

VAR
  ICELLP        : CELL_PTR;
  ISHP          : USYM_PTR;
  R,MAXDIST     : INTEGER;
  TABX,TABY     : INTEGER;
  KEYTYPE       : INTEGER;
  PKEYVAL       : INTEGER;
  CROW,CCOL     : INTEGER;
  X_SHIFT       : INTEGER;
  IDENT_RSHP    : PTR_INX;
  TARGET        : GL1_COORD;
  CPERIM        : GL1_PERIMETER;
  XPERIM        : GL1_PERIMETER;
  IDENT_SHAPE   : GL1_SHAPE;
  CURSW         : FSFLDE;
  MODCNT        : FSFLDE;
  MODWS         : FSMODWS;
  PFK           : FSKEY;
  WHOLENAME     : LDLNAME;
  CNAME,LNAME   : LDLNAME;
  IDSHP         : STRING(6);
  IDENT_CELL    : NAMED_SYMBOL_ENTRY;
  IDTYP         : UENTRY_KIND;
  AIDTYP        : UARRAY_KIND;
  RELOC_LVLP    : BOOLEAN;
  ITSARRAY      : BOOLEAN;
  AKEYVAL       : CHAR;
  SAVE_GTYPES   : GL1_AUSERS;

PROCEDURE PREP_FOR_DRAW;

BEGIN                                          (* BEGIN PREP_FOR_DRAW     *)
  GBEGW2 (FALSE,'FE'X);
  GNTRACK;
(*GRAPH_MODE := FALSE;
*)
  IF (IDENT_SHP.U <> NIL)
    THEN BEGIN
      RELOC_PS := RELOC_LVLP;
      ILEVELP->.GL.SHP_COLOR := 0;             (* 'UNDRAW'                *)
```

```
        ILEVELP->.GL.FILL_PATRN := 0;                    (*    IDENT           *)
        FILL_WINDOW (ICELLP,TDSP_PERIM,IDENT_MTX);        (*    SHAPE.          *)

LOADED_BLKS.UBLKS(.IDTYP.) := LOAD_BLOCKS.UBLKS(.IDTYP.);
        USE_ARCT := GL1MSG->.GM.USED_ARCT;
        ILEVELP->.GL.SHP_COLOR  := WHITE;  (* RESTORE                  *)
        ILEVELP->.GL.FILL_PATRN := -1;     (*    IDENT LEVEL           *)
        ILEVELP->.GL.LEVEL_SHFT := 0;      (*    PARAMETERS.           *)

IF (IDENT_TYP <> $RCT)
          THEN BEGIN
            XPERIM.LOW.X   := IDENT_SHAPE.NR.ENT.PERIMETER.LOW.X  - 1;
            XPERIM.LOW.Y   := IDENT_SHAPE.NR.ENT.PERIMETER.LOW.Y  - 1;
            XPERIM.HIGH.X  := IDENT_SHAPE.NR.ENT.PERIMETER.HIGH.X + 1;
            XPERIM.HIGH.Y  := IDENT_SHAPE.NR.ENT.PERIMETER.HIGH.Y + 1;
            END
          ELSE BEGIN
            XPERIM.LOW.X   := TRUNC (IDENT_SHAPE.RR.ENT.RPERIM.LOW.X)  - 1;
            XPERIM.LOW.Y   := TRUNC (IDENT_SHAPE.RR.ENT.RPERIM.LOW.Y)  - 1;
            XPERIM.HIGH.X  := TRUNC (IDENT_SHAPE.RR.ENT.RPERIM.HIGH.X) + 1;
            XPERIM.HIGH.Y  := TRUNC (IDENT_SHAPE.RR.ENT.RPERIM.HIGH.Y) + 1;
            END;

XPERIM := XLATE_RPERIM (XPERIM,IDENT_MTX);
        IF (XPERIM.LOW.X <= TDSP_PERIM.LOW.X)
          THEN XPERIM.LOW.X := TDSP_PERIM.LOW.X
          ELSE XPERIM.LOW.X := XPERIM.LOW.X - 1;

IF (XPERIM.LOW.Y <= TDSP_PERIM.LOW.Y)
          THEN XPERIM.LOW.Y := TDSP_PERIM.LOW.Y
          ELSE XPERIM.LOW.Y := XPERIM.LOW.Y - 1;

IF (XPERIM.HIGH.X >= TDSP_PERIM.HIGH.X)
          THEN XPERIM.HIGH.X := TDSP_PERIM.HIGH.X
          ELSE XPERIM.HIGH.X := XPERIM.HIGH.X + 1;

IF (XPERIM.HIGH.Y >= TDSP_PERIM.HIGH.Y)
          THEN XPERIM.HIGH.Y := TDSP_PERIM.HIGH.Y
          ELSE XPERIM.HIGH.Y := XPERIM.HIGH.Y + 1;
        FILL_WINDOW (DRAW_CELL,XPERIM,MATRX);   (* RESTORE IDENT WINDOW.*)
        END;
END;                                            (* END PREP_FOR_DRAW          *)
%PAGE
BEGIN                                           (* BEGIN IDENT_XHAIR          *)
(* XSHFT := LVL_SHF * DEPTH_FAC * MIN_RSH *)
(* YSHFT := -XSHFT * TAN_SHIFT            *)
  IF (EMPTY_CELL IN DRAW_CELL->.GC.FLAGS)
    THEN RETURN;

R := FSMODW (OW+7,$OUT,$HIGH,$ON);
```

```
    SAVE_GTYPES := DSPL_GTYPES;
    $GETNSYM (IDENT_CELL,ICELLP);
    $GETUSYM (IDENT_SHAPE.NR,ISHP);

IDENT_SHP.U := NIL;
    CPERIM   := XLATE_RPERIM (DRAW_CELL->.GC.PERIMETER,MATRX);
    X_SHIFT  := DEPTH_FACTR * MIN_RSHFT;
    TARGET.X := 0;
    TARGET.Y := 0;

REPEAT
      GSCREAD (1,TARGET.X,TARGET.Y,KEYTYPE,AKEYVAL,PKEYVAL,
                                                 TARGET.X,TARGET.Y);
      IF (KEYTYPE <> 5) OR            (* COLLECT POINTS UNTIL    *)
         (PKEYVAL <> 0)               (*   UNTIL USER CANCELS.   *)
        THEN LEAVE;

PREP_FOR_DRAW;

MAXDIST := MAX (ABS(TARGET.X - CPERIM.LOW.X),
                    ABS(TARGET.X - CPERIM.HIGH.X),
                    ABS(TARGET.Y - CPERIM.LOW.Y),
                    ABS(TARGET.Y - CPERIM.HIGH.Y));
    WPERIM.LOW.X   := TARGET.X - MAXDIST;
    WPERIM.LOW.Y   := TARGET.Y - MAXDIST;
    WPERIM.HIGH.X  := TARGET.X + MAXDIST;
    WPERIM.HIGH.Y  := TARGET.Y + MAXDIST;

RMIN_DIST := MAXINT;
    DSPL_GTYPES := DSPL_GTYPES - (.XFMATT.);  (* PREVENT DISPLAYING *)
                                              (* PLACEMENT ATTRIBUTES IN PAGE_XFRM.*)
(*  FIND_SHAPE (DRAW_CELL,MATRX);
*)  IF STEREO_MODE
      THEN BEGIN
        SHFT_PERIM.LOW.X  := TARGET.X + X_SHIFT;
        SHFT_PERIM.HIGH.X := SHFT_PERIM.LOW.X;
        SHFT_PERIM.LOW.Y  := TARGET.Y + ROUND(-X_SHIFT * TAN_SHIFT);
        SHFT_PERIM.HIGH.Y := SHFT_PERIM.LOW.Y;
        FIND_3D_SHAPE (DRAW_CELL,MATRX)
        END
      ELSE BEGIN
(*      XSHIFT.X := 0;
        XSHIFT.Y := 0;
*)      FIND_2D_SHAPE (DRAW_CELL,MATRX);
        END;

DSPL_GTYPES := SAVE_GTYPES;
    WITH IDENT_CELL DO
      BEGIN
        GC := NULL_GL1CELL;
        GC.FLAGS := (.REAL_CELL,REFERENCED_CELL,SHAPES_EXIST,
                                          REAL_SHAPES_EXIST.);
        ITSARRAY := FALSE;
```

```
      CASE IDENT_TYP OF
        $ALF : BEGIN
                 IDTYP := $GL1ALF;
                 IDSHP := 'ALPHA';
                 GC.ALPHAS := ISHP;
               END;
        $RCT : BEGIN
                 IF USE_ARCT
                   THEN BEGIN
                     ITSARRAY := TRUE;
                     AIDTYP := $GL1ARCT;
                     USE_ARCT := FALSE;   (* RESTORE LATER *)
                     END;
                 IDTYP := $GL1RCT;
                 IDSHP := 'RECT';
                 GC.RECTANGLES := ISHP;
               END;
        $PLY : BEGIN
                 IDTYP := $GL1PLY;
                 IDSHP := 'POLY';
                 GC.POLYGONS := ISHP;
               END;
        $MSC : BEGIN
                 IDTYP := $GL1MSC;
                 IDSHP := 'CIRCLE';
                 GC.MSHAPES := ISHP;
               END;
        $ALN,
        $ULN : BEGIN
                 IF (IDENT_TYP = $ALN)
                   THEN BEGIN
                     ITSARRAY := TRUE;
                     AIDTYP := $GL1ALN;
                     END;
                 IDTYP  := $GL1ULN;
                 IDSHP  := 'LINE';
                 GC.ULINES := ISHP;
               END;
        END;
    END;

IF ITSARRAY
  THEN BEGIN
    RELOC_LVLP := NOT LOADED_BLKS.ABLKS(.AIDTYP.);
    RELOC_UINX (AIDTYP,IDENT_SHP.X,IDENT_RSHP.U);
    END
  ELSE IF NOT LOADED_BLKS.UBLKS(.IDTYP.)
    THEN BEGIN
      RELOC_UPTR (IDTYP,IDENT_SHP.U,IDENT_RSHP.U);
      RELOC_LVLP := TRUE;
      END
```

```
      ELSE BEGIN
        IDENT_RSHP.U := IDENT_SHP.U;
        RELOC_LVLP := FALSE;
        END;

LOADED_BLKS.UBLKS(.IDTYP.) := TRUE;    (* RESTORE LATER *)
    IDENT_SHAPE.NR := IDENT_RSHP.U->.GZ;
    IF (IDENT_TYP = $ALN)
      THEN IDENT_SHAPE.UL.WIDTH := IDENT_SHAPE.AL.WIDTH;
    IDENT_SHAPE.NR.NEXT := NIL;

IF RELOC_LVLP
      THEN BEGIN
        $RLCSYMP (IDENT_SHAPE.NR.ENT.LEVEL,
                                SYMTPTR->.NINFO(.$GL1_LEVL.).RLOCP);
        RELOC_PS := TRUE;
        WITH IDENT_SHAPE DO
          IF (IDENT_TYP = $RCT)
            THEN BEGIN
              RR.ENT.RPERIM.LOW.X   := NR.ENT.PERIMETER.LOW.X;
              RR.ENT.RPERIM.LOW.Y   := NR.ENT.PERIMETER.LOW.Y;
              RR.ENT.RPERIM.HIGH.X := NR.ENT.PERIMETER.HIGH.X;
              RR.ENT.RPERIM.HIGH.Y := NR.ENT.PERIMETER.HIGH.Y;
              END
            ELSE IF (IDTYP = $GL1ALF)
              THEN RELOC_UUPTR ($GL1ALF,$TEXT,ALF.TEXT,ALF.TEXT);
        END;

WHOLENAME := IDENT_SHAPE.NR.ENT.LEVEL->.SYMB_NAME_PTR->;
    LNAME := SUBSTR(WHOLENAME,1,LENGTH(WHOLENAME)-1);
    WHOLENAME := IDENT_CEL->.SYMB_NAME_PTR->;
    CNAME := SUBSTR(WHOLENAME,1,LENGTH(WHOLENAME)-1);

WRITESTR (WHOLENAME,'7 - ',IDSHP,
                              ' IS ON LEVEL ',LNAME,' IN CELL ',CNAME);
    WRITESTR (BUFFER.S,WHOLENAME:-65);
    R := FSWRITEW (OW+7,$REP,BUFFER);
    R := FSDISPLAY ($NOWAIT,$NOALARM);

ILEVELP->.GL.FILL_PATRN := IDENT_SHAPE.NR.ENT.LEVEL->.GL.FILL_PATRN;
    ILEVELP->.GL.LEVEL_SHFT := IDENT_SHAPE.NR.ENT.LEVEL->.GL.LEVEL_SHFT;
    IDENT_SHAPE.NR.ENT.LEVEL := ILEVELP;
    FILL_WINDOW (ICELLP,TDSP_PERIM,IDENT_MTX);
    GSFRCE;
UNTIL FALSE;                               (* END LOOP UNTIL CANCELED. *)

IF (IDENT_SHP.U <> NIL)
  THEN BEGIN
    PREP_FOR_DRAW;
    GSFRCE;
    END;
```

```
   (* RESTORE MENU FIELD *)
   WRITESTR (BUFFER.S,'7 - IDENT':-65);
   R := FSWRITEW (OW+7,$REP,BUFFER);
   R := FSMODW (OW+7,$OUT,$LOW,$ON);
(*R := FSDISPLAY ($NOWAIT,$NOALARM);
*)
END;                                          (* END IDENT_XHAIR        *)
%PAGE
(**********************************************************************)
(*                                                                    *)
(*   ROUTINE NAME: RESET_MAIN_MENU                                    *)
(*                                                                    *)
(*   ROUTINE TYPE: PROCEDURE                                          *)
(*                                                                    *)
(*   FUNCTION: TURN OFF FIELDS OF MAIN MENU                           *)
(*                                                                    *)
(*   PARAMETERS: NONE                                                 *)
(*                                                                    *)
(*   RETURNS: NONE                                                    *)
(*                                                                    *)
(**********************************************************************)
PROCEDURE RESET_MAIN_MENU (CONST HFLD : FSFLDS);

VAR
  I,R : INTEGER;

BEGIN                                         (* BEGIN RESET_MAIN_MENU  *)
(*
  ASSAVE('MENU');
*)
  FOR I := IW TO IW+NIW-1 DO
    R := FSMODW (I,$ALPHA,$HIGH,$OFF);
  FOR I := OW TO OW+NOW-1 DO
    R := FSMODW (I,$OUT,$LOW,$OFF);

R := FSMODW (HFLD  ,$OUT,$LOW ,$ON);        (* TURN ON HEADER FIELD.  *)
  R := FSMODW (HFLD+1,$OUT,$HIGH,$ON);        (* TURN ON PFK INFO FIELD.*)
  ASCURS (HFLD+2,1,1);                        (* display cursor         *)
END;                                          (* END RESET_MAIN_MENU    *)
%PAGE
(**********************************************************************)
(*                                                                    *)
(*   ROUTINE NAME: RESTORE_MAIN_MENU                                  *)
(*                                                                    *)
(*   ROUTINE TYPE: PROCEDURE                                          *)
(*                                                                    *)
(*   FUNCTION: TURN ON FIELDS OF MAIN MENU                            *)
(*                                                                    *)
(*   PARAMETERS: NONE                                                 *)
(*                                                                    *)
(*   RETURNS: NONE                                                    *)
```

```
(*                                                                  *)
(********************************************************************)
PROCEDURE RESTORE_MAIN_MENU (CONST HFLD  : FSFLDS;
                             CONST NFLDS : INTEGER;
                             CONST OFLD  : FSFLDS);

VAR
  I,R : INTEGER;

BEGIN                                    (* BEGIN RESTORE_MAIN_MENU *)
  FOR I := IW TO IW+NIW-1 DO
    R := FSMODW (I,$ALPHA,$HIGH,$ON);
/*R := FSMODW (IW,$OUT,$LOW,$ON);
*/
  FOR I := OW TO OW+NOW-1 DO
    R := FSMODW (I,$OUT,$LOW,$ON);
  R := FSMODW (PFKW+6,$OUT,$HIGH,$ON);

R := FSMODW (HFLD  ,$OUT,$LOW ,$OFF);  (* TURN OFF HEADER FIELD.   *)
  R := FSMODW (HFLD+1,$OUT,$HIGH,$OFF);  (* TURN OFF PFK INFO FIELD. *)

FOR I := 2 TO NFLDS+1 DO
    BEGIN
      R := FSMODW (HFLD+I,$ALPHA,$HIGH,$OFF);
      IF (FLDTYP = LVLFLD)
        THEN BEGIN
          R := FSMODW (HFLD+I+  NLW,$ALPHA,$HIGH,$OFF);
          IF (LNC = LNCS)                (* IF STEREO MODE IS 'ON' ..*)
            THEN R := FSMODW (HFLD+I+2*NLW,$ALPHA,$HIGH,$OFF);
          END;
      R := FSMODW (OFLD+I-2,$OUT,$LOW,$OFF);
    END;
(*
  ASREST('MENU');
*)
END;                                     (* END RESTORE_MAIN_MENU   *)
%PAGE
(********************************************************************)
(*                                                                  *)
(*  ROUTINE NAME: SET_WINDOW                                        *)
(*                                                                  *)
(*  ROUTINE TYPE: PROCEDURE                                         *)
(*                                                                  *)
(*  FUNCTION: INITIALIZE DISPLAY FOR GL1 DISPLAY                    *)
(*                                                                  *)
(*  PARAMETERS: NONE                                                *)
(*                                                                  *)
(*  RETURNS: NONE                                                   *)
(*                                                                  *)
(********************************************************************)
PROCEDURE SET_WINDOW;
```

```
VAR
  R : INTEGER;

BEGIN                                           (* BEGIN SET_WINDOW        *)
  WINDOW_SET := FALSE;
  WITH WINDOW DO
    BEGIN
      BUFFER.S := '';
      IF NOT (EMPTY_CELL IN DRAW_CELL->.GC.FLAGS)
        THEN WRITESTR (BUFFER.S,LOX*GRID:10:3);
      R := FSWRITEW (IW+3,$REP,BUFFER);
      IF NOT (EMPTY_CELL IN DRAW_CELL->.GC.FLAGS)
        THEN WRITESTR (BUFFER.S,LOY*GRID:10:3);
      R := FSWRITEW (IW+4,$REP,BUFFER);
      IF NOT (EMPTY_CELL IN DRAW_CELL->.GC.FLAGS)
        THEN WRITESTR (BUFFER.S,HIX*GRID:10:3);
      R := FSWRITEW (IW+5,$REP,BUFFER);
      IF NOT (EMPTY_CELL IN DRAW_CELL->.GC.FLAGS)
        THEN WRITESTR (BUFFER.S,HIY*GRID:10:3);
      R := FSWRITEW (IW+6,$REP,BUFFER);
    END;
END;                                             (* END SET_WINDOW          *)
%PAGE
(*******************************************************************)
(*                                                                 *)
(*   ROUTINE NAME: SET_SHADOW                                      *)
(*                                                                 *)
(*   ROUTINE TYPE: PROCEDURE                                       *)
(*                                                                 *)
(*   FUNCTION: INITIALIZE DISPLAY FOR GL1 DISPLAY                  *)
(*                                                                 *)
(*   PARAMETERS: NONE                                              *)
(*                                                                 *)
(*   RETURNS: NONE                                                 *)
(*                                                                 *)
(*******************************************************************)
PROCEDURE SET_SHADOW;

VAR
  R : INTEGER;

BEGIN                                           (* BEGIN SET_SHADOW        *)
  SHADOW.LOW.X   := DRAW_CELL->.GC.PERIMETER.LOW.X;
  WINDOW.LOX := SHADOW.LOW.X;
  SHADOW.LOW.Y   := DRAW_CELL->.GC.PERIMETER.LOW.Y;
  WINDOW.LOY := SHADOW.LOW.Y;
  SHADOW.HIGH.X := DRAW_CELL->.GC.PERIMETER.HIGH.X;
  WINDOW.HIX := SHADOW.HIGH.X;
  SHADOW.HIGH.Y := DRAW_CELL->.GC.PERIMETER.HIGH.Y;
  WINDOW.HIY := SHADOW.HIGH.Y;
  IF (EMPTY_CELL IN DRAW_CELL->.GC.FLAGS)
```

```
           THEN BUFFER.S := 'LOWER LEFT'
           ELSE WRITESTR (BUFFER.S,'LOWER LEFT  ',SHADOW.LOW.X*GRID:10:3,
                                   ' ',SHADOW.LOW.Y*GRID:10:3);
     R := FSWRITEW (OW+14,$REP,BUFFER);

IF (EMPTY_CELL IN DRAW_CELL->.GC.FLAGS)
        THEN BUFFER.S := 'UPPER RIGHT'
        ELSE WRITESTR (BUFFER.S,'UPPER RIGHT ',SHADOW.HIGH.X*GRID:10:3,
                                   ' ',SHADOW.HIGH.Y*GRID:10:3);
     R := FSWRITEW (OW+15,$REP,BUFFER);
     SET_WINDOW;
END;                                           (* END SET_SHADOW          *)
%PAGE
(*********************************************************************)
(*                                                                   *)
(*   ROUTINE NAME: TEST_IO                                           *)
(*                                                                   *)
(*   ROUTINE TYPE: PROCEDURE                                         *)
(*                                                                   *)
(*   FUNCTION: TEST TO SEE IF PFK PRESSED TO TERMINATE DISPLAY OP.   *)
(*                                                                   *)
(*   PARAMETERS: NONE                                                *)
(*                                                                   *)
(*   RETURNS: ABORT - BOOLEAN FLAG INDICATING IF TERMINATION REQ.    *)
(*                                                                   *)
(*********************************************************************)
PROCEDURE TEST_IO (VAR ABORT : BOOLEAN);                    EXTERNAL;
PROCEDURE TEST_IO;

VAR
    ATTYPE : INTEGER;
    ATTMOD : INTEGER;

BEGIN                                          (* BEGIN TEST_IO           *)
    ASTEST (ATTYPE,ATTMOD);
(*IF (ATTYPE = 1) AND                          (* IF USER PRESSED         *)
    (ATTMOD = 12)                              (*   PFK12 DURING DRAW.    *)
*)IF (ATTYPE = 0) AND                          (* IF USER PRESSED         *)
    (ATTMOD = 0)                               (*   ENTER DURING DRAW.    *)
     THEN ABORT := TRUE;
(*  ELSE ABORT := FALSE;
*)
END;                                           (* END TEST_IO             *)
%PAGE
(*********************************************************************)
(*                                                                   *)
(*   ROUTINE NAME: IDENTIFY_SHAPE                                    *)
(*                                                                   *)
(*   ROUTINE TYPE: PROCEDURE                                         *)
(*                                                                   *)
(*   FUNCTION: IDENTIFY SHAPE NEAREST TO WHERE USER PLACES CROSSHAIR *)
```

```
(*                                                                    *)
(*   PARAMETERS: NONE                                                  *)
(*                                                                    *)
(*   RETURNS:                                                          *)
(*     1) XD    - X-COORDINATE OF CROSSHAIR                            *)
(*     2) YD    - Y-COORDINATE OF CROSSHAIR                            *)
(*                                                                    *)
(*********************************************************************)
PROCEDURE IDENTIFY_SHAPE;

VAR
  ENTID    : INTEGER;
  XD,YD    : INTEGER;
  ATTYPE   : INTEGER;
  ATTMOD   : INTEGER;
  LEN      : INTEGER;
  DIST     : SHORTREAL;
  KEY      : CHAR;
(*UNBLINK : BOOLEAN;
*)
begin                                    (* begin IDENTIFY_SHAPE    *)
  IF HARRIER
    THEN RETURN;
(*UNBLINK := FALSE;
  ENTID := -1;
*)REPEAT
    GSRXYC (ATTYPE,ATTMOD,1,LEN,KEY,XD,YD);
(*  IF UNBLINK
      THEN GSSEMD (1,0,0,0);
*)(*IF (ENTID > 0)
      THEN GSSEMD (ENTID,0,0,0);
*)  IF LEN <= 0
      THEN RETURN;
    IDENT_SHAPE (DRAW_CELL,WINDOW,XD,YD,DIST);
    IF (DIST < 1000)
      THEN WRITELN(DIST)
      ELSE WRITELN('GT1000');
(*  UNBLINK := DIST < 1000;
    GSCORR (XD,YD,50,ENTID);
    IF (ENTID > 0)
      THEN GSSEMD (ENTID,2,0,0);
*)UNTIL FALSE;
END;                                     (* END IDENTIFY_SHAPE      *)
%PAGE
*/
(*********************************************************************)
(*                                                                    *)
(*   ROUTINE NAME: ADD_LEVEL                                           *)
(*                                                                    *)
(*   ROUTINE TYPE: PROCEDURE                                           *)
```

```
(*                                                                      *)
(*  FUNCTION: ADD LEVEL TO TABLE IN ASCENDING SORT ORDER.                *)
(*                                                                      *)
(*  PARAMETERS:                                                         *)
(*    1) LVLP - POINTER TO GL/1 LEVEL BLOCK                              *)
(*    2) NLVL - NUMBER OF LEVELS IN TABLE ALREADY.                       *)
(*                                                                      *)
(*  RETURNS:                                                            *)
(*    1) INDX - TABLE INDEX WHERE LEVEL SHOULD BE INSERTED.              *)
(*                                                                      *)
(************************************************************************)
PROCEDURE ADD_LEVEL (CONST LVLP : LEVEL_PTR;
                     CONST NLVL : INTEGER;
                     VAR   INDX : INTEGER);

VAR
  I,J     : INTEGER;
/*WHOLENM : LDLNAME;
*/NEWNM16 : ALPHA;
  OLDNM16 : ALPHA;

BEGIN                                       (* BEGIN ADD_LEVEL         *)
/*WHOLENM := LVLP->.SYMB_NAME_PTR->;
  NEWNM16 := SUBSTR(WHOLENM,1,LENGTH(WHOLENM)-1);
*/NEWNM16 := LVLP->.SYMB_NAME_PTR->;
  FOR I := 1 TO NLVL DO
    BEGIN
/*    WHOLENM := LEVLD->(.I.).LEVLP->.SYMB_NAME_PTR->;
      OLDNM16 := SUBSTR(WHOLENM,1,LENGTH(WHOLENM)-1);
*/    OLDNM16 := LEVLD->(.I.).LEVLP->.SYMB_NAME_PTR->;
      IF (NEWNM16 < OLDNM16)
        THEN BEGIN
          FOR J := NLVL DOWNTO I DO
            LEVLD->(.J+1.).LEVLP := LEVLD->(.J.).LEVLP;
          INDX := I;
          RETURN;
          END;
    END;

INDX := NLVL + 1;
END;                                        (* END ADD_LEVEL           *)
%PAGE
/************************************************************************)
(*                                                                      *)
(*  ROUTINE NAME: ADD_CELL                                              *)
(*                                                                      *)
(*  ROUTINE TYPE: PROCEDURE                                             *)
(*                                                                      *)
(*  FUNCTION: ADD CELL TO TABLE IN ASCENDING SORT ORDER.                *)
(*                                                                      *)
```

```
(*  PARAMETERS:                                                      *)
(*    1) CELP - POINTER TO GL/1 CELL BLOCK.                          *)
(*    2) NCEL - NUMBER OF CELLS IN TABLE ALREADY.                    *)
(*                                                                    *)
(*  RETURNS:                                                          *)
(*    1) INDX - TABLE INDEX WHERE CELL SHOULD BE INSERTED.            *)
(*                                                                    *)
(*********************************************************************)
PROCEDURE ADD_CELL (CONST CELP : CELL_PTR;
                    CONST NCEL : INTEGER;
                    VAR   INDX : INTEGER);

VAR
  I,J     : INTEGER;
  WHOLENM : LDLNAME;
  NEWNM16 : ALPHA;
  OLDNM16 : ALPHA;

BEGIN                                       (* BEGIN ADD_CELL      *)
  WHOLENM := CELP->.SYMB_NAME_PTR->;
  NEWNM16 := SUBSTR(WHOLENM,1,LENGTH(WHOLENM)-1);
  FOR I := 1 TO NCEL DO
    BEGIN
      WHOLENM := CELLD->(.I.).CELLP->.SYMB_NAME_PTR->;
      OLDNM16 := SUBSTR(WHOLENM,1,LENGTH(WHOLENM)-1);
      IF (NEWNM16 < OLDNM16)
        THEN BEGIN
          FOR J := NCEL DOWNTO I DO
            CELLD->(.J+1.).CELLP := CELLD->(.J.).CELLP;
          INDX := I;
          IF (INDX <= DRAW_CEL_IX)
            THEN DRAW_CEL_IX := DRAW_CEL_IX + 1;
          RETURN;
          END;
    END;

INDX := NCEL + 1;
END;                                        (* END ADD_CELL        *)
%PAGE
*/
(*********************************************************************)
(*                                                                    *)
(*  ROUTINE NAME: ADD_CELL                                            *)
(*                                                                    *)
(*  ROUTINE TYPE: PROCEDURE                                           *)
(*                                                                    *)
(*  FUNCTION: ADD CELL TO TABLE IN ASCENDING SORT ORDER.              *)
(*                                                                    *)
(*  PARAMETERS:                                                       *)
(*    1) CELP - POINTER TO GL/1 CELL BLOCK.                           *)
(*    2) NCEL - NUMBER OF CELLS IN TABLE ALREADY.                     *)
```

```
(*                                                                    *)
(*  RETURNS:                                                          *)
(*   1) INDX - TABLE INDEX WHERE CELL SHOULD BE INSERTED.             *)
(*                                                                    *)
(**********************************************************************)
PROCEDURE ADD_CELL (CONST CELP : CELL_PTR;
                    CONST NCEL : INTEGER;
                    VAR   INDX : INTEGER);

VAR
  I,J    : INTEGER;
  I1,HX  : INTEGER;
  NEWNM16 : ALPHA;
  OLDNM16 : ALPHA;

BEGIN                                    (* BEGIN ADD_CELL          *)
  NEWNM16 := CELP->.SYMB_NAME_PTR->;
  I1 := 1;
  HX := NCEL;
  WHILE (HX > 1) DO
    BEGIN
      HX := HX DIV 2;
      OLDNM16 := CELLD->(.HX.).CELLP->.SYMB_NAME_PTR->;
      IF (NEWNM16 > OLDNM16)
        THEN BEGIN
          I1 := HX + 1;
          LEAVE;
          END;
    END;

FOR I := I1 TO NCEL DO
    BEGIN
      OLDNM16 := CELLD->(.I.).CELLP->.SYMB_NAME_PTR->;
      IF (NEWNM16 < OLDNM16)
        THEN BEGIN
          FOR J := NCEL DOWNTO I DO
            CELLD->(.J+1.).CELLP := CELLD->(.J.).CELLP;
          INDX := I;
          IF (INDX <= DRAW_CEL_IX)
            THEN DRAW_CEL_IX := DRAW_CEL_IX + 1;
          RETURN;
          END;
    END;

INDX := NCEL + 1;
END;                                     (* END ADD_CELL            *)
%PAGE
(**********************************************************************)
(*                                                                    *)
(*  ROUTINE NAME: GET_LVL_DATA                                        *)
(*                                                                    *)
```

```
(*  ROUTINE TYPE: PROCEDURE                                           *)
(*                                                                    *)
(*  FUNCTION: THIS PROCEDURE INITIALIZES SYMBOL TABLE GL/1 LEVEL      *)
(*            BLOCKS WITH COLOR/FILL SELECTIONS FROM USER FILE.       *)
(*                                                                    *)
(*  PARAMETERS: NONE                                                  *)
(*                                                                    *)
(*  RETURNS: NONE                                                     *)
(*                                                                    *)
(**********************************************************************)
PROCEDURE GET_LVL_DATA;

VAR
  LEVELP  : LEVEL_PTR;
  I,J,RC  : INTEGER;
  INEW    : INTEGER;
  PATNUM  : INTEGER;
  PATCLR  : INTEGER;
  PENWID  : INTEGER;
  PATBCK  : INTEGER;
  LSHIFT  : INTEGER;
  FILL1   : ALFA;
  FILL2   : FOURCHAR;
  FILL3   : FOURCHAR;
  FILL4   : FOURCHAR;
  FILL5   : FOURCHAR;
  LVLNAM  : STBLNAM;
  LVLNAME : GL1_NAM48;
  NEWLVL  : BOOLEAN;

BEGIN                                         (* BEGIN GET_LVL_DATA    *)
  N_DLVLS := 0;
  LEVELP := GL1MSG->.GM.LEVELS;
  WHILE (LEVELP <> NIL) DO
    WITH LEVELP-> DO
      BEGIN
        IF (REFERENCED_LEVEL IN GL.FLAGS)
          THEN N_DLVLS := N_DLVLS + 1;
        GL.SHP_COLOR  := 0;
        GL.FILL_PATRN := -1;
        GL.PEN_WIDTH  := 1;
        GL.PAT_BACK   := 9;
        GL.LEVEL_SHFT := 0;
        GL.FLAGS := GL.FLAGS - (.DISPLAYED_LEVEL.);
        LEVELP := NEXT_SYMB;
      END;

/*IF CLRS_EXIST
    THEN BEGIN
      RESET (LVLCLRS,COLORDS);
      WHILE NOT EOF(LVLCLRS) DO
```

```
              BEGIN
                CLRDATA.CF := LVLCLRS->;
*/       RESET (LVLCLRSI);
            WHILE NOT EOF(LVLCLRSI) DO
              BEGIN
                CLRDATA.CF := LVLCLRSI->;
                IF (CLRDATA.S(.26.) = ' ')
                  THEN IF (CLRDATA.S(.5.) = '=')
                    THEN READSTR (CLRDATA.S,FILL1:7,PENWID:1,FILL2:3,PATNUM:2,
/*                                 FILL3:3,PATCLR:1,FILL4:4,PATBCK:3,
*/                                 FILL3:3,PATCLR:2,FILL3:3,PATBCK:3,
                                   FILL5:3,LSHIFT:3,LVLNAME:50)
(* FOR 4-DIGIT LEVEL NUMBER *)
                    ELSE READSTR (CLRDATA.S,FILL1:9,PENWID:1,FILL2:3,PATNUM:2,
/*                                 FILL3:3,PATCLR:1,FILL4:4,PATBCK:3,
*/                                 FILL3:3,PATCLR:2,FILL3:3,PATBCK:3,
                                   FILL5:3,LSHIFT:3,LVLNAME:48)
                  ELSE BEGIN
                    IF (CLRDATA.S(.5.) = '=')
                      THEN READSTR (CLRDATA.S,FILL1:7,PENWID:1,FILL2:3,
/*                      PATNUM:2,FILL3:3,PATCLR:1,FILL4:4,PATBCK:4,LVLNAME:55)
*/                      PATNUM:2,FILL3:3,PATCLR:2,FILL3:3,PATBCK:4,LVLNAME:55)
(* FOR 4-DIGIT LEVEL NUMBER *)
                      ELSE READSTR (CLRDATA.S,FILL1:9,PENWID:1,FILL2:3,
/*                      PATNUM:2,FILL3:3,PATCLR:1,FILL4:4,PATBCK:4,LVLNAME:55);
*/                      PATNUM:2,FILL3:3,PATCLR:2,FILL3:3,PATBCK:4,LVLNAME:53);
                    LSHIFT := 5;
                    END;
                LVLNAM := TRIM (STR (LVLNAME));
                ADD_NENTRY ($GL1_LEVL,LVLNAM,LEVELP,NEWLVL);
                WITH LEVELP->.GL DO
                  BEGIN
                    IF NEWLVL
                      THEN BEGIN
                        NUMBER := GL1MSG->.GM.MAX_LNUM + 1;
                        GL1MSG->.GM.MAX_LNUM := NUMBER;
                        END
                      ELSE IF (PATCLR < 0)
                        THEN PATCLR := 0;
                    SHP_COLOR  := PATCLR;
                    IF (PATNUM = 1)
                      THEN FILL_PATRN := -1
                      ELSE FILL_PATRN := PATNUM;
                    PEN_WIDTH  := PENWID;
                    PAT_BACK   := PATBCK;
                    LEVEL_SHFT := 50 - LSHIFT;
                  END;
/*          GET (LVLCLRS);
              END;
            CLOSE (LVLCLRS);
*/          GET (LVLCLRSI);
          END;
```

```
            CLOSE (LVLCLRSI);
/*        END;
*/
      GETSTOR ((N_DLVLS+1)*SIZEOF(LEVEL_DATA),LEVLD,RC);
      I := 0;
      MAX_SHIFT := 0;
      LEVELP := GL1MSG->.GM.LEVELS;
      WHILE (LEVELP <> NIL) DO
        WITH LEVELP-> DO
          BEGIN
            IF (REFERENCED_LEVEL IN GL.FLAGS)
              THEN BEGIN
                ADD_LEVEL (LEVELP,I,INEW);
/*              WITH LEVLD->(.INEW.) DO
                  BEGIN
                    LEVLP := LEVELP;
                    ORIGF := GL.FILL_PATRN;
                    ORIGC := GL.SHP_COLOR;
                    ORIGD := GL.LEVEL_SHFT;
                  END;
*/              LEVLD->(.INEW.).LEVLP := LEVELP;
                IF (GL.SHP_COLOR > 0)
                  THEN BEGIN
                    GL.FLAGS := GL.FLAGS + (.DISPLAYED_LEVEL.);
                    IF (ABS(GL.LEVEL_SHFT) > MAX_SHIFT)
                      THEN MAX_SHIFT := ABS(GL.LEVEL_SHFT);
                  END;
                I := I + 1;
                END;

LEVELP := NEXT_SYMB;
          END;

CURLVL := 1;
      REM_LVLS := N_DLVLS;

FOR J := 1 TO N_DLVLS DO
        BEGIN
          WITH LEVLD->(.J.) DO
            BEGIN
              ORIGF := LEVLP->.GL.FILL_PATRN;
              ORIGC := LEVLP->.GL.SHP_COLOR;
              ORIGD := LEVLP->.GL.LEVEL_SHFT;
            END;
        END;
END;                                         (* END GET_LVL_DATA        *)
%PAGE
(******************************************************************)
(*                                                                *)
(*  ROUTINE NAME: PUT_LVL_DATA                                    *)
(*                                                                *)
```

```
(*   ROUTINE TYPE: PROCEDURE                                            *)
(*                                                                      *)
(*   FUNCTION: THIS PROCEDURE CREATES A COLOR/FILL SELECTION FILE       *)
(*             FROM ALL GL/1 LEVEL BLOCKS OCCURING IN THE SYMBOL        *)
(*             TABLE.                                                   *)
(*                                                                      *)
(*   PARAMETERS: NONE                                                   *)
(*                                                                      *)
(*   RETURNS: NONE                                                      *)
(*                                                                      *)
(**********************************************************************)
PROCEDURE PUT_LVL_DATA;

VAR
  LEVELP : LEVEL_PTR;
  I      : INTEGER;
  FILL   : HALFWD;

BEGIN                                         (* BEGIN PUT_LVL_DATA    *)
/*REWRITE (LVLCLRS,COLORDS);
*/REWRITE (LVLCLRSO);
  LEVELP := GL1MSG->.GM.LEVELS;
  WHILE (LEVELP <> NIL) DO
    WITH LEVELP-> DO
      BEGIN
        IF (GL.FILL_PATRN < 0)
          THEN FILL := 1
          ELSE FILL := GL.FILL_PATRN;
(*      WRITESTR (CLRDATA.S,'L',GL.NUMBER:-3,'= P',GL.PEN_WIDTH:-3,'T',
  FOR 4-DIGIT LEVEL NUMBER
*)      WRITESTR (CLRDATA.S,'L',GL.NUMBER:-5,'= P',GL.PEN_WIDTH:-3,'T',
                  FILL:-3,'PC',GL.SHP_COLOR:-3,'TC',GL.PAT_BACK:-5,
                  'D',(50-GL.LEVEL_SHFT):-3,
/*           SUBSTR(SYMB_NAME_PTR->,1,LENGTH(SYMB_NAME_PTR->)-1):-50);
  FOR 4-DIGIT LEVEL NUMBER
*/           SUBSTR(SYMB_NAME_PTR->,1,LENGTH(SYMB_NAME_PTR->)-1):-48);
/*      LVLCLRS-> := CLRDATA.CF;
        PUT (LVLCLRS);
*/      LVLCLRSO-> := CLRDATA.CF;
        PUT (LVLCLRSO);
        LEVELP := NEXT_SYMB;
      END;

/*CLOSE (LVLCLRS);
*/CLOSE (LVLCLRSO);
/*CLRS_EXIST := TRUE;
*/FOR I := 1 TO N_DLVLS DO
    WITH LEVLD->(.I.) DO
      BEGIN
        ORIGC := LEVLP->.GL.SHP_COLOR;
        ORIGF := LEVLP->.GL.FILL_PATRN;
```

```
                ORIGD := LEVLP->.GL.LEVEL_SHFT;
            END;
    END;                                    (* END PUT_LVL_DATA         *)
    %PAGE
    (**********************************************************************)
    (*                                                                    *)
    (*  ROUTINE NAME: INIT_LNAMES                                         *)
    (*                                                                    *)
    (*  ROUTINE TYPE: PROCEDURE                                           *)
    (*                                                                    *)
    (*  FUNCTION: THIS PROCEDURE INITIALIZES LEVEL NAME FIELDS.           *)
    (*                                                                    *)
    (*  PARAMETERS: NONE                                                  *)
    (*                                                                    *)
    (*  RETURNS: NONE                                                     *)
    (*                                                                    *)
    (**********************************************************************)
    PROCEDURE INIT_LNAMES;

VAR
       I,R    : INTEGER;
       LWLEN  : INTEGER;
       LOWX   : INTEGER;
       FLDSTS : FSWACT;

BEGIN                                   (* BEGIN INIT_LNAMES        *)
       LWLEN := 21 - LNC;
       FOR I := 1 TO CURLCNT DO
         WITH LEVLD->(.CURLVL+I-1.).LEVLP-> DO
           BEGIN
             R := LENGTH(SYMB_NAME_PTR->) - 1;
/*           IF (R > LWL)
               THEN R := LWL;
*/           IF (R > LWLEN)
               THEN R := LWLEN;
             BUFFER.S := SUBSTR(SYMB_NAME_PTR->,1,R);
             R := FSWRITEW (NMW+I-1,$REP,BUFFER);
           END;

IF (PREVCNT = CURLCNT)
         THEN RETURN;

IF (CURLCNT < NLW)
         THEN BEGIN
           LOWX := CURLCNT + 2;
           FLDSTS := $OFF;
           END
         ELSE BEGIN
           LOWX := PREVCNT + 2;
           FLDSTS := $ON;
           END;
```

```
      FOR I := LOWX TO NLW+1 DO
        BEGIN
          R := FSMODW (LHDR+I        ,$ALPHA,$HIGH,FLDSTS);
          R := FSMODW (LHDR+I+NLW    ,$ALPHA,$HIGH,FLDSTS);
          IF (LNC = LNCS)                     (* IF STEREO MODE IS 'ON'  ..*)
            THEN R := FSMODW (LHDR+I+2*NLW,$ALPHA,$HIGH,FLDSTS);
          R := FSMODW (NMW+I-2,$OUT,$LOW,FLDSTS);
        END;
END;                                          (* END INIT_LNAMES          *)
%PAGE
(*******************************************************************)
(*                                                                 *)
(*  ROUTINE NAME: INIT_CNAMES                                      *)
(*                                                                 *)
(*  ROUTINE TYPE: PROCEDURE                                        *)
(*                                                                 *)
(*  FUNCTION: THIS PROCEDURE INITIALIZES CELL NAME FIELDS.         *)
(*                                                                 *)
(*  PARAMETERS: NONE                                               *)
(*                                                                 *)
(*  RETURNS: NONE                                                  *)
(*                                                                 *)
(*******************************************************************)
PROCEDURE INIT_CNAMES;

VAR
  I,R    : INTEGER;
  LOWX   : INTEGER;
  FLDSTS : FSWACT;

BEGIN                                         (* BEGIN INIT_CNAMES        *)
  FOR I := 1 TO CURCCNT DO
    WITH CELLD->(.CURCEL+I-1.).CELLP-> DO
      BEGIN
        R := LENGTH(SYMB_NAME_PTR->) - 1;
        IF (R > CWL)
          THEN R := CWL;
        BUFFER.S := SUBSTR(SYMB_NAME_PTR->,1,R);
        R := FSWRITEW (NMW+I-1,$REP,BUFFER);
      END;
  IF (PREVCNT = CURCCNT)
    THEN RETURN;
  IF (CURCCNT < NCW)
    THEN BEGIN
      LOWX := CURCCNT + 2;
      FLDSTS := $OFF;
      END
    ELSE BEGIN
      LOWX := PREVCNT + 2;
      FLDSTS := $ON;
      END;
```

```
      FOR I := LOWX TO NCW+1 DO
        BEGIN
          R := FSMODW (CHDR+I,$ALPHA,$HIGH,FLDSTS);
          R := FSMODW (NMW+I-2,$OUT,$LOW,FLDSTS);
        END;
END;                                            (* END INIT_CNAMES         *)
%PAGE
(***********************************************************************)
(*                                                                     *)
(*                                                                     *)
(*  ROUTINE NAME: DEF_NAME_FLDS                                        *)
(*                                                                     *)
(*  ROUTINE TYPE: PROCEDURE                                            *)
(*                                                                     *)
(*  FUNCTION: THIS PROCEDURE DEFINES THE LEVEL/CELL NAME FIELDS.       *)
(*                                                                     *)
(*  PARAMETERS: NONE                                                   *)
(*                                                                     *)
(*  RETURNS: NONE                                                      *)
(*                                                                     *)
(***********************************************************************)
PROCEDURE DEF_NAME_FLDS (CONST   C1 : INTEGER;
                         CONST MAXN : INTEGER);

VAR
  I,R : INTEGER;
  C21 : INTEGER;
  C41 : INTEGER;
  C61 : INTEGER;
  W21 : INTEGER;
  W41 : INTEGER;
  W61 : INTEGER;
  NML : INTEGER;

BEGIN                                           (* BEGIN DEF_NAME_FLDS     *)
  NAMTYP := FLDTYP;
  NML := 21  - C1;
  C21 := C1  + 20;
  C41 := C21 + 20;
  C61 := C41 + 20;

W21 := NMW + 20;
  W41 := W21 + 20;
  W61 := W41 + 20;

FOR I := 0 TO 19 DO
    IF (I >= MAXN)
      THEN RETURN
      ELSE BEGIN
        R := FSDEFW (NMW+I,I+3,C1,1,NML,$OUT,$LOW,$ON);
        IF ((I+20) < MAXN)
```

```
              THEN BEGIN
                R := FSDEFW (W21+I,I+3,C21,1,NML,$OUT,$LOW,$ON);
                IF ((I+40) < MAXN)
                  THEN BEGIN
                    R := FSDEFW (W41+I,I+3,C41,1,NML,$OUT,$LOW,$ON);
                    IF ((I+60) < MAXN)
                      THEN R := FSDEFW (W61+I,I+3,C61,1,NML,$OUT,$LOW,$ON);
                    END;
                END;
          END;
END;                                          (* END DEF_NAME_FLDS       *)
%PAGE
(******************************************************************)
(*                                                                *)
(*  ROUTINE NAME: LEVEL_FIELDS                                    *)
(*                                                                *)
(*  ROUTINE TYPE: PROCEDURE                                       *)
(*                                                                *)
(*  FUNCTION: THIS PROCEDURE INITIALIZES COLOR SELECTION FIELDS.  *)
(*                                                                *)
(*  PARAMETERS: NONE                                              *)
(*                                                                *)
(*  RETURNS: NONE                                                 *)
(*                                                                *)
(******************************************************************)
PROCEDURE LEVEL_FIELDS;

VAR
  I,R : INTEGER;

BEGIN                                         (* BEGIN LEVEL_FIELDS      *)
(*----------------------------------------------------------------*)
(*  DEFINE THE LEVEL/COLOR SELECTION FIELDS.                      *)
(*----------------------------------------------------------------*)
  R := FSDEFW (LHDR,2,1,1,79,$OUT,$LOW,$OFF);
/*BUFFER.S := ' C/FP/D   LEVEL NAME   C/FP/D   LEVEL NAME ' ||
             ' C/FP/D   LEVEL NAME   C/FP/D   LEVEL NAME';
*/BUFFER.S := LHNS;
  R := FSWRITEW (LHDR,$REP,BUFFER);

R := FSDEFW (LPFKW,24,1,1,78,$OUT,$HIGH,$OFF);
  BUFFER.S := '1=OFF 2=WHT 3=RET 4=     FILL 5=SOLID 6=D50 ' ||
              '7=SCB 8=SCF 9=TOP 10=SAV 11=RST 12=BOT';
  R := FSWRITEW (LPFKW,$REP,BUFFER);

FOR I := 0 TO 19 DO
    IF (I < N_DLVLS)
      THEN BEGIN
        R := FSDEFW (LIC+I,I+3,2,1,1,$ALPHA,$HIGH,$OFF);
        R := FSDEFW (LIF+I,I+3,4,1,2,$ALPHA,$HIGH,$OFF);
        R := FSDEFW (LID+I,I+3,7,1,2,$ALPHA,$HIGH,$OFF);
```

```
      IF ((I+20) < N_DLVLS)
        THEN BEGIN
          R := FSDEFW (LIC+I+20,I+3,22,1,1,$ALPHA,$HIGH,$OFF);
          R := FSDEFW (LIF+I+20,I+3,24,1,2,$ALPHA,$HIGH,$OFF);
          R := FSDEFW (LID+I+20,I+3,27,1,2,$ALPHA,$HIGH,$OFF);
          IF ((I+40) < N_DLVLS)
            THEN BEGIN
              R := FSDEFW (LIC+I+40,I+3,42,1,1,$ALPHA,$HIGH,$OFF);
              R := FSDEFW (LIF+I+40,I+3,44,1,2,$ALPHA,$HIGH,$OFF);
              R := FSDEFW (LID+I+40,I+3,47,1,2,$ALPHA,$HIGH,$OFF);
              IF ((I+60) < N_DLVLS)
                THEN BEGIN
                  R := FSDEFW (LIC+I+60,I+3,62,1,1,$ALPHA,$HIGH,$OFF);
                  R := FSDEFW (LIF+I+60,I+3,64,1,2,$ALPHA,$HIGH,$OFF);
                  R := FSDEFW (LID+I+60,I+3,67,1,2,$ALPHA,$HIGH,$OFF);
                END;
            END;
         END;
      END;

IF (N_DLVLS > NLW)
    THEN CURLCNT := NLW
    ELSE CURLCNT := N_DLVLS;

/*PREVCNT := CURLCNT;
  INIT_LNAMES;
*/
END;                                          (* END LEVEL_FIELDS     *)
%PAGE
(***********************************************************************)
(*                                                                     *)
(*   ROUTINE NAME: CELL_FIELDS                                         *)
(*                                                                     *)
(*   ROUTINE TYPE: PROCEDURE                                           *)
(*                                                                     *)
(*   FUNCTION: THIS PROCEDURE INITIALIZES CELL SELECTION FIELDS.       *)
(*                                                                     *)
(*   PARAMETERS: NONE                                                  *)
(*                                                                     *)
(*   RETURNS: NONE                                                     *)
(*                                                                     *)
(***********************************************************************)
PROCEDURE CELL_FIELDS;

VAR
  I,R : INTEGER;

BEGIN                                         (* BEGIN CELL_FIELDS    *)
(*-------------------------------------------------------------------*)
(*   DEFINE THE CELL SELECTION FIELDS.                               *)
(*-------------------------------------------------------------------*)
```

```
R := FSDEFW (CHDR,2,1,1,76,$OUT,$LOW,$OFF);
BUFFER.S := ' SEL   CELL NAME       SEL   CELL NAME     ' ||
            '  SEL   CELL NAME       SEL   CELL NAME';
R := FSWRITEW (CHDR,$REP,BUFFER);

R := FSDEFW (CPFKW,24,1,1,77,$OUT,$HIGH,$OFF);
BUFFER.S := 'PF3=QUIT     PF7=SCB      PF8=SCF      PF9=TOP' ||
            '             PF10=SCB2    PF11=SCF2    PF12=BOT';
R := FSWRITEW (CPFKW,$REP,BUFFER);

FOR I := 0 TO 19 DO
  IF (I < N_CELLS)
    THEN BEGIN
      R := FSDEFW (CIW+I,I+3,3,1,2,$ALPHA,$HIGH,$OFF);
      IF ((I+20) < N_CELLS)
        THEN BEGIN
          R := FSDEFW (CIW+I+20,I+3,23,1,2,$ALPHA,$HIGH,$OFF);
          IF ((I+40) < N_CELLS)
            THEN BEGIN
              R := FSDEFW (CIW+I+40,I+3,43,1,2,$ALPHA,$HIGH,$OFF);
              IF ((I+60) < N_CELLS)
                THEN R := FSDEFW (CIW+I+60,I+3,63,1,2,$ALPHA,$HIGH,
                                                            $OFF);
            END;
          END;
        END;
  CURCEL := 1;
  REM_CELS := N_CELLS;
  IF (N_CELLS > NCW)
    THEN CURCCNT := NCW
    ELSE CURCCNT := N_CELLS;

/*PREVCNT := CURCCNT;
  INIT_CNAMES;
*/
END;                                         (* END CELL_FIELDS       *)
%PAGE
(***************************************************************)
(*                                                              *)
(*  ROUTINE NAME: ATTRIB_FIELDS                                 *)
(*                                                              *)
(*  ROUTINE TYPE: PROCEDURE                                     *)
(*                                                              *)
(*  FUNCTION: THIS PROCEDURE INITIALIZES ATTRIBUTE SELECTION FIELDS. *)
(*                                                              *)
(*  PARAMETERS: NONE                                            *)
(*                                                              *)
(*  RETURNS: NONE                                               *)
(*                                                              *)
(***************************************************************)
PROCEDURE ATTRIB_FIELDS;
```

```
VAR
  R : INTEGER;

BEGIN                                                    (* BEGIN ATTRIB_FIELDS   *)
(*----------------------------------------------------------------------*)
(*  DEFINE THE ATTRIBUTE SELECTION FIELDS.                              *)
(*----------------------------------------------------------------------*)
  R := FSDEFW (AHDR,7,13,1,41,$OUT,$LOW,$OFF);
  BUFFER.S := 'SELECT ATTRIBUTE TYPES FOR DISPLAY (Y/N)';
  R := FSWRITEW (AHDR,$REP,BUFFER);

R := FSDEFW (AOW  , 9,20,1,20,$OUT,$LOW,$OFF);
  BUFFER.S := '- NETNAME ATTRIBUTES';
  R := FSWRITEW (AOW  ,$REP,BUFFER);
  R := FSDEFW (AOW+1,10,20,1,22,$OUT,$LOW,$OFF);
  BUFFER.S := '- PLACEMENT ATTRIBUTES';
  R := FSWRITEW (AOW+1,$REP,BUFFER);
  R := FSDEFW (AOW+2,11,20,1,17,$OUT,$LOW,$OFF);
  BUFFER.S := '- LEAD ATTRIBUTES';
  R := FSWRITEW (AOW+2,$REP,BUFFER);

R := FSDEFW (AOW+3,13,20,1,23,$OUT,$LOW,$OFF);
  BUFFER.S := '- GL/1 SHAPE ATTRIBUTES';
  R := FSWRITEW (AOW+3,$REP,BUFFER);
  R := FSDEFW (AOW+4,14,20,1,22,$OUT,$LOW,$OFF);
  BUFFER.S := '- GL/1 CELL ATTRIBUTES';
  R := FSWRITEW (AOW+4,$REP,BUFFER);
  R := FSDEFW (AOW+5,15,20,1,27,$OUT,$LOW,$OFF);
  BUFFER.S := '- GL/1 TRANSFORM ATTRIBUTES';
  R := FSWRITEW (AOW+5,$REP,BUFFER);
  R := FSDEFW (AOW+6,17,20,1,26,$OUT,$LOW,$OFF);
  BUFFER.S := '- RELATIVE CHARACTER WIDTH';
  R := FSWRITEW (AOW+6,$REP,BUFFER);

/*R := FSDEFW (APFKW,16,62,1,18,$OUT,$LOW,$OFF);
  BUFFER.S := 'PA2   - CMS SUBSET';
  R := FSWRITEW (APFKW,$REP,BUFFER);

R := FSDEFW (APFKW+1,17,62,1,15,$OUT,$LOW,$OFF);
  BUFFER.S := 'PFK07 - ALL "Y"';
  R := FSWRITEW (APFKW+1,$REP,BUFFER);

R := FSDEFW (APFKW+2,18,62,1,15,$OUT,$LOW,$OFF);
  BUFFER.S := 'PFK08 - ALL "N"';
  R := FSWRITEW (APFKW+2,$REP,BUFFER);

R := FSDEFW (APFKW+3,19,62,1,14,$OUT,$LOW,$OFF);
  BUFFER.S := 'PFK12 - RETURN';
  R := FSWRITEW (APFKW+3,$REP,BUFFER);
*/
```

```
  R := FSDEFW (APFKW,24,1,1,47,$OUT,$HIGH,$OFF);
  BUFFER.S := 'PF1=NONE     PF2=ALL       PF3=QUIT     PF12=QUIT';
  R := FSWRITEW (APFKW,$REP,BUFFER);

BUFFER.S := 'N';
  R := FSDEFW (AIW  , 9,18,1,1,$ALPHA,$HIGH,$OFF);
  R := FSWRITEW (AIW  ,$REP,BUFFER);
  R := FSDEFW (AIW+1,10,18,1,1,$ALPHA,$HIGH,$OFF);
  R := FSWRITEW (AIW+1,$REP,BUFFER);
  R := FSDEFW (AIW+2,11,18,1,1,$ALPHA,$HIGH,$OFF);
  R := FSWRITEW (AIW+2,$REP,BUFFER);
  R := FSDEFW (AIW+3,13,18,1,1,$ALPHA,$HIGH,$OFF);
  R := FSWRITEW (AIW+3,$REP,BUFFER);
  R := FSDEFW (AIW+4,14,18,1,1,$ALPHA,$HIGH,$OFF);
  R := FSWRITEW (AIW+4,$REP,BUFFER);
  R := FSDEFW (AIW+5,15,18,1,1,$ALPHA,$HIGH,$OFF);
  R := FSWRITEW (AIW+5,$REP,BUFFER);
  BUFFER.S := '10';
  R := FSDEFW (AIW+6,17,17,1,2,$ALPHA,$HIGH,$OFF);
  R := FSWRITEW (AIW+6,$REP,BUFFER);

END;                                       (* END ATTRIB_FIELDS       *)
%PAGE
(*********************************************************************)
(*                                                                   *)
(*   ROUTINE NAME: STEREO_FIELDS                                     *)
(*                                                                   *)
(*   ROUTINE TYPE: PROCEDURE                                         *)
(*                                                                   *)
(*   FUNCTION: THIS PROCEDURE INITIALIZES ATTRIBUTE SELECTION FIELDS.*)
(*                                                                   *)
(*   PARAMETERS: NONE                                                *)
(*                                                                   *)
(*   RETURNS: NONE                                                   *)
(*                                                                   *)
(*********************************************************************)
PROCEDURE STEREO_FIELDS;

VAR
  R : INTEGER;

BEGIN                                      (* BEGIN STEREO_FIELDS     *)
(*-------------------------------------------------------------------*)
(*  DEFINE THE STEREO PARAMETER SELECTION FIELDS.                    *)
(*-------------------------------------------------------------------*)
/*R := FSDEFW (SHDR,7,17,1,30,$OUT,$LOW,$OFF);
*/R := FSDEFW (SHDR,7,12,1,40,$OUT,$LOW,$OFF);
  BUFFER.S := 'SELECT PLANE SEPARATION/ROTATION FACTORS';
  R := FSWRITEW (SHDR,$REP,BUFFER);

/*R := FSDEFW (SOW  , 9,17,1,3,$OUT,$LOW,$OFF);
*/R := FSDEFW (SOW  , 9,11,1,14,$OUT,$LOW,$OFF);
```

```
   BUFFER.S := 'SEPARATION ==>';
   R := FSWRITEW (SOW  ,$REP,BUFFER);

/*R := FSDEFW (SOW+1, 9,24,1,23,$OUT,$LOW,$OFF);
*/R := FSDEFW (SOW+1, 9,29,1,23,$OUT,$LOW,$OFF);
   BUFFER.S := '("0" = STEREO MODE OFF)';
   R := FSWRITEW (SOW+1,$REP,BUFFER);

/*R := FSDEFW (SIW  , 9,21,1,1,$ALPHA,$HIGH,$OFF);
   R := FSDEFW (SIW+1, 9,21,1,1,$ALPHA,$LOW ,$OFF);
*/R := FSDEFW (SIW  , 9,26,1,1,$ALPHA,$HIGH,$OFF);
   R := FSDEFW (SIW+1, 9,26,1,1,$ALPHA,$LOW ,$OFF);
   WRITESTR (BUFFER.S,DEPTH_FACTR:1);
   R := FSWRITEW (SIW  ,$REP,BUFFER);
   R := FSDEFW (SOW+2,11,13,1,12,$OUT,$LOW,$OFF);
   BUFFER.S := 'ROTATION ==>';
   R := FSWRITEW (SOW+2,$REP,BUFFER);

R := FSDEFW (SOW+3,11,29,1,17,$OUT,$LOW,$OFF);
   BUFFER.S := '("1" = 2 DEGREES)';
   R := FSWRITEW (SOW+3,$REP,BUFFER);

R := FSDEFW (SIW+2,11,26,1,1,$ALPHA,$HIGH,$OFF);
   R := FSDEFW (SIW+3,11,26,1,1,$ALPHA,$LOW ,$OFF);
   WRITESTR (BUFFER.S,RFACT:1);
   R := FSWRITEW (SIW+2,$REP,BUFFER);

R := FSDEFW (SOW+4,13,12,1,13,$OUT,$LOW,$OFF);
   BUFFER.S := 'FOR 5080? ==>';
   R := FSWRITEW (SOW+4,$REP,BUFFER);

R := FSDEFW (SOW+5,13,29,1,5,$OUT,$LOW,$OFF);
   BUFFER.S := '(Y/N)';
   R := FSWRITEW (SOW+5,$REP,BUFFER);

R := FSDEFW (SIW+4,13,26,1,1,$ALPHA,$HIGH,$OFF);
   R := FSDEFW (SIW+5,13,26,1,1,$ALPHA,$LOW ,$OFF);
/*WRITESTR (BUFFER.S,D5080_IMAGE:1);
*/BUFFER.S := STR(D5080_IMAGE);
   R := FSWRITEW (SIW+4,$REP,BUFFER);

R := FSDEFW (SPFKW,24,1,1,22,$OUT,$HIGH,$OFF);
   BUFFER.S := 'PF3=QUIT    PF12=QUIT';
   R := FSWRITEW (SPFKW,$REP,BUFFER);
END;                                        (* END STEREO_FIELDS       *)
%PAGE
(*********************************************************************)
(*                                                                   *)
(*   ROUTINE NAME: INIT3_GL1FLDS                                     *)
(*                                                                   *)
```

```
(* ROUTINE TYPE: PROCEDURE                                              *)
(*                                                                      *)
(* FUNCTION: INITIALIZE DISPLAY FOR GL1 DISPLAY                         *)
(*                                                                      *)
(* PARAMETERS:                                                          *)
(*   1) MSG  - POINTER TO GL/1 MESSAGE BLOCK                            *)
(*   2) PRM  - DISPLAY SCREEN PERIMETER                                 *)
(*   3) WIN  - DISPLAY WINDOW PERIMETER                                 *)
(*                                                                      *)
(* RETURNS: NONE                                                        *)
(*                                                                      *)
(**********************************************************************)
PROCEDURE INIT3_GL1FLDS (CONST FN  : ALPHA;
                         CONST FM  : ALPHA2);                EXTERNAL;
/*                       CONST MSG : MESSAGE_PTR;
                         CONST PRM : GL1_RPERIM;
                         CONST YSC : REAL);                  EXTERNAL;
*/
PROCEDURE INIT3_GL1FLDS;

VAR
  I,R,RC   : INTEGER;
  INEW     : INTEGER;
  CPTR     : CELL_PTR;
  FNAME    : STRING(18);
/*FST_PTR  : FST_POINTER;
*/UNIT     : STRING(19);

BEGIN                                       (* BEGIN INIT3_GL1FLDS     *)
/*GL1MSG := MSG;
  YSCALE := YSC;                            (* FOR COMPATIBILITY WITH 3D*)
  DSP_RPERIM := PRM;
  SCREEN_WD  := PRM.HIGH.X - PRM.LOW.X;
  SCREEN_HT  := PRM.HIGH.Y - PRM.LOW.Y;
*/
(*SCREEN_WD  := DSP_RPERIM.HIGH.X - DSP_RPERIM.LOW.X;
  SCREEN_HWD := SCREEN_WD / 2;

SCREEN_HT  := DSP_RPERIM.HIGH.Y - DSP_RPERIM.LOW.Y;
  SCREEN_HHT := SCREEN_HT / 2;
*)FSINIT;                                   (* initialize full screen  *)
  YSCALE       := HGT_RATIO;
  ATXT_WID     := 10;
  ZOOM         := 2;
  DEPTH_FACTR  := 0;
  TAN_SHIFT    := 0;
  RFACT        := 0;
  STEREO_MODE  := FALSE;
  D5080_IMAGE  := 'N';
  DSPL_ATYPES  := (..);
  DSPL_GTYPES  := (..);
  BUFFER.ROWS  := 0;
```

```
(*------------------------------------------------------------------*)
(*  DEFINE THE OPTION SELECT FIELDS                                 *)
(*------------------------------------------------------------------*)
  R := FSDEFW (OW,1,PDOC,1,18,$OUT,$LOW,$ON);
  BUFFER.S := 'SELECT OPTION ==> ';
  R := FSWRITEW (OW,$REP,BUFFER);

R := FSDEFW (FUNCW,1,PDOC+18,1,1,$ALPHA,$HIGH,$ON);
  BUFFER.S := ' ';
  R := FSWRITEW (FUNCW,$REP,BUFFER);

R := FSDEFW (OW+1,2,PDOC+2,1,18,$OUT,$LOW,$ON);
  BUFFER.S := '1 - CELL SELECTION';
  R := FSWRITEW (OW+1,$REP,BUFFER);

R := FSDEFW (OW+2,3,PDOC+2,1,25,$OUT,$LOW,$ON);
  BUFFER.S := '2 - LEVEL/COLOR SELECTION';
  R := FSWRITEW (OW+2,$REP,BUFFER);

R := FSDEFW (OW+3,4,PDOC+2,1,23,$OUT,$LOW,$ON);
  BUFFER.S := '3 - ATTRIBUTE SELECTION';
  R := FSWRITEW (OW+3,$REP,BUFFER);

R := FSDEFW (OW+4,5,PDOC+2,1,25,$OUT,$LOW,$ON);
  BUFFER.S := '4 - WINDOW WITH CROSSHAIR';
  R := FSWRITEW (OW+4,$REP,BUFFER);

R := FSDEFW (OW+5,6,PDOC+2,1,49,$OUT,$LOW,$ON);
  WRITESTR (BUFFER.S,'5 - POINT':-49);
  R := FSWRITEW (OW+5,$REP,BUFFER);

R := FSDEFW (OW+6,7,PDOC+2,1,65,$OUT,$LOW,$ON);
  WRITESTR (BUFFER.S,'6 - MEASURE':-65);
  R := FSWRITEW (OW+6,$REP,BUFFER);

R := FSDEFW (OW+7,8,PDOC+2,1,65,$OUT,$LOW,$ON);
  WRITESTR (BUFFER.S,'7 - IDENT':-65);
  R := FSWRITEW (OW+7,$REP,BUFFER);

R := FSDEFW (OW+8,9,PDOC+2,1,15,$OUT,$LOW,$ON);
  BUFFER.S := '8 - STEREO MODE';
  R := FSWRITEW (OW+8,$REP,BUFFER);

(*R := FSDEFW (OW+9,10,PDOC+2,1,13,$OUT,$LOW,$ON);
  BUFFER.S := '9 - UTILITIES';
*)R := FSDEFW (OW+9,10,PDOC+2,1,15,$OUT,$LOW,$ON);
  BUFFER.S := '9 - OUTPUT GL/1';
  R := FSWRITEW (OW+9,$REP,BUFFER);
```

```
(*--------------------------------------------------------------------*)
(*  DEFINE THE GL/1 PARAMETER FIELDS                                  *)
(*--------------------------------------------------------------------*)
   CLRDATA.L := SIZEOF(CLR_FILL_REC);
/*WRITESTR (FNAME,FN:-8,'5080CLRS',FM);
   CMSSTATE (FNAME,FST_PTR,RC);
   CLRS_EXIST := (RC = 0);
(*WRITESTR (COLORDS,'FILEDEF LVLCLRS DISK ',FNAME);
   CMS (COLORDS,RC);
*)FNAME := TRIM(STR(FN));
   WRITESTR (COLORDS,'DDNAME=LVLCLRS,NAME=',FNAME,'.5080CLRS.',FM);
*/GET_LVL_DATA;

CNVT_PERIM := (LOADED_BLKS.UBLKS(.$GL1RCT.)) OR
                 (LOADED_BLKS.ABLKS(.$GL1ARCT.));
/*IF CNVT_PERIM                          (* AS OF 10/10/88, DONE IN STOPNGL1! *)
     THEN SET_RPERIM;                    (* CVT RECT. PERIMS TO REAL.*)
*/
   N_CELLS := SYMTPTR->.NINFO(.$GL1_CELL.).ENTCT;
   GETSTOR ((N_CELLS+1)*SIZEOF(CELL_DATA),CELLD,RC);
   CPTR := GL1MSG->.GM.FIRST_CELL;
   DRAW_CELL   := CPTR;
   DRAW_CEL_IX := 1;
   I := 0;
   WHILE (CPTR <> NIL) DO
     BEGIN
       ADD_CELL (CPTR,I,INEW);
       CELLD->(.INEW.).CELLP := CPTR;
/*     IF (EMPTY_CELL IN CPTR->.GC.FLAGS)      (* DO BELOW TO SPEED   *)
         THEN CELLD->(.INEW.).SELCT := 'E'     (*    UP ADD_CELL.     *)
         ELSE CELLD->(.INEW.).SELCT := ' ';
*/     IF (CPTR = GL1MSG->.GM.PRIME_CELL)
         THEN BEGIN
            DRAW_CELL := CPTR;
            DRAW_CEL_IX := INEW;
            END;
       CPTR := CPTR->.NEXT_SYMB;
       I := I + 1;
     END;

FOR R := 1 TO I DO
     BEGIN
       IF (EMPTY_CELL IN CELLD->(.R.).CELLP->.GC.FLAGS)
         THEN CELLD->(.R.).SELCT := 'E'
         ELSE CELLD->(.R.).SELCT := ' ';
     END;
   CELLD->(.DRAW_CEL_IX.).SELCT := 'X';

R := FSDEFW (IW,12,PDOC+16,1,30,$ALPHA,$HIGH,$ON);
   R := FSDEFW (OW+10,12,PDOC,1,16,$OUT,$LOW,$ON);
   BUFFER.S := 'SELECTED CELL = ';
   R := FSWRITEW (OW+10,$REP,BUFFER);
```

```
    R := FSDEFW (IW+1,13,PDOC+16,1,30,$ALPHA,$HIGH,$ON);
    R := FSDEFW (OW+11,13,PDOC,1,16,$OUT,$LOW,$ON);
    BUFFER.S := 'BACKGRND CELL = ';
    R := FSWRITEW (OW+11,$REP,BUFFER);

WITH GL1MSG->.GM DO
      BEGIN
        CASE UNITS OF
          MICRO_INCHES : UNIT := 'MICRO_INCHES';
          MILS         : UNIT := 'MILS';
          INCHES       : UNIT := 'INCHES';
          MICRONS      : UNIT := 'MICRONS';
          MILLIMETERS  : UNIT := 'MILLIMETERS';
          CENTIMETERS  : UNIT := 'CENTIMETERS';
          OTHERWISE      UNIT := 'MISSING_UNITS';
          END;

GRID    := FLOAT(MAGNITUDE_N) / FLOAT(MAGNITUDE_D);
        R := FSDEFW (OW+12,14,PDOC,1,31,$OUT,$LOW,$ON);
        WRITESTR (BUFFER.S,'STEP = ',GRID:5:3,' ',UNIT);
        R := FSWRITEW (OW+12,$REP,BUFFER);
      END;

(*---------------------------------------------------------------------*)
(*  DEFINE THE WINDOW SELECT FIELDS                                    *)
(*---------------------------------------------------------------------*)
  R := FSDEFW (OW+13,18,PDOC,1,38,$OUT,$LOW,$ON);
  BUFFER.S := 'CALCULATED CELL SHADOW -   X          Y';
  R := FSWRITEW (OW+13,$REP,BUFFER);
  R := FSDEFW (OW+14,19,PDOC+8,1,33,$OUT,$LOW,$ON);
  R := FSDEFW (OW+15,20,PDOC+8,1,33,$OUT,$LOW,$ON);

R := FSDEFW (OW+16,22,PDOC,1,38,$OUT,$LOW,$ON);
/*BUFFER.S := 'CURRENT WINDOW -           X          Y';
  R := FSWRITEW (OW+16,$REP,BUFFER);
*/
  R := FSDEFW (OW+17,23,PDOC+8,1,12,$OUT,$LOW,$ON);
  BUFFER.S := 'LOWER LEFT ';
  R := FSWRITEW (OW+17,$REP,BUFFER);
  R := FSDEFW (IW+3,23,PDOC+20,1,10,$ALPHA,$HIGH,$ON);
  R := FSDEFW (IW+4,23,PDOC+31,1,10,$ALPHA,$HIGH,$ON);

R := FSDEFW (OW+18,24,PDOC+8,1,12,$OUT,$LOW,$ON);
  BUFFER.S := 'UPPER RIGHT ';
  R := FSWRITEW (OW+18,$REP,BUFFER);
  R := FSDEFW (IW+5,24,PDOC+20,1,10,$ALPHA,$HIGH,$ON);
  R := FSDEFW (IW+6,24,PDOC+31,1,10,$ALPHA,$HIGH,$ON);

R := FSDEFW (OW+19,16,PDOC,1,16,$OUT,$LOW,$ON);
  BUFFER.S := 'ZOOM FACTOR ==> ';
  R := FSWRITEW (OW+19,$REP,BUFFER);
```

```
  R := FSDEFW (IW+7,16,PDOC+16,1,4,$ALPHA,$HIGH,$ON);
  WRITESTR (BUFFER.S,ZOOM:-4:1);
  R := FSWRITEW (IW+7,$REP,BUFFER);

(*----------------------------------------------------------------*)
(*   DEFINE THE PFK FIELDS                                        *)
(*----------------------------------------------------------------*)
  R := FSDEFW (PFKW,9,61,1,18,$OUT,$LOW,$ON);
  BUFFER.S := 'PA2   - CMS SUBSET';
  R := FSWRITEW (PFKW,$REP,BUFFER);

R := FSDEFW (PFKW+1,10,61,1,17,$OUT,$LOW,$ON);
  BUFFER.S := 'PFK01 - LEFT EDGE';
  R := FSWRITEW (PFKW+1,$REP,BUFFER);

R := FSDEFW (PFKW+2,11,61,1,18,$OUT,$LOW,$ON);
  BUFFER.S := 'PFK02 - RIGHT EDGE';
  R := FSWRITEW (PFKW+2,$REP,BUFFER);

R := FSDEFW (PFKW+3,12,61,1,12,$OUT,$LOW,$ON);
  BUFFER.S := 'PFK03 - EXIT';
  R := FSWRITEW (PFKW+3,$REP,BUFFER);

R := FSDEFW (PFKW+4,13,61,1,15,$OUT,$LOW,$ON);
  BUFFER.S := 'PFK04 - ZOOM IN';
  R := FSWRITEW (PFKW+4,$REP,BUFFER);

R := FSDEFW (PFKW+5,14,61,1,16,$OUT,$LOW,$ON);
  BUFFER.S := 'PFK05 - ZOOM OUT';
  R := FSWRITEW (PFKW+5,$REP,BUFFER);

R := FSDEFW (PFKW+6,15,61,1,19,$OUT,$HIGH,$ON);
/*BUFFER.S := 'PFK06 - CURR WINDOW';
  R := FSWRITEW (PFKW+6,$REP,BUFFER);
*/
  R := FSDEFW (PFKW+7,16,61,1,15,$OUT,$LOW,$ON);
  BUFFER.S := 'PFK07 - MOVE UP';
  R := FSWRITEW (PFKW+7,$REP,BUFFER);

R := FSDEFW (PFKW+8,17,61,1,17,$OUT,$LOW,$ON);
  BUFFER.S := 'PFK08 - MOVE DOWN';
  R := FSWRITEW (PFKW+8,$REP,BUFFER);

R := FSDEFW (PFKW+9,18,61,1,16,$OUT,$LOW,$ON);
  BUFFER.S := 'PFK09 - TOP EDGE';
  R := FSWRITEW (PFKW+9,$REP,BUFFER);

R := FSDEFW (PFKW+10,19,61,1,17,$OUT,$LOW,$ON);
  BUFFER.S := 'PFK10 - MOVE LEFT';
  R := FSWRITEW (PFKW+10,$REP,BUFFER);

R := FSDEFW (PFKW+11,20,61,1,18,$OUT,$LOW,$ON);
```

```
    BUFFER.S := 'PFK11 - MOVE RIGHT';
    R := FSWRITEW (PFKW+11,$REP,BUFFER);

R := FSDEFW (PFKW+12,21,61,1,16,$OUT,$LOW,$ON);
    BUFFER.S := 'PFK12 - BOT EDGE';
    R := FSWRITEW (PFKW+12,$REP,BUFFER);

LEVEL_FIELDS;                             (* INITIALIZE LEVEL  FIELDS.*)
    CELL_FIELDS;                              (* INITIALIZE CELL   FIELDS.*)
    ATTRIB_FIELDS;                            (* INITIALIZE ATTRIB FIELDS.*)
    STEREO_FIELDS;                            (* INITIALIZE STEREO FIELDS.*)

SET_SHADOW;
    PREVCNT := 0;
END;                                          (* END INIT3_GL1FLDS         *)
%PAGE
(*********************************************************************)
(*                                                                   *)
(*   ROUTINE NAME: NUMCHECK                                          *)
(*                                                                   *)
(*   ROUTINE TYPE: FUNCTION                                          *)
(*                                                                   *)
(*   FUNCTION:  THIS PROCEDURE WILL CHECK THE GIVEN STRING CONTENTS  *)
(*              FOR NUMBERS ONLY.                                    *)
(*                                                                   *)
(*   PARAMETERS:                                                     *)
(*     1) S  - INPUT STRING TO BE CHECKED.                           *)
(*                                                                   *)
(*   RETURNS:                                                        *)
(*     1) TRUE   - IF STRING CONTAINS ONLY NUMBERS                   *)
(*        FALSE  - OTHERWISE                                         *)
(*                                                                   *)
(*********************************************************************)
function  NUMCHECK (const S : STRING(40);
                    VAR NUM : INTEGER) : BOOLEAN;           EXTERNAL;
function  NUMCHECK;

const
  NUMSET = (.'0'..'9'.);

VAR
  I : INTEGER;

(*********************************************************************)
(*  CONVERSION BEGINS ...                                            *)
(*********************************************************************)
begin                                         (* begin numcheck            *)
  NUMCHECK := FALSE;                          (* INITIALIZE  TO FALSE.    *)
  IF (LENGTH (S) < 1)                         (* if null string            *)
    THEN RETURN;
```

```
      FOR I := 1 TO LENGTH(S) DO            (* convert entire string   *)
        IF NOT (S(.I.) IN NUMSET)           (* IF CHAR NOT A NUMBER    *)
          THEN RETURN;
      NUMCHECK := TRUE;                     (* indicate a number !!    *)
      READSTR (S,NUM);
   end;                                     (* end NUMCHECK            *)
   %page
   (***********************************************************************)
   (*                                                                     *)
   (*   ROUTINE NAME: UPPERCASE                                           *)
   (*                                                                     *)
   (*   ROUTINE TYPE: FUNCTION                                            *)
   (*                                                                     *)
   (*   FUNCTION:  THIS PROCEDURE WILL READ A SCREEN FIELD AND            *)
   (*             CONVERT LOWERCASE ALPHA CHARACTERS TO UPPERCASE.        *)
   (*                                                                     *)
   (*   PARAMETERS:                                                       *)
   (*    1) THE NUMBER OF THE FIELD TO BE READ                            *)
   (*    2) THE TARGET STRING                                             *)
   (*                                                                     *)
   (*   RETURNS:                                                          *)
   (*    1) THE CONVERTED STRING.                                         *)
   (*                                                                     *)
   (***********************************************************************)
   procedure UPPERCASE (CONST W : FSFLDS;
                        VAR S : STRING);

VAR
     R,J : INTEGER;

(***********************************************************************)
   (*  CONVERSION BEGINS ...                                              *)
   (***********************************************************************)
   begin                                    (* BEGIN UPPERCASE         *)
     R := FSREADW (W,$STRING,BUFFER);
     S := TRIM (LTRIM (BUFFER.S));
     FOR R := 1 TO LENGTH(S) DO             (* CONVERT ENTIRE STRING   *)
       begin
         J := ORD (S(.R.));                 (* CONVERT CHAR TO INTEGER *)
         if (J > 128) AND (J < 170)         (* IF CHAR IS LOWERCASE    *)
           then S(.R.) := CHR (J + 64);     (* THEN CONVERT TO UPPERCASE*)
       end;
     BUFFER.S := S;
     R := FSWRITEW (W,$REP,BUFFER);
   end;                                     (* END UPPERCASE           *)
   %PAGE
   (***********************************************************************)
   (*                                                                     *)
   (*   ROUTINE NAME: SCROLL_FWD                                          *)
   (*                                                                     *)
```

```
(*  ROUTINE TYPE: PROCEDURE                                           *)
(*                                                                    *)
(*  FUNCTION: SCROLL TO NEXT PAGE OF LEVEL/CELL NAMES.                *)
(*                                                                    *)
(*  PARAMETERS:                                                       *)
(*    1) NFLDS - MAXIMUM NUMBER OF LEVEL/CELL NAMES PER PAGE.         *)
(*    2)   REM - NUMBER OF NAMES FROM FIRST ON CURRENT PAGE TO LAST.  *)
(*    3) FIRST - INDEX OF FIRST LEVEL/CELL NAME ON CURRENT PAGE.      *)
(*    4) PGCNT - NUMBER OF LEVEL/CELL NAMES ON CURRENT PAGE.          *)
(*                                                                    *)
(*  RETURNS: REM, FIRST, AND PGCNT ARE UPDATED APPROPRIATELY.         *)
(*                                                                    *)
(********************************************************************)
PROCEDURE SCROLL_FWD (CONST   BOT : BOOLEAN;
                      CONST DOUBL : BOOLEAN;
                      CONST NFLDS : INTEGER;
                      VAR     REM : INTEGER;
                      VAR   FIRST : INTEGER;
                      VAR   PGCNT : INTEGER;
                      PROCEDURE INIT_NAMES);

BEGIN                                        (* BEGIN SCROLL_FWD     *)
  IF (REM = PGCNT)
    THEN ALARM := $ALARM
    ELSE BEGIN
      IF BOT
        THEN BEGIN
          REPEAT
            FIRST := FIRST + NFLDS;
            REM := REM - NFLDS;
          UNTIL (REM <= NFLDS);
          PGCNT := REM;
          END
        ELSE BEGIN
          FIRST := FIRST + NFLDS;
          REM := REM - NFLDS;
          IF (DOUBL) AND
             (REM > NFLDS)
            THEN BEGIN
              FIRST := FIRST + NFLDS;
              REM := REM - NFLDS;
              END;
          IF (REM > NFLDS)
            THEN PGCNT := NFLDS
            ELSE PGCNT := REM;
          END;
      INIT_NAMES;

END;
END;                                         (* END SCROLL_FWD       *)
```

%PAGE
(********************************************************************)
(*                                                                  *)
(*  ROUTINE NAME: SCROLL_BACK                                       *)
(*                                                                  *)
(*  ROUTINE TYPE: PROCEDURE                                         *)
(*                                                                  *)
(*  FUNCTION: SCROLL TO PREVIOUS PAGE OF LEVEL/CELL NAMES.          *)
(*                                                                  *)
(*  PARAMETERS:                                                     *)
(*    1) NFLDS - MAXIMUM NUMBER OF LEVEL/CELL NAMES PER PAGE.       *)
(*    2)   REM - NUMBER OF NAMES FROM FIRST ON CURRENT PAGE TO LAST.*)
(*    3) FIRST - INDEX OF FIRST LEVEL/CELL NAME ON CURRENT PAGE.    *)
(*    4) PGCNT - NUMBER OF LEVEL/CELL NAMES ON CURRENT PAGE.        *)
(*                                                                  *)
(*  RETURNS: REM, FIRST, AND PGCNT ARE UPDATED APPROPRIATELY.       *)
(*                                                                  *)
(********************************************************************)
PROCEDURE SCROLL_BACK (CONST   TOP : BOOLEAN;
                       CONST DOUBL : BOOLEAN;
                       CONST NFLDS : INTEGER;
                       VAR     REM : INTEGER;
                       VAR   FIRST : INTEGER;
                       VAR   PGCNT : INTEGER;
                       PROCEDURE INIT_NAMES);

BEGIN                                              (* BEGIN SCROLL_BACK      *)
  IF (FIRST = 1)
    THEN ALARM := $ALARM
    ELSE BEGIN
      PGCNT := NFLDS;
      IF TOP
        THEN REPEAT
          REM   := REM + NFLDS;
          FIRST := FIRST - NFLDS;

UNTIL (FIRST = 1)
        ELSE BEGIN
          REM   := REM + NFLDS;
          FIRST := FIRST - NFLDS;
          IF (DOUBL) AND
             (FIRST <> 1)
            THEN BEGIN
              REM   := REM + NFLDS;
              FIRST := FIRST - NFLDS;
              END;
          END;
      INIT_NAMES;
      END;
END;                                               (* END SCROLL_BACK        *)

%PAGE
(*********************************************************************)
(*                                                                   *)
(*   ROUTINE NAME: SELECT_COLOR                                      *)
(*                                                                   *)
(*   ROUTINE TYPE: PROCEDURE                                         *)
(*                                                                   *)
(*   FUNCTION: SELECT COLOR TO DISPLAY FOR EACH LEVEL                *)
(*                                                                   *)
(*   PARAMETERS: NONE                                                *)
(*                                                                   *)
(*   RETURNS: NONE                                                   *)
(*                                                                   *)
(*********************************************************************)
PROCEDURE SELECT_COLOR;

VAR
   I,R     : INTEGER;
   IL,CLR  : INTEGER;
   CROW    : INTEGER;
   CCOL    : INTEGER;
   CURRF   : HALFWD;
   CURSW   : FSFLDE;
   MODCNT  : FSFLDE;
   LPFK    : FSKEY;
   MOD_STR : STRING(2);
   MODWS   : FSMODWS;
   CLRC    : CHAR;

PROCEDURE SET_ALL_COLOR (CONST COLOR : INTEGER);

VAR
   I : INTEGER;

begin                                      (* begin SET_ALL_COLOR     *)
   COLOR_CHNG := TRUE;
/*STACKX := -1;
*/SAME_WINDOW := FALSE;
   FOR I := 1 TO N_DLVLS DO
     LEVLD->(.I.).LEVLP->.GL.SHP_COLOR := COLOR;
END;                                       (* END SET_ALL_COLOR       *)

PROCEDURE SET_ALL_FILL (CONST FILL : INTEGER);

VAR
   I : INTEGER;

begin                                      (* begin SET_ALL_FILL      *)
   COLOR_CHNG := TRUE;
/*STACKX := -1;
*/SAME_WINDOW := FALSE;

```
  FOR I := 1 TO N_DLVLS DO
     LEVLD->(.I.).LEVLP->.GL.FILL_PATRN := FILL;
END;                                          (* END SET_ALL_FILL      *)
%PAGE
begin                                         (* begin SELECT_COLOR    *)
  FOR I := 0 TO CURLCNT-1 DO
    BEGIN
      R := FSMODW (LIC+I,$ALPHA,$HIGH,$ON);
      R := FSMODW (LIF+I,$ALPHA,$HIGH,$ON);

IF (LNC = LNCS)                         (* IF STEREO MODE IS 'ON' ..*)
        THEN R := FSMODW (LID+I,$ALPHA,$HIGH,$ON);
      IF (NAMTYP = LVLFLD)
        THEN R := FSMODW (NMW+I,$OUT,$LOW,$ON);
    END;

RESET_MAIN_MENU (LHDR);
FLDTYP := LVLFLD;
IF (FLDTYP <> NAMTYP)
   THEN DEF_NAME_FLDS (LNC,N_DLVLS);
INIT_LNAMES;

ALARM := $NOALARM;
REPEAT
  PREVCNT := CURLCNT;
  FOR I := 1 TO CURLCNT DO
    BEGIN
      IL := CURLVL + I - 1;
      CLR := LEVLD->(.IL.).LEVLP->.GL.SHP_COLOR;
      IF (CLR < 0)
        THEN WRITESTR (BUFFER.S,' ')
        ELSE IF (CLR < 10)
          THEN WRITESTR (BUFFER.S,CLR:1)
          ELSE CASE CLR OF
             10 : BUFFER.S := 'A';
             11 : BUFFER.S := 'B';
             12 : BUFFER.S := 'C';
             13 : BUFFER.S := 'D';
             14 : BUFFER.S := 'E';
             15 : BUFFER.S := 'F';
             OTHERWISE  BUFFER.S := '0';
             END;
      R := FSWRITEW (LIC+I-1,$REP,BUFFER);
      CURRF := LEVLD->(.IL.).LEVLP->.GL.FILL_PATRN;
      IF (CURRF < 0)
        THEN BUFFER.S := '1 '
        ELSE WRITESTR (BUFFER.S,CURRF:-2);
      R := FSWRITEW (LIF+I-1,$REP,BUFFER);
      IF (LNC = LNCS)                         (* IF STEREO MODE IS 'ON' ..*)
        THEN BEGIN
          WRITESTR (BUFFER.S,
                    50-LEVLD->(.IL.).LEVLP->.GL.LEVEL_SHFT:-2);
```

```
              R := FSWRITEW (LID+I-1,$REP,BUFFER);
           END;
     END;

R := FSINPUT (ALARM,LPFK,CURSW,     (* WAIT FOR USER INPUT     *)
                  CROW,CCOL,MODCNT,MODWS);
     ALARM := $NOALARM;
     IF (MODCNT > 0)
       THEN BEGIN
         COLOR_CHNG  := TRUE;
/*       STACKX := -1;
*/       SAME_WINDOW := FALSE;
         FOR I := 1 TO MODCNT DO              (* SERVICE WINDOW CHANGES  *)
           BEGIN                              (* UPDATE MODiFIED FIELDS  *)
             FLDNUM := MODWS(.I.);
             UPPERCASE (FLDNUM,MOD_STR);
             IL := FLDNUM + CURLVL;
             IF (FLDNUM < LIF)
               THEN IF (MOD_STR = '')
                 THEN BEGIN
                   LEVLD->(.IL-LIC.).LEVLP->.GL.SHP_COLOR := -1;
                   WRITESTR (BUFFER.S,' ');
                   END
                 ELSE BEGIN
                   IF NUMCHECK (MOD_STR,R)
                     THEN WRITESTR (BUFFER.S,R:1)
                     ELSE BEGIN
                       CLRC := MOD_STR(.1.);
                       CASE CLRC OF
                           'A'      : R := 10;
                           'B'      : R := 11;
                           'C'      : R := 12;
                           'D'      : R := 13;
                           'E'      : R := 14;
                           'F'      : R := 15;
                           OTHERWISE  BEGIN
                                     R := 0;
                                     CLRC := '0';
                                     END;
                           END;
                       BUFFER.S := STR(CLRC);
                       END;
                   LEVLD->(.IL-LIC.).LEVLP->.GL.SHP_COLOR := R;
                   END
               ELSE IF (FLDNUM < LID)
                 THEN BEGIN
                   IF (MOD_STR = '') OR
(*                    (MOD_STR(.1.) = '-') OR
*)                    (NOT NUMCHECK (MOD_STR,R)) OR
                      (R = 1) OR
                      (R > MAX_PATRN)
```

```
              THEN BEGIN
                R := -1;
                BUFFER.S := '1 ';
                END
              ELSE WRITESTR (BUFFER.S,R:-2);
            LEVLD->(.IL-LIF.).LEVLP->.GL.FILL_PATRN := R;
            END
          ELSE BEGIN
            IF NOT NUMCHECK (MOD_STR,R)
              THEN BEGIN
                R := 50;
                BUFFER.S := '50';
                END
              ELSE WRITESTR (BUFFER.S,R:-2);
            LEVLD->(.IL-LID.).LEVLP->.GL.LEVEL_SHFT := 50 - R;
            END;

R := FSWRITEW (FLDNUM,$REP,BUFFER);
        END;
      END;

CASE LPFK OF                              (* SERVICE PFK'S          *)
      $PA2  : BEGIN                           (* COMMAND: CMS SUBSET    *)
                CMS ('SUBSET',R);
                CMS ('CLEAR',R);
              END;
      $PF1  : SET_ALL_COLOR (0);
      $PF2  : SET_ALL_COLOR (7);
      $PF4  : SET_ALL_FILL  (-1);
      $PF5  : SET_ALL_FILL  (0);
      $PF6  : BEGIN
                COLOR_CHNG := TRUE;
/*              STACKX := -1;
*/              SAME_WINDOW := FALSE;
                FOR I := 1 TO N_DLVLS DO
                  LEVLD->(.I.).LEVLP->.GL.LEVEL_SHFT := 0;
              END;
      $PF7  : SCROLL_BACK (FALSE,FALSE,NLW,REM_LVLS,CURLVL,CURLCNT,
                                                   INIT_LNAMES);
      $PF8  : SCROLL_FWD  (FALSE,FALSE,NLW,REM_LVLS,CURLVL,CURLCNT,
                                                   INIT_LNAMES);
      $PF9  : SCROLL_BACK (TRUE ,FALSE,NLW,REM_LVLS,CURLVL,CURLCNT,
                                                   INIT_LNAMES);
      $PF10 : PUT_LVL_DATA;
      $PF11 : IF COLOR_CHNG
                THEN BEGIN
                  COLOR_CHNG := FALSE;
/*                STACKX := -1;
*/                SAME_WINDOW := FALSE;
                  FOR I := 1 TO N_DLVLS DO
                    WITH LEVLD->(.I.) DO
```

```
                    BEGIN
                      LEVLP->.GL.SHP_COLOR  := ORIGC;
                      LEVLP->.GL.FILL_PATRN := ORIGF;
                      LEVLP->.GL.LEVEL_SHFT := ORIGD;
                    END;
                END;
      $PF12 : SCROLL_FWD  (TRUE ,FALSE,NLW,REM_LVLS,CURLVL,CURLCNT,
                                                        INIT_LNAMES);

OTHERWISE
      END;
  UNTIL (LPFK = $PF3);

MAX_SHIFT := 0;
  FOR I := 1 TO N_DLVLS DO
    WITH LEVLD->(.I.).LEVLP->.GL DO
      IF (SHP_COLOR > 0)
        THEN BEGIN
          FLAGS := FLAGS + (.DISPLAYED_LEVEL.);
          IF (ABS(LEVEL_SHFT) > MAX_SHIFT)
            THEN MAX_SHIFT := ABS(LEVEL_SHFT);
          END
        ELSE FLAGS := FLAGS - (.DISPLAYED_LEVEL.);

RESTORE_MAIN_MENU (LHDR,CURLCNT,NMW);
END;                                          (* END SELECT_COLOR         *)
%PAGE
PROCEDURE SET_CELL_FIELD (CONST NEWX : INTEGER;
                          CONST OTHR : INTEGER;
                          VAR   CELX : INTEGER;
                          VAR   DCEL : CELL_PTR);

VAR
  R : INTEGER;

BEGIN                                         (* BEGIN SET_CELL_FIELD     *)
  IF (NEWX = 0)
    THEN BEGIN
      IF (CELX <> OTHR)    AND
         (CELX >= CURCEL) AND
         (CELX <  CURCEL+CURCCNT)
        THEN BEGIN
          BUFFER.S := STR(CELLD->(.CELX.).SELCT);
          R := FSWRITEW (CELX+CIW-CURCEL,$REP,BUFFER);
          END;
      END
    ELSE IF (NEWX <> CELX)
      THEN BEGIN
/*      DO_XHAIR := FALSE;
        STACKX := -1;
*/      IF (CELX > 0) AND
           (CELX <> OTHR)
```

```
            THEN BEGIN
              IF (EMPTY_CELL IN CELLD->(.CELX.).CELLP->.GC.FLAGS)
                THEN CELLD->(.CELX.).SELCT := 'E'
                ELSE CELLD->(.CELX.).SELCT := ' ';
              IF (CELX >= CURCEL) AND
                 (CELX <  CURCEL+CURCCNT)
                THEN BEGIN
                  BUFFER.S := STR(CELLD->(.CELX.).SELCT);
                  R := FSWRITEW (CELX+CIW-CURCEL,$REP,BUFFER);
                  END;
              END;
          CELX := NEWX;
          DCEL := CELLD->(.CELX.).CELLP;
          END;
END;                                       (* END SET_CELL_FIELD    *)
%PAGE
(*********************************************************************)
(*                                                                   *)
(*  ROUTINE NAME: SELECT_CELL                                        *)
(*                                                                   *)
(*  ROUTINE TYPE: PROCEDURE                                          *)
(*                                                                   *)
(*  FUNCTION: SELECT CELL FOR DISPLAY                                *)
(*                                                                   *)
(*  PARAMETERS: NONE                                                 *)
(*                                                                   *)
(*  RETURNS: NONE                                                    *)
(*                                                                   *)
(*********************************************************************)
PROCEDURE SELECT_CELL;

VAR
  CPTR       : CELL_PTR;
  I,IC,R     : INTEGER;
  CROW,CCOL  : INTEGER;
  BCELLFND   : INTEGER;
  CELFOUND   : CELL_NUMBER;
  FLDNUM     : FSFLDS;
  CURSW      : FSFLDE;
  MODCNT     : FSFLDE;
  CPFK       : FSKEY;
  MOD_STR    : STRING(1);
  FILL_FLAG  : CHAR;
  CHANGE     : BOOLEAN;
  MODWS      : FSMODWS;

begin                                      (* begin SELECT_CELL     *)
  FOR I := 0 TO CURCCNT-1 DO
    BEGIN
      R := FSMODW (CIW+I,$ALPHA,$HIGH,$ON);
      IF (NAMTYP = CELFLD)
```

```
              THEN R := FSMODW (NMW+I,$OUT,$LOW,$ON);
    END;

RESET_MAIN_MENU (CHDR);

FLDTYP := CELFLD;
IF (FLDTYP <> NAMTYP)
  THEN DEF_NAME_FLDS (CNC,N_CELLS);
INIT_CNAMES;

CHANGE := FALSE;
ALARM  := $NOALARM;
REPEAT

PREVCNT := CURCCNT;
  FOR I := 0 TO CURCCNT-1 DO
    BEGIN
      IC := CURCEL + I;
      WRITESTR (BUFFER.S,CELLD->(.IC.).SELCT);
      R := FSWRITEW (CIW+I,$REP,BUFFER);
    END;

R := FSINPUT (ALARM,CPFK,CURSW,        (* WAIT FOR USER INPUT      *)
                CROW,CCOL,MODCNT,MODWS);
  ALARM := $NOALARM;
  CELFOUND := 0;
  BCELLFND := 0;
  IF (MODCNT > 0)
    THEN BEGIN
      CHANGE := TRUE;
      FOR I := 1 TO MODCNT DO            (* SERVICE WINDOW CHANGES   *)
        BEGIN                            (* UPDATE MODIFIED FIELDS   *)
          FLDNUM := MODWS(.I.);
          IC := FLDNUM - CIW + CURCEL;
          UPPERCASE (FLDNUM,MOD_STR);

IF (MOD_STR = 'B')
            THEN IF (EMPTY_CELL IN CELLD->(.IC.).CELLP->.GC.FLAGS)
              THEN FILL_FLAG := 'E'
              ELSE IF (BCELLFND > 0)
                THEN FILL_FLAG := ' '
                ELSE BEGIN
                  BCELLFND := IC;
                  FILL_FLAG := 'B';
                END
            ELSE IF (CELFOUND > 0) OR
                    (MOD_STR = '')
              THEN BEGIN
                IF (MOD_STR = '') AND
                   (BCELLFND = 0) AND
                   (IC = BACK_CEL_IX)
```

```
                    THEN BCELLFND := -1;
                  IF (EMPTY_CELL IN CELLD->(.IC.).CELLP->.GC.FLAGS)
                    THEN FILL_FLAG := 'E'
                    ELSE FILL_FLAG := ' '
                  END
                ELSE BEGIN
                  CELFOUND := IC;
                  FILL_FLAG := 'X';
                  END;

CELLD->(.IC.).SELCT := FILL_FLAG;

WRITESTR (BUFFER.S,FILL_FLAG);
            R := FSWRITEW (FLDNUM,$REP,BUFFER);
          END;
       END;

IF (BCELLFND < 0)
  THEN BEGIN
    BACK_CELL := NIL;
    BACK_CEL_IX := -1;
    END
  ELSE SET_CELL_FIELD (BCELLFND,CELFOUND,BACK_CEL_IX,BACK_CELL);

IF (CELFOUND = 0)
  THEN CELLD->(.DRAW_CEL_IX.).SELCT := 'X'
  ELSE BEGIN
    DO_XHAIR := FALSE;
    STACKX := -1;
    END;
SET_CELL_FIELD (CELFOUND,BCELLFND,DRAW_CEL_IX,DRAW_CELL);

CASE CPFK OF                            (* SERVICE PFK'S          *)
  $PA2  : BEGIN                         (* COMMAND: CMS SUBSET    *)
            CMS ('SUBSET',R);
            CMS ('CLEAR',R);
          END;

$PF7  : SCROLL_BACK (FALSE,FALSE,NCW,REM_CELS,CURCEL,CURCCNT,
                                                      INIT_CNAMES);
  $PF8  : SCROLL_FWD  (FALSE,FALSE,NCW,REM_CELS,CURCEL,CURCCNT,
                                                      INIT_CNAMES);
  $PF9  : SCROLL_BACK (TRUE ,FALSE,NCW,REM_CELS,CURCEL,CURCCNT,
                                                      INIT_CNAMES);
  $PF10 : SCROLL_BACK (FALSE,TRUE ,NCW,REM_CELS,CURCEL,CURCCNT,
                                                      INIT_CNAMES);
  $PF11 : SCROLL_FWD  (FALSE,TRUE ,NCW,REM_CELS,CURCEL,CURCCNT,
                                                      INIT_CNAMES);
  $PF12 : SCROLL_FWD  (TRUE ,FALSE,NCW,REM_CELS,CURCEL,CURCCNT,
                                                      INIT_CNAMES);

OTHERWISE
  END:
```

```
      UNTIL (CPFK = $PF3);

RESTORE_MAIN_MENU (CHDR,CURCCNT,NMW);

IF CHANGE
      THEN BEGIN
/*    BUMP_STACKX := TRUE;
*/    SAME_WINDOW := FALSE;
      SET_SHADOW;
      END;
END;                                        (* END SELECT_CELL         *)
%PAGE
(******************************************************************)
(*                                                                *)
(*   ROUTINE NAME: SELECT_ATTRIB                                  *)
(*                                                                *)
(*   ROUTINE TYPE: PROCEDURE                                      *)
(*                                                                *)
(*   FUNCTION: SELECT ATTRIBUTES FOR DISPLAY                      *)
(*                                                                *)
(*   PARAMETERS: NONE                                             *)
(*                                                                *)
(*   RETURNS: NONE                                                *)
(*                                                                *)
(******************************************************************)
PROCEDURE SELECT_ATTRIB;

VAR
   I,R        : INTEGER;
   CROW,CCOL  : INTEGER;
   AFLD       : FSFLDS;
   CURSW      : FSFLDE;
   MODCNT     : FSFLDE;
   APFK       : FSKEY;
   MOD_STR    : STRING(2);
   MODWS      : FSMODWS;

begin                                       (* begin SELECT_ATTRIB     *)
   FLDTYP := ATTFLD;

FOR I := 0 TO NAW-1 DO
      BEGIN
        R := FSMODW (AIW+I,$ALPHA,$HIGH,$ON);
        R := FSMODW (AOW+I,$OUT,$LOW,$ON)
      END;

RESET_MAIN_MENU (AHDR);

REPEAT
      R := FSINPUT ($NOALARM,APFK,CURSW,    (* WAIT FOR USER INPUT     *)
                   CROW,CCOL,MODCNT,MODWS);
```

```
     IF (MODCNT > 0)
       THEN BEGIN
/*      BUMP_STACKX := TRUE;
*/      SAME_WINDOW := FALSE;
        FOR I := 1 TO MODCNT DO           (* SERVICE WINDOW CHANGES  *)
          BEGIN                           (* UPDATE MODIFIED FIELDS  *)
            FLDNUM := MODWS(.I.);
            AFLD := FLDNUM - AIW + 1;
            UPPERCASE (FLDNUM,MOD_STR);
            IF (AFLD < 7) AND
               (MOD_STR <> 'Y')
              THEN BEGIN
/*              MOD_STR  := 'N';
                WRITESTR (BUFFER.S,MOD_STR);
*/              BUFFER.S := 'N';
                R := FSWRITEW (FLDNUM,$REP,BUFFER);
                END;

CASE AFLD OF
              1 : IF (MOD_STR = 'Y')
                    THEN DSPL_ATYPES := DSPL_ATYPES + (.F121_ATTRIB.)
                    ELSE DSPL_ATYPES := DSPL_ATYPES - (.F121_ATTRIB.);
              2 : IF (MOD_STR = 'Y')
                    THEN DSPL_ATYPES := DSPL_ATYPES + (.F122_ATTRIB.)
                    ELSE DSPL_ATYPES := DSPL_ATYPES - (.F122_ATTRIB.);
              3 : IF (MOD_STR = 'Y')
                    THEN DSPL_ATYPES := DSPL_ATYPES + (.F113_ATTRIB.)
                    ELSE DSPL_ATYPES := DSPL_ATYPES - (.F113_ATTRIB.);
              4 : IF (MOD_STR = 'Y')
                    THEN DSPL_GTYPES := DSPL_GTYPES + (.SHPATT.)
                    ELSE DSPL_GTYPES := DSPL_GTYPES - (.SHPATT.);
              5 : IF (MOD_STR = 'Y')
                    THEN DSPL_GTYPES := DSPL_GTYPES + (.CELATT.)
                    ELSE DSPL_GTYPES := DSPL_GTYPES - (.CELATT.);
              6 : IF (MOD_STR = 'Y')
                    THEN DSPL_GTYPES := DSPL_GTYPES + (.XFMATT.)
                    ELSE DSPL_GTYPES := DSPL_GTYPES - (.XFMATT.);
              7 : BEGIN
                    IF NOT NUMCHECK (MOD_STR,ATXT_WID)
                      THEN ATXT_WID := 10
                      ELSE IF (ATXT_WID = 0)
                        THEN ATXT_WID := 1
                        ELSE CONTINUE;
                    WRITESTR (BUFFER.S,ATXT_WID:2);
                    R := FSWRITEW (FLDNUM,$REP,BUFFER);
                  END;

OTHERWISE
              END;                        (* END CASE FIELD NUMBER.  *)
          END;                            (* END UPDATE MODIFIED FLDS.*)
        END;
```

```
        CASE APFK OF                          (* SERVICE PFK'S         *)
           $PA2 : BEGIN                       (* COMMAND: CMS SUBSET   *)
                    CMS ('SUBSET',R);
                    CMS ('CLEAR',R);
                 END;
           $PF1 : BEGIN
/*                  BUMP_STACKX := TRUE;
*/                  SAME_WINDOW := FALSE;
                    DSPL_ATYPES := (..);
                    DSPL_GTYPES := (..);
/*                  MOD_STR := 'N';
                    WRITESTR (BUFFER.S,MOD_STR);
*/                  BUFFER.S := 'N';
                    FOR I := 0 TO 5 DO
                       R := FSWRITEW (AIW+I,$REP,BUFFER);
                 END;
           $PF2 : BEGIN
/*                  BUMP_STACKX := TRUE;
*/                  SAME_WINDOW := FALSE;
                    DSPL_ATYPES := (.F113_ATTRIB,F121_ATTRIB,F122_ATTRIB.);
                    DSPL_GTYPES := (.SHPATT,CELATT,XFMATT.);
/*                  MOD_STR := 'Y';
                    WRITESTR (BUFFER.S,MOD_STR);
*/                  BUFFER.S := 'Y';
                    FOR I := 0 TO 5 DO
                       R := FSWRITEW (AIW+I,$REP,BUFFER);
                 END;
/*         $PF3,
           $PF12 : LEAVE;
*/         OTHERWISE
           END;
/*UNTIL FALSE;
*/UNTIL (APFK = $PF3) OR
        (APFK = $PF12);

RESTORE_MAIN_MENU (AHDR,NAW,AOW);
END;                                          (* END SELECT_ATTRIB     *)
%PAGE
(********************************************************************)
(*                                                                  *)
(*  ROUTINE NAME: SELECT_STEREO                                     *)
(*                                                                  *)
(*  ROUTINE TYPE: PROCEDURE                                         *)
(*                                                                  *)
(*  FUNCTION: SELECT STEREO DISPLAY PARAMETERS                      *)
(*                                                                  *)
(*  PARAMETERS: NONE                                                *)
(*                                                                  *)
(*  RETURNS: NONE                                                   *)
(*                                                                  *)
```

(*****************************************************************)
PROCEDURE SELECT_STEREO;

VAR
  ROT_RADS : REAL;
  I,R      : INTEGER;
  CROW,CCOL : INTEGER;
  SVALUE   : INTEGER;
  OLD_DEPTH_FACTR : INTEGER;
  SFLD     : FSFLDS;
  CURSW    : FSFLDE;
  MODCNT   : FSFLDE;
  SPFK     : FSKEY;
  MOD_STR  : STRING(2);
  MODWS    : FSMODWS;

begin                                            (* begin SELECT_STEREO     *)
  FLDTYP := STRFLD;

R := FSMODW (SIW  ,$ALPHA,$HIGH,$ON);
  R := FSMODW (SOW  ,$OUT,$LOW,$ON);
  R := FSMODW (SOW+1,$OUT,$LOW,$ON);

R := FSMODW (SIW+2,$ALPHA,$HIGH,$ON);
  R := FSMODW (SOW+2,$OUT,$LOW,$ON);
  R := FSMODW (SOW+3,$OUT,$LOW,$ON);

R := FSMODW (SIW+4,$ALPHA,$HIGH,$ON);
  R := FSMODW (SOW+4,$OUT,$LOW,$ON);
  R := FSMODW (SOW+5,$OUT,$LOW,$ON);

RESET_MAIN_MENU (SHDR);

OLD_DEPTH_FACTR := DEPTH_FACTR;
  REPEAT
    R := FSINPUT ($NOALARM,SPFK,CURSW,    (* WAIT FOR USER INPUT      *)
                 CROW,CCOL,MODCNT,MODWS);

FOR I := 1 TO MODCNT DO               (* SERVICE WINDOW CHANGES   *)
      BEGIN                               (* UPDATE MODIFIED FIELDS   *)
        FLDNUM := MODWS(.I.);
        SFLD := FLDNUM - SIW + 1;
        UPPERCASE (FLDNUM,MOD_STR);
        IF (SFLD < 5)
          THEN BEGIN
            IF NOT NUMCHECK (MOD_STR,SVALUE)
              THEN BEGIN
                SVALUE := 0;
                BUFFER.S := '0';
                END
              ELSE WRITESTR (BUFFER.S,SVALUE:1);

```
            CASE SFLD OF
              1,2 : BEGIN
                      DEPTH_FACTR := SVALUE;
                    IF (DEPTH_FACTR = 0)
                      THEN IF STEREO_MODE
                        THEN BEGIN
                          STACKX := -1;
                          STEREO_MODE := FALSE;
                          END
                        ELSE
                      ELSE IF STEREO_MODE
                        THEN SAME_WINDOW := FALSE
                        ELSE BEGIN
                          STACKX := -1;
                          STEREO_MODE := TRUE;
                          END;
                    END;
              3,4 : BEGIN
                      SAME_WINDOW := FALSE;
                      RFACT := SVALUE;
                      ROT_RADS := RFACT * ROTATE_MULT * RAD_PER_DEG;
                      TAN_SHIFT := SIN(ROT_RADS) / COS(ROT_RADS);
                    END;
              END;
            END
          ELSE BEGIN
            IF STEREO_MODE
              THEN SAME_WINDOW := FALSE;
            IF (MOD_STR = 'Y')
              THEN BUFFER.S := 'Y'
              ELSE BUFFER.S := 'N';
            D5080_IMAGE := BUFFER.S(.1.);
            END;
        R := FSWRITEW (FLDNUM,$REP,BUFFER);
      END;                                   (* END UPDATE MODIFIED FLDS.*)

/*   CASE SPFK OF                            (* SERVICE PFK'S          *)
        $PA2 : BEGIN                         (* COMMAND: CMS SUBSET    *)
                 CMS ('SUBSET',R);
                 CMS ('CLEAR',R);
               END;
        $PF3,
        $PF12 : LEAVE;
        OTHERWISE
        END;
*/    IF (SPFK = $PA2)
        THEN BEGIN                           (* COMMAND: CMS SUBSET    *)
          CMS ('SUBSET',R);
          CMS ('CLEAR',R);
          END;
/*UNTIL FALSE;
```

```
*/UNTIL (SPFK = $PF3) OR
        (SPFK = $PF12);

IF (OLD_DEPTH_FACTR <> DEPTH_FACTR)
    THEN BEGIN
      IF NOT STEREO_MODE
        THEN BEGIN
          LNC := LNCNS;
          BUFFER.S := LHNS;
          END
        ELSE BEGIN
          LNC := LNCS;
          BUFFER.S := LHS;
          END;
      R := FSWRITEW (LHDR,$REP,BUFFER);
      IF (NAMTYP = LVLFLD)
        THEN NAMTYP := NOFLD;
      END;

RESTORE_MAIN_MENU (SHDR,NSW,SOW);
END;                                            (* END SELECT_STEREO       *)
%PAGE
(****************************************************************)
(*                                                              *)
(*  ROUTINE NAME: MOD_WINDOW                                    *)
(*                                                              *)
(*  ROUTINE TYPE: PROCEDURE                                     *)
(*                                                              *)
(*  FUNCTION: SELECT COLOR TO DISPLAY FOR EACH LEVEL            *)
(*                                                              *)
(*  PARAMETERS:                                                 *)
(*     1)  STRV - STRING CONTAINING COORDINATE VALUE            *)
(*                                                              *)
(*  RETURNS:                                                    *)
(*     1) COORD - MODIFIED COORDINATE                           *)
(*                                                              *)
(****************************************************************)
PROCEDURE MOD_WINDOW (CONST STRV : STRING(30);
                      VAR   COORD : REAL);

VAR
  NEW_COORD : REAL;

begin                                           (* begin MOD_WINDOW        *)
  READSTR (STRV,NEW_COORD);
  COORD := NEW_COORD / GRID;
  WINDOW_SET := TRUE;
END;                                            (* END MOD_WINDOW          *)
%PAGE
/****************************************************************)
(*                                                              *)
```

```
(* ROUTINE NAME: SET_WPARMS                                          *)
(*                                                                   *)
(* ROUTINE TYPE: PROCEDURE                                           *)
(*                                                                   *)
(* FUNCTION: SET DISPLAY WINDOW PARAMETERS.                          *)
(*                                                                   *)
(* PARAMETERS: NONE                                                  *)
(*                                                                   *)
(* RETURNS: NONE                                                     *)
(*                                                                   *)
(*********************************************************************)
PROCEDURE SET_WPARMS (CONST DRPERIM : GL1_RPERIM;
                     VAR SCALE_FCT : REAL);

VAR
   SW_H,SH_W      : REAL;
   WIDTH,HEIGHT   : REAL;
   SCREEN_WD      : REAL;
   SCREEN_HT      : REAL;
   SCREEN_HWS     : REAL;
   SCREEN_HHS     : REAL;
   CENTER_X       : REAL;
   CENTER_Y       : REAL;

begin                                   (* begin SET_WPARMS         *)
   MAX_DX := MAX_SHIFT * DEPTH_FACTR * MIN_SHIFT;
   MAX_DY := TRUNC (MAX_DX * TAN_SHIFT + 0.5);
   SCREEN_WD := DRPERIM.HIGH.X - DRPERIM.LOW.X - 2 * MAX_DX;
   SCREEN_HT := DRPERIM.HIGH.Y - DRPERIM.LOW.Y - 2 * MAX_DY;

WIDTH  := WINDOW.HIX - WINDOW.LOX;
   SH_W   := SCREEN_HT * WIDTH;
   HEIGHT := WINDOW.HIY - WINDOW.LOY;
   SW_H   := SCREEN_WD * HEIGHT;
   IF (SW_H <= SH_W)
     THEN SCALE_FCT := SCREEN_WD / WIDTH
     ELSE SCALE_FCT := SCREEN_HT / HEIGHT;

CENTER_X   := (WINDOW.HIX + WINDOW.LOX) / 2;
   CENTER_Y   := (WINDOW.HIY + WINDOW.LOY) / 2;
   SCREEN_HWS := SCREEN_WD / (2 * SCALE_FCT);
   SCREEN_HHS := SCREEN_HT / (2 * SCALE_FCT);
   WINDOW.LOX := CENTER_X - SCREEN_HWS;
   WINDOW.HIX := CENTER_X + SCREEN_HWS;
   WINDOW.LOY := CENTER_Y - SCREEN_HHS;
   WINDOW.HIY := CENTER_Y + SCREEN_HHS;

SET_WINDOW;
END;                                    (* END SET_WPARMS           *)
```

```
%PAGE
*/
(*******************************************************************)
(*                                                                 *)
(*   ROUTINE NAME: RWAITUS3                                        *)
(*                                                                 *)
(*   ROUTINE TYPE: PROCEDURE                                       *)
(*                                                                 *)
(*   FUNCTION:  WAIT FOR USER TO PRESS A PFK.  SCALE COORDINATES   *)
(*              ACCORDINGLY.                                       *)
(*                                                                 *)
(*   DATE INITIAL CODE OF VERSION COMPLETE: 12/07/83               *)
(*                                                                 *)
(*   PARAMETERS: NONE                                              *)
(*                                                                 *)
(*   RETURNS:                                                      *)
(*   1) MTRX - INITIAL SCALING/TRANSLATION MATRIX                  *)
(*   2) CELL - POINTER TO TOP LEVEL CELL BLOCK                     *)
(*   3) EXIT - BOOLEAN VARIABLE THAT IS 'TRUE' IF USER             *)
(*             TERMINATED PROGRAM BY PRESSING PFK3.                *)
(*                                                                 *)
(*******************************************************************)
procedure RWAITUS3 (VAR IMATRX : REAL_MATRIX_TYPE;
                    VAR    EXIT : BOOLEAN);                EXTERNAL;
procedure RWAITUS3;

VAR
   SW_H,SH_W     : REAL;
   SCREEN_WD     : REAL;
   SCREEN_HT     : REAL;
   SCREEN_HWS    : REAL;
   SCREEN_HHS    : REAL;
   WIDTH,HEIGHT  : REAL; (*I*)
   HALF_WIDTH    : REAL; (*I*)
   HALF_HEIGHT   : REAL; (*I*)
   CENTER_X.     : REAL;
   CENTER_Y      : REAL;
   SCALE_FACTR   : REAL;
   YFACTR        : REAL;
   I,J,R,BCIX    : INTEGER;
   CROW,CCOL     : INTEGER;
   STAKX         : INTEGER;
   CPTR          : CELL_PTR;
/*DISPLAY_LOW   : GL1_RCOORD:
*/DRPERIM       : GL1_RPERIM;
   CURSW         : FSFLDE;
   MODCNT,MODCT  : FSFLDE;
   MOD_STR       : STRING(40);
   MODWS,MODS    : FSMODWS;
   PFK           : FSKEY;
   REDRAW        : BOOLEAN;
```

```
  NEWCEL          : BOOLEAN;

(********************************************************************)
(*   SET COORDINATES PER SCROLLING OR ZOOMING REQUEST               *)
(********************************************************************)
begin                                    (* begin RWAITUS3           *)
  FOR I := 0 TO NIW-1 DO
    R := FSMODW (IW+I,$ALPHA,$HIGH,$ON);
/*R := FSMODW (IW,$OUT,$LOW,$ON);
*/BUMP_STACKX := FALSE;
  SAME_WINDOW := TRUE;
  REDRAW := FALSE;
  NEWCEL := TRUE;
  ALARM := $ALARM;

WITH WINDOW DO
    REPEAT
      IF (NOT SAME_WINDOW) OR
         (STACKX <= 0)
        THEN BUFFER.S := 'PFK06 - CURR WINDOW'
        ELSE BUFFER.S := 'PFK06 - PREV WINDOW';
      R := FSWRITEW (PFKW+6,$REP,BUFFER);
      IF (STACKX < 0) OR
         ((BUMP_STACKX) AND
          (STACKX < MAX_STACKX))
        THEN STAKX := STACKX + 1
        ELSE STAKX := STACKX;
      WRITESTR (BUFFER.S,'CURRENT WINDOW - ',STAKX:-9,'X           Y');
      R := FSWRITEW (OW+16,$REP,BUFFER);

IF NEWCEL
        THEN BEGIN
          R := LENGTH(DRAW_CELL->.SYMB_NAME_PTR->)-1;
          IF (R > 30)
            THEN R := 30;
          BUFFER.S := SUBSTR(DRAW_CELL->.SYMB_NAME_PTR->,1,R);
          R := FSWRITEW (IW,$REP,BUFFER);
          IF (BACK_CELL = NIL)
            THEN BUFFER.S := ''
            ELSE BEGIN
              R := LENGTH(BACK_CELL->.SYMB_NAME_PTR->)-1;
              IF (R > 30)
                THEN R := 30;
              BUFFER.S := SUBSTR(BACK_CELL->.SYMB_NAME_PTR->,1,R);
              END;
          R := FSWRITEW (IW+1,$REP,BUFFER);
          NEWCEL := FALSE;
          END;

ASCURS (FUNCW,1,1);                (* display cursor           *)
      R := FSINPUT (ALARM,PFK,CURSW,     (* WAIT FOR USER INPUT      *)
```

```
                  CROW,CCOL,MODCNT,MODWS);
ALARM := $NOALARM;
FOR I := 1 TO MODCNT DO              (* SERVICE WINDOW CHANGES  *)
   BEGIN                             (* UPDATE MODiFIED FIELDS  *)
      UPPERCASE (MODWS(.I.),MOD_STR); (* GET MODIFIED FIELD     *)
      CASE MODWS(.I.) OF             (* UPDATE MODiFIED FIELDS  *)
         1 : BEGIN
                NEWCEL := TRUE;
                FIND_SYMBOL ($GL1_CELL,MOD_STR,CPTR);
                IF (CPTR <> NIL) AND
                   (CPTR <> DRAW_CELL)
                   THEN FOR J := 1 TO N_CELLS DO
                      IF (CELLD->(.J.).CELLP = CPTR)
                         THEN BEGIN
                            IF (EMPTY_CELL IN
                                CELLD->(.DRAW_CEL_IX.).CELLP->.GC.FLAGS)
                               THEN CELLD->(.DRAW_CEL_IX.).SELCT := 'E'
                               ELSE CELLD->(.DRAW_CEL_IX.).SELCT := ' ';

DRAW_CEL_IX := J;
                            CELLD->(.DRAW_CEL_IX.).SELCT := 'X';
                            DRAW_CELL := CPTR;
                            IF (DRAW_CELL = BACK_CELL)
                               THEN BEGIN
                                  BACK_CELL   := NIL;
                                  BACK_CEL_IX := -1;
                                  END;
                            DO_XHAIR := FALSE;
                            STACKX := -1;
                            SAME_WINDOW := FALSE;
                            SET_SHADOW;
                            LEAVE;
                            END;
             END;
         2 : BEGIN
                NEWCEL := TRUE;
                IF (MOD_STR = '')
                   THEN BEGIN
                      IF (BACK_CELL <> NIL)
                         THEN IF (EMPTY_CELL IN
                                 CELLD->(.BACK_CEL_IX.).CELLP->.GC.FLAGS)
                            THEN CELLD->(.BACK_CEL_IX.).SELCT := 'E'
                            ELSE CELLD->(.BACK_CEL_IX.).SELCT := ' ';
                      BACK_CELL   := NIL;
                      BACK_CEL_IX := -1;
                      END
                   ELSE BEGIN
                      BCIX := BACK_CEL_IX;  (* JUST SO WE CAN FIT  *)
                                            (*   STATEMENTS BELOW  *)
                                            (*   ON ONE LINE.      *)
                      FIND_SYMBOL ($GL1_CELL,MOD_STR,CPTR);
```

```
              IF (CPTR <> NIL) AND
                 (CPTR <> BACK_CELL)
                THEN FOR J := 1 TO N_CELLS DO
                  IF (CELLD->(.J.).CELLP = CPTR)
                    THEN BEGIN
                       IF (BACK_CELL <> NIL)
                         THEN IF (EMPTY_CELL IN
                                  CELLD->(.BCIX.).CELLP->.GC.FLAGS)
                              THEN CELLD->(.BCIX.).SELCT := 'E'
                              ELSE CELLD->(.BCIX.).SELCT := ' ';

IF (CPTR = DRAW_CELL)
                         THEN BEGIN
                            BACK_CELL    := NIL;
                            BACK_CEL_IX  := -1;
                            END
                         ELSE BEGIN
                            BACK_CELL := CPTR;
                            BACK_CEL_IX := J;
                            CELLD->(.BACK_CEL_IX.).SELCT := 'B';
                            END;
                       LEAVE;
                       END;
             END;
        END;
   3 : BEGIN
          BUFFER.S := ' ';
          R := FSWRITEW (MODWS(.I.),$REP,BUFFER);
          CASE MOD_STR(.1.) OF
             '1' : BEGIN            (* SELECT CELL FOR DISPLAY  *)
                      SELECT_CELL;
                      NEWCEL := TRUE;
                   END;
             '2' : SELECT_COLOR;  (* SELECT LEVELS/COLORS    *)
             '3' : SELECT_ATTRIB; (* SELECT ATTRIBUTE TYPES  *)
             '4' : IF DO_XHAIR
                      THEN BEGIN    (* WINDOW USING CROSSHAIR  *)
                         WINDOW_XHAIR;
                         IF WINDOW_SET
                            THEN REDRAW := TRUE;
                         END;
             '5' : IF DO_XHAIR
                      THEN POINT_XHAIR;
             '6' : IF DO_XHAIR
                      THEN MEASURE_XHAIR;
             '7' : IF DO_XHAIR
                      THEN IDENT_XHAIR (IMATRX);
             '8' : SELECT_STEREO; (* SELECT STEREO PARMS.     *)
             '9' : BEGIN
                      IF CNVT_PERIM
                        THEN SET_IPERIM;
```

```
/*                            PUT_GL1 (GL1MSG,TRUE,MSGFILE);
*/                            FILTER_GL1;
                              IF CNVT_PERIM
                                 THEN SET_RPERIM;
                           END;
                        OTHERWISE
                        END;
                     END;
             4 : MOD_WINDOW (MOD_STR,LOX);
             5 : MOD_WINDOW (MOD_STR,LOY);
             6 : MOD_WINDOW (MOD_STR,HIX);
             7 : MOD_WINDOW (MOD_STR,HIY);
/*           8 : IF (NOT NUMCHECK (MOD_STR,ZOOM)) OR
                    (ZOOM = 0)
*/           8 : BEGIN
                    READSTR (MOD_STR,ZOOM);
                    IF (ZOOM = 0)
                       THEN BEGIN
                          ZOOM := 2;
                          BUFFER.S := '2.0 ';
                          R := FSWRITEW (7,$REP,BUFFER);
                          END;
                    END;
             OTHERWISE
             END;
          END;

IF (STACKX < 0)
        THEN BEGIN
           SAME_WINDOW := FALSE;
           BUMP_STACKX := TRUE;
           END;

IF WINDOW_SET
        THEN BEGIN
           SAME_WINDOW := FALSE;
           BUMP_STACKX := TRUE;
           SET_WINDOW;
           END;

WIDTH   := HIX - LOX;
  HEIGHT  := HIY - LOY;
  HALF_WIDTH  := WIDTH / 2.0;
  HALF_HEIGHT := HEIGHT / 2.0;
  CENTER_X := (HIX + LOX) / 2;
  CENTER_Y := (HIY + LOY) / 2;

IF (PFK = $PA2)
     THEN BEGIN
        CMS ('SUBSET',R);
        CMS ('CLEAR',R);
```

```
          CONTINUE;
          END
        ELSE IF (PFK = $PF3)
          THEN BEGIN
            EXIT := TRUE;
            RETURN;
            END
          ELSE IF (EMPTY_CELL IN DRAW_CELL->.GC.FLAGS)
            THEN CONTINUE;

CASE PFK OF                           (* SERVICE PFK'S        *)
          $PF1      : BEGIN
                        LOX := SHADOW.LOW.X;
                        HIX := SHADOW.LOW.X + WIDTH;
                        BUMP_STACKX := TRUE;
                      END;
          $PF2      : BEGIN
                        HIX := SHADOW.HIGH.X;
                        LOX := SHADOW.HIGH.X - WIDTH;
                        BUMP_STACKX := TRUE;
                      END;
          $PF4      : BEGIN
                        LOX := CENTER_X - HALF_WIDTH  / ZOOM;
                        HIX := CENTER_X + HALF_WIDTH  / ZOOM;
                        LOY := CENTER_Y - HALF_HEIGHT / ZOOM;
                        HIY := CENTER_Y + HALF_HEIGHT / ZOOM;
                        BUMP_STACKX := TRUE;
                      END;
          $PF5      : BEGIN
                        LOX := CENTER_X - HALF_WIDTH  * ZOOM;
                        HIX := CENTER_X + HALF_WIDTH  * ZOOM;
                        LOY := CENTER_Y - HALF_HEIGHT * ZOOM;
                        HIY := CENTER_Y + HALF_HEIGHT * ZOOM;
                        BUMP_STACKX := TRUE;
                      END;
/*        $PF6      : IF (NOT BUMP_STACKX) AND
*/        $PF6      : IF (SAME_WINDOW) AND
                         (STACKX > 0)
                        THEN STACKX := STACKX - 1;
          $PF7      : BEGIN
/*                      LOY := CENTER_Y;
*/                      LOY := HIY;
                        HIY := LOY + HEIGHT;
                        BUMP_STACKX := TRUE;
                      END;
          $PF8      : BEGIN
/*                      HIY := CENTER_Y;
*/                      HIY := LOY;
                        LOY := HIY - HEIGHT;
                        BUMP_STACKX := TRUE;
```

```
                            END;
           $PF9     : BEGIN
                        HIY := SHADOW.HIGH.Y;
                        LOY := SHADOW.HIGH.Y - HEIGHT;
                        BUMP_STACKX := TRUE;
                     END;
           $PF10    : BEGIN
/*                      HIX := CENTER_X;
*/                      HIX := LOX;
                        LOX := HIX - WIDTH;
                        BUMP_STACKX := TRUE;
                     END;
           $PF11    : BEGIN
/*                      LOX := CENTER_X;
*/                      LOX := HIX;
                        HIX := LOX + WIDTH;
                        BUMP_STACKX := TRUE;
                     END;
           $PF12    : BEGIN
                        LOY := SHADOW.LOW.Y;
                        HIY := SHADOW.LOW.Y + HEIGHT;
                        BUMP_STACKX := TRUE;
                     END;
         OTHERWISE  IF NOT REDRAW
                       THEN CONTINUE;
       END;                                (* END CASE PFKEY        *)
     EXIT := FALSE;
     LEAVE;
   UNTIL FALSE;

FOR I := 0 TO NIW-1 DO
      R := FSMODW (IW+I,$OUT,$LOW,$ON);
/*R := FSDISPLAY ($NOWAIT,$NOALARM);
*/DO_XHAIR := TRUE;

IF BUMP_STACKX
      THEN BEGIN
        IF (STACKX < MAX_STACKX)
          THEN STACKX := STACKX + 1
          ELSE FOR I := 1 TO MAX_STACKX DO
            STACK(.I-1.) := STACK(.I.);
        WITH STACK(.STACKX.) DO
          BEGIN
            WINDW := WINDOW;
/*          DCELL := DRAW_CELL;
            DFACT := DEPTH_FACTR;
            ATYPS := DSPL_ATYPES;
            AENTS := DSPL_GTYPES;
            ATWID := ATXT_WID;
            TANGT := TAN_SHIFT;
            D5080 := D5080_IMAGE;
```

```
*/      END;
      END
    ELSE WITH STACK(.STACKX.) DO
      BEGIN
        WINDOW      := WINDW;
/*      DRAW_CELL   := DCELL;
        DEPTH_FACTR := DFACT;
        DSPL_ATYPES := ATYPS;
        DSPL_GTYPES := AENTS;
        ATXT_WID    := ATWID;
        TAN_SHIFT   := TANGT;
        D5080_IMAGE := D5080;
*/    END;
/*IF (NOT STEREO_MODE) OR
    (D5080_IMAGE = 'N')
   THEN BEGIN
     SET_WPARMS (DSP_RPERIM,SCALE_FACTR);
     DISPLAY_LOW := DSP_RPERIM.LOW;
     END
   ELSE BEGIN
     SET_WPARMS (RDSP_RPERIM,SCALE_FACTR);
     DISPLAY_LOW := RDSP_RPERIM.LOW;
     END;
*/
  IF (NOT STEREO_MODE) OR
     (D5080_IMAGE = 'N')
    THEN DRPERIM := DSP_RPERIM
    ELSE DRPERIM := RDSP_RPERIM;

MAX_DX := MAX_SHIFT * DEPTH_FACTR * MIN_SHIFT;
  MAX_DY := TRUNC (MAX_DX * TAN_SHIFT + 0.5);
  SCREEN_WD := DRPERIM.HIGH.X - DRPERIM.LOW.X - 2 * MAX_DX;
  SCREEN_HT := DRPERIM.HIGH.Y - DRPERIM.LOW.Y - 2 * MAX_DY;

WIDTH  := WINDOW.HIX - WINDOW.LOX;
  SH_W   := SCREEN_HT * WIDTH;
  HEIGHT := WINDOW.HIY - WINDOW.LOY;
  SW_H   := SCREEN_WD * HEIGHT;
  IF (SW_H <= SH_W)
    THEN SCALE_FACTR := SCREEN_WD / WIDTH
    ELSE SCALE_FACTR := SCREEN_HT / HEIGHT;

CENTER_X   := (WINDOW.HIX + WINDOW.LOX) / 2;
  CENTER_Y   := (WINDOW.HIY + WINDOW.LOY) / 2;
  SCREEN_HWS := SCREEN_WD / (2 * SCALE_FACTR);
  SCREEN_HHS := SCREEN_HT / (2 * SCALE_FACTR);
  WINDOW.LOX := CENTER_X - SCREEN_HWS;
  WINDOW.HIX := CENTER_X + SCREEN_HWS;
```

```
WINDOW.LOY := CENTER_Y - SCREEN_HHS;
WINDOW.HIY := CENTER_Y + SCREEN_HHS;

SET_WINDOW;
R := FSDISPLAY ($NOWAIT,$NOALARM);

IF (NOT STEREO_MODE) OR
   (D5080_IMAGE = 'Y')
  THEN YFACTR := SCALE_FACTR
  ELSE YFACTR := SCALE_FACTR * YSCALE;    (* FOR 3D COMPATIBILITY.    *)

IMATRX.R1.X := SCALE_FACTR;
IMATRX.R1.Y := 0;
IMATRX.R2.X := 0;
IMATRX.R2.Y := YFACTR;
/*IMATRX.R3.X := DISPLAY_LOW.X + MAX_DX - WINDOW.LOX * SCALE_FACTR;
  IMATRX.R3.Y := DISPLAY_LOW.Y + MAX_DY - WINDOW.LOY * YFACTR;
*/IMATRX.R3.X := DRPERIM.LOW.X + MAX_DX - WINDOW.LOX * SCALE_FACTR;
  IMATRX.R3.Y := DRPERIM.LOW.Y + MAX_DY - WINDOW.LOY * YFACTR;
  IMATRX.SCL  := 1 / (SCALE_FACTR * YFACTR);

end;.                                    (* END RWAITUS3            *)
```

What is claimed is:

1. A method for analyzing functional information of an electrical circuit by employing depth perception on a computer, including a memory and a graphic display, comprising the steps of:

(a) receiving functional information into a computer memory;

(b) computing a parallax shift for each portion of the functional information;

(c) storing the computed parallax shift information;

(d) generating on the graphic display a background representative of a circuit card or chip; and (e) displaying the functional information from the computer memory with the appropriate computed parallax shift on the graphic display against the circuit card or chip background.

2. An apparatus for analyzing functional information of an electrical circuit on a computer, including a memory and a graphic display employing depth perception, comprising:

(a) means for receiving functional information of the electrical circuit into a computer memory;

(b) means for computing a parallax shift for each portion of the functional information;

(c) means for storing the computed parallax shift information;

(d) means for displaying a schematic of a circuit card or chip as a background on the graphic display; and (e) means for displaying the functional information from the computer memory with the appropriate computed parallax shift against the circuit card or chip background on the graphic display.

* * * * *